(12) United States Patent
Ikefuji

(10) Patent No.: US 10,756,559 B2
(45) Date of Patent: Aug. 25, 2020

(54) NON-CONTACT POWER FEEDING SYSTEM

(71) Applicant: ROHM CO., LTD., Kyoto-Shi, Kyoto (JP)

(72) Inventor: Yoshihiro Ikefuji, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 341 days.

(21) Appl. No.: 15/758,974

(22) PCT Filed: Sep. 5, 2016

(86) PCT No.: PCT/JP2016/075952
§ 371 (c)(1),
(2) Date: Mar. 9, 2018

(87) PCT Pub. No.: WO2017/043434
PCT Pub. Date: Mar. 16, 2017

(65) Prior Publication Data
US 2018/0254654 A1    Sep. 6, 2018

(30) Foreign Application Priority Data

Sep. 11, 2015  (JP) .................................. 2015-179305
Sep. 29, 2015  (JP) .................................. 2015-191880

(51) Int. Cl.
*H02J 7/02*    (2016.01)
*H02J 50/12*   (2016.01)
(Continued)

(52) U.S. Cl.
CPC .............. *H02J 7/025* (2013.01); *H02J 50/12* (2016.02); *H02J 50/60* (2016.02); *H02J 50/80* (2016.02);
(Continued)

(58) Field of Classification Search
CPC ....................................................... H02J 7/02
(Continued)

(56) References Cited

U.S. PATENT DOCUMENTS 8,692,410 B2 * 4/2014 Schatz .................... H02J 50/90
307/104
2014/0035521 A1   2/2014 Endo
(Continued)

FOREIGN PATENT DOCUMENTS

JP    2010215992 A    4/2012
JP    2012171240 A    2/2014
(Continued)

OTHER PUBLICATIONS

Extended European Search Report corresponding to Application No. 16844295.2-1202/3334009 PCT/JP2016075952; dated Mar. 8, 2019.
International Search Report corresponding to Application No. PCT/JP2016/075952; dated Nov. 22, 2016.

*Primary Examiner* — Robert Grant
(74) *Attorney, Agent, or Firm* — Cantor Colburn LLP

(57) ABSTRACT

In a normal mode, a power receiving device changes the resonant frequency of a power receiving side resonant circuit from a reference frequency or short-circuits a power receiving side coil for a predetermined time and then eliminates the changed or short-circuited state. Meanwhile, in the normal mode, a power transmitting device generates a test magnetic field in a power transmitting side coil during the above changed or short-circuited period and then determines, on the basis of a current amplitude detection value of the power transmitting side coil, whether a foreign object is present or not, thereby determining and controlling whether power transmission is executed or not. In a test mode, the power receiving device maintains the above changed or short-circuited state, and the power transmitting device continuously generates the test magnetic field and continuously obtains the current amplitude detection value of the power transmitting side coil.

11 Claims, 25 Drawing Sheets

(51) Int. Cl.
*H02J 50/60* (2016.01)
*H02J 50/90* (2016.01)
*H02J 50/80* (2016.01)
*H04B 5/00* (2006.01)
*H04N 5/232* (2006.01)
*H04N 5/374* (2011.01)
*H04N 5/44* (2011.01)

(52) U.S. Cl.
CPC ............ *H02J 50/90* (2016.02); *H04B 5/0031* (2013.01); *H04B 5/0037* (2013.01); *H04B 5/0081* (2013.01); *H04N 5/23238* (2013.01); *H04N 5/374* (2013.01); *H04N 2005/443* (2013.01); *H04N 2005/4408* (2013.01)

(58) Field of Classification Search
USPC ......................................................... 320/108
See application file for complete search history.

(56) References Cited

U.S. PATENT DOCUMENTS

| | | |
|---|---|---|
| 2014/0225452 A1 | 8/2014 | Kozaki et al. |
| 2015/0280453 A1 | 10/2015 | Ikefuji |
| 2016/0006263 A1 | 1/2016 | Shichino |
| 2016/0013683 A1 | 1/2016 | Endo |
| 2016/0126749 A1 | 5/2016 | Shichino |
| 2016/0322868 A1 | 11/2016 | Akuzawa et al. |
| 2018/0205270 A1 | 7/2018 | Shichino |

FOREIGN PATENT DOCUMENTS

| | | |
|---|---|---|
| JP | 2013088880 A | 11/2014 |
| JP | 2014189760 A | 11/2015 |
| WO | 2014171348 A1 | 10/2014 |
| WO | 2015016334 A1 | 2/2015 |
| WO | 2015097807 A1 | 7/2015 |

* cited by examiner

DETACHED STATE
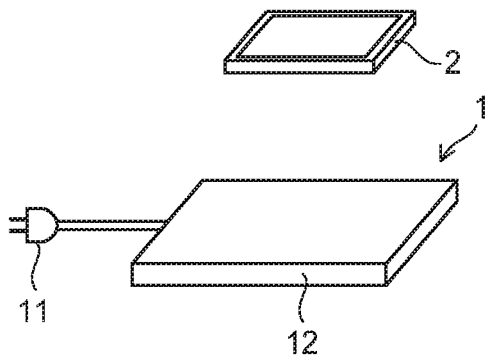
FIG.1A
REGULARLY PLACED STATE
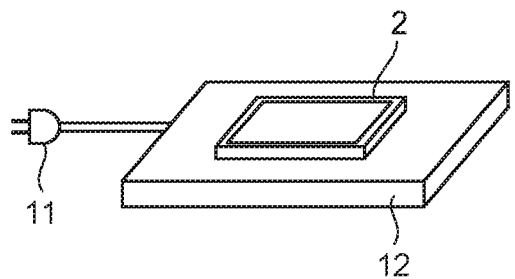
FIG.1B
FIG.2
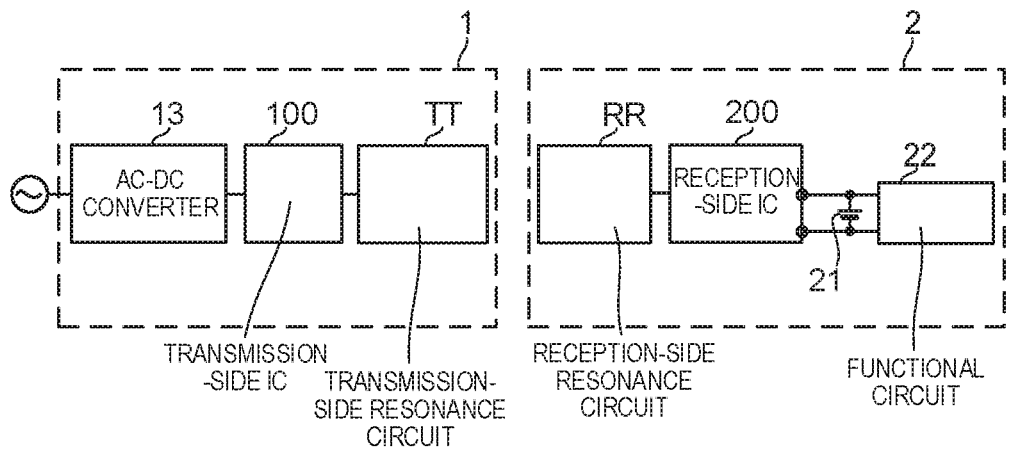
FIG.3
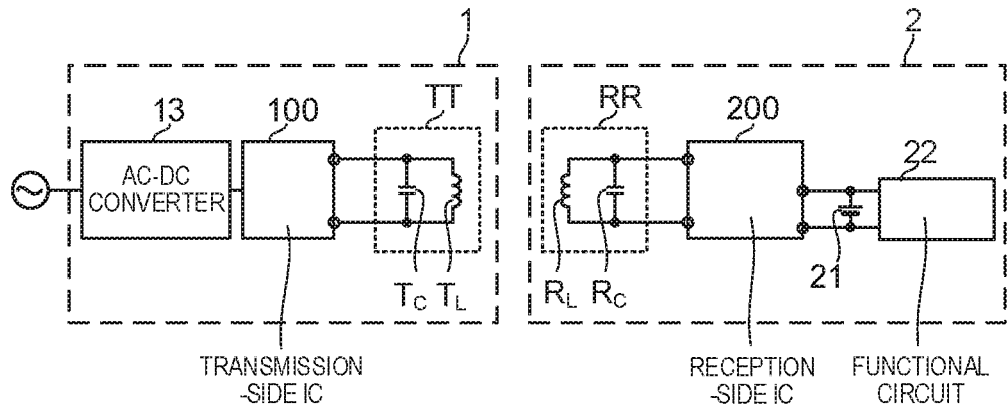

VOLTAGE DROP ACROSS
SENSE RESISTOR

FIG.9
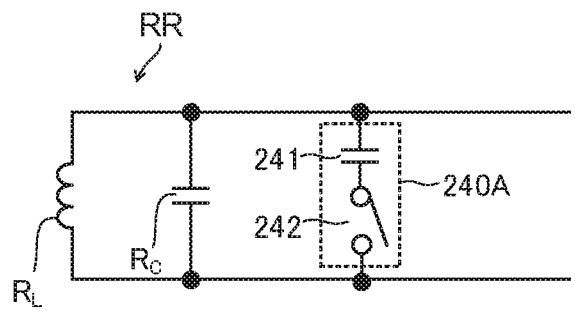
FIG.10
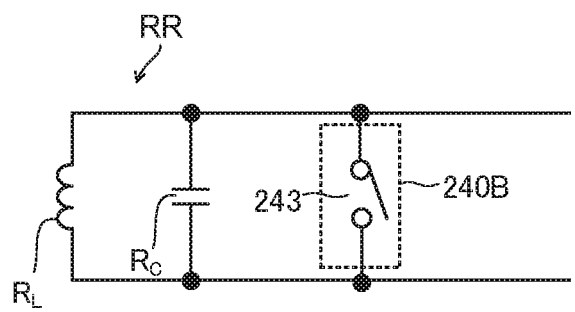
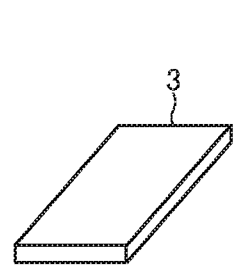
FIG.11A
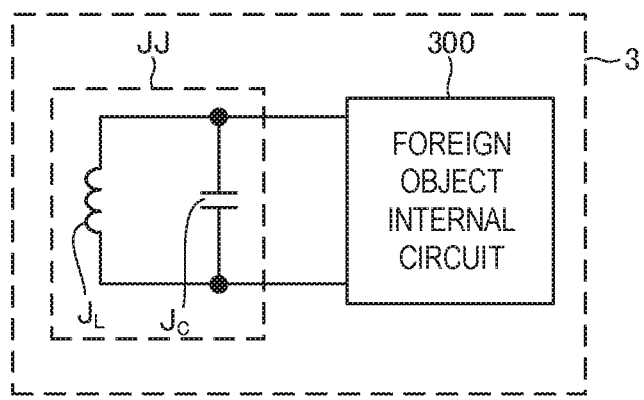
FIG.11B

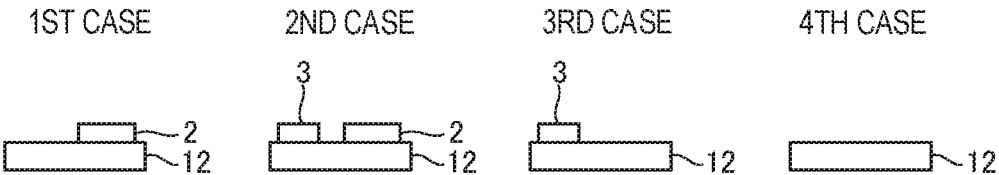
FIG.14A  FIG.14B  FIG.14C  FIG.14D
FIG.15
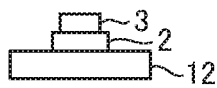
FIG.16
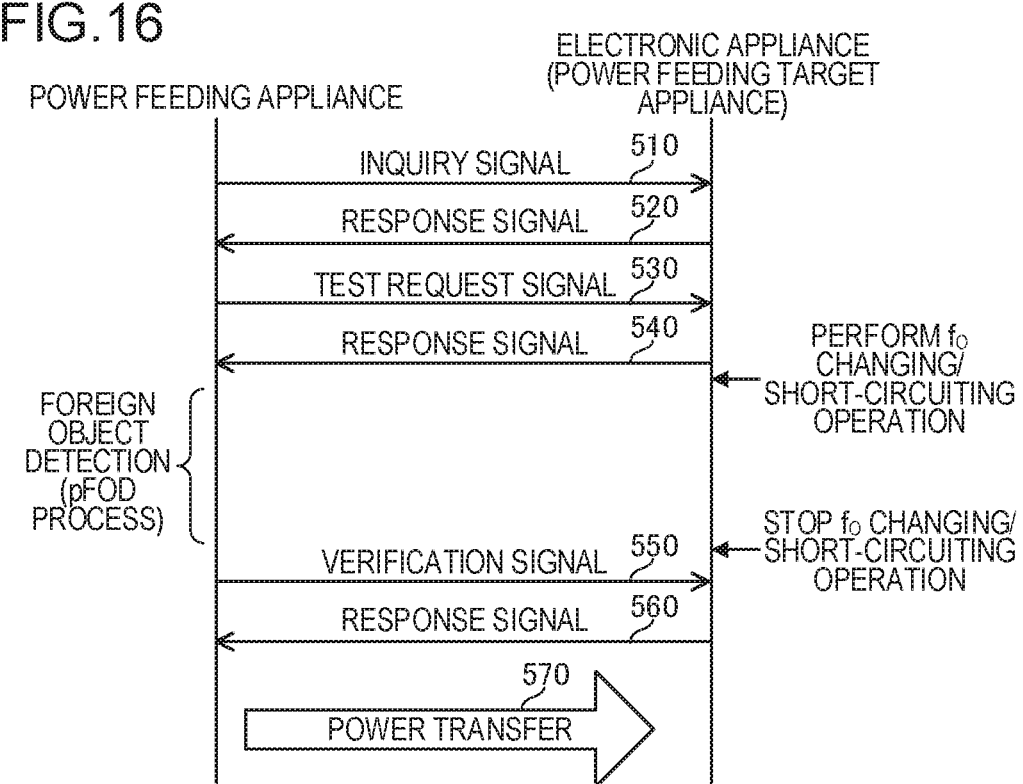
FIG.17
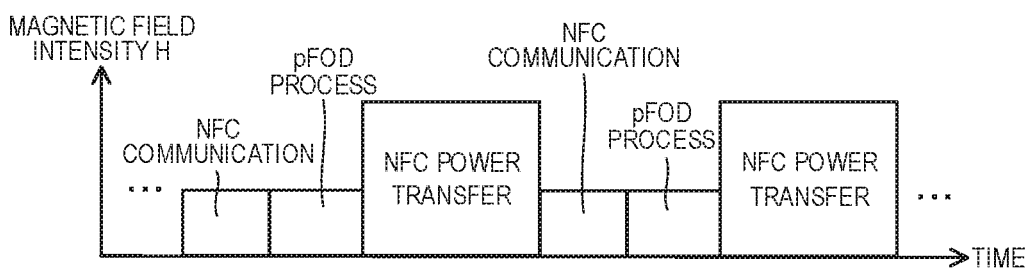

FIG. 26

| CORRESPONDING OPERATION | pFOD PROCESS | | | | POWER TRANSFER, mFOD PROCESS | | |
|---|---|---|---|---|---|---|---|
| POWER FEEDING APPLIANCE MODE | MA1 | | MA2 | | MA3 | MA4 | |
| PLACED ON POWER FEEDING STAGE | NONE | ELECTRONIC APPLIANCE (MB1) | NONE | ELECTRONIC APPLIANCE (MB1) & FOREIGN OBJECT | ELECTRONIC APPLIANCE (MB2) | ELECTRONIC APPLIANCE (MB2) | ELECTRONIC APPLIANCE (MB2) & FOREIGN OBJECT |
| TEST SCHEME | 1ST | 2ND | 3RD | 4TH | 5TH | 6TH | 7TH |

POWER FEEDING APPLIANCE
{ MODE MA1 (TEST MAGNETIC FIELD GENERATED)
  MODE MA2 (TEST MAGNETIC FIELD GENERATED)
  MODE MA3 (POWER TRANSMISSION MAGNETIC FIELD GENERATED)
  MODE MA4 (POWER TRANSMISSION MAGNETIC FIELD GENERATED) }

ELECTRONIC APPLIANCE
{ MODE MB1 ($f_0$ CHANGING/SHORT-CIRCUITING OPERATION PERFORMED)
  MODE MB2 ($f_0$ NO CHANGING/SHORT-CIRCUITING OPERATION, IN POWER RECEIVING STATE) }

REGULARLY PLACED STATE

FIG.33
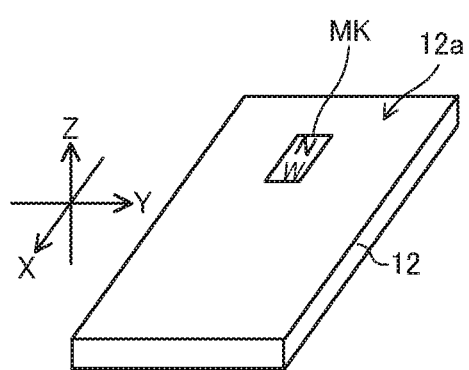
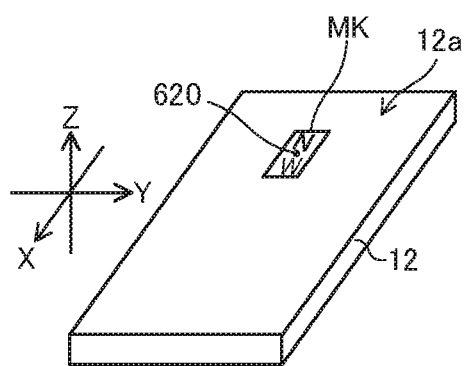
FIG.34A
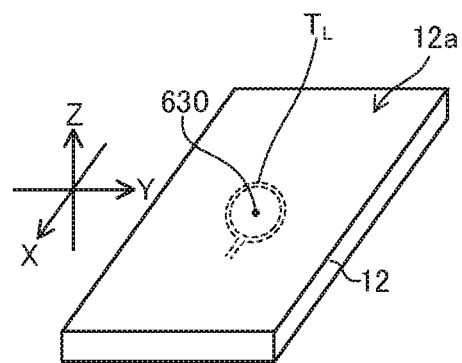
FIG.34B

FIG.36
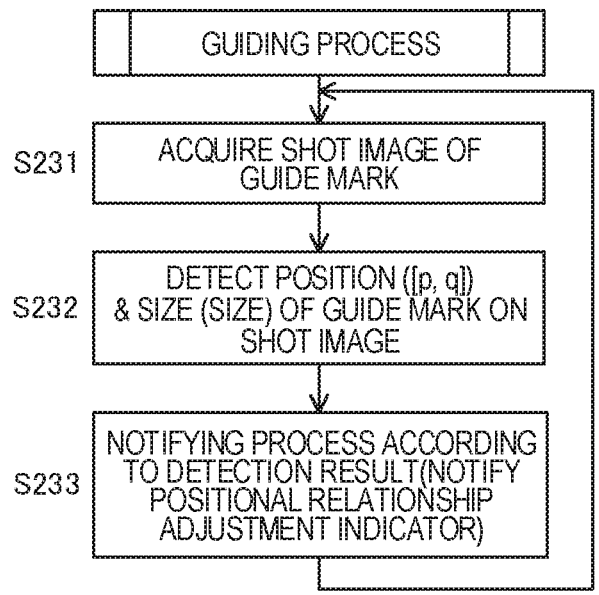
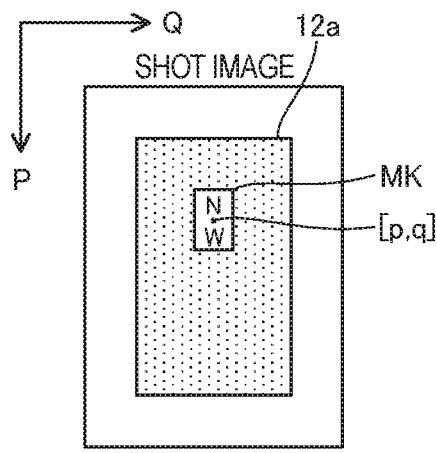
FIG.37A
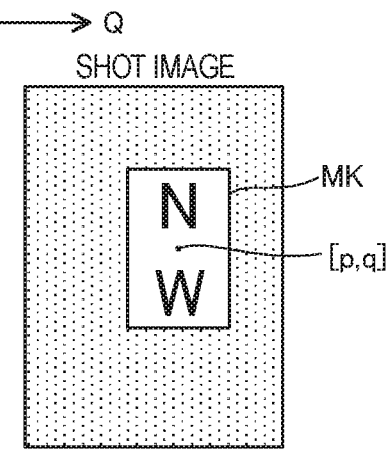
FIG.37B

FIG.38
| GUIDE MARK SIZE ON SHOT IMAGE (SIZE) | ELECTRONIC APPLIANCE-TO-PLACEMENT SURFACE DISTANCE (D) | GUIDE MARK IDEAL CENTER POSITION ON SHOT IMAGE ($[p_O, q_O]$) |
|---|---|---|
| $SIZE_1$ | $d_1$ | $[p_{O1}, q_{O1}]$ |
| $SIZE_2$ | $d_2$ | $[p_{O2}, q_{O2}]$ |
| ⋮ | ⋮ | ⋮ |
| $SIZE_n$ | $d_n$ | $[p_{On}, q_{On}]$ |
FIG.39
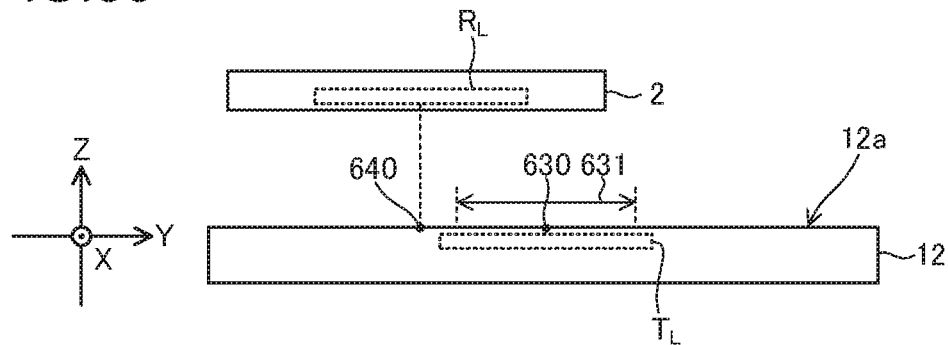
FIG.40
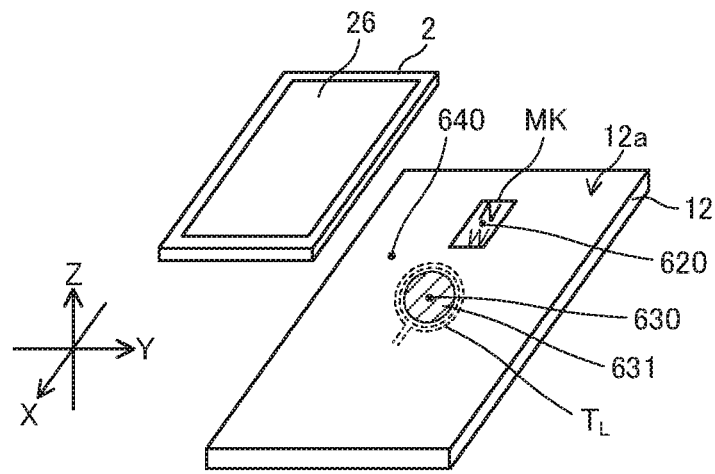

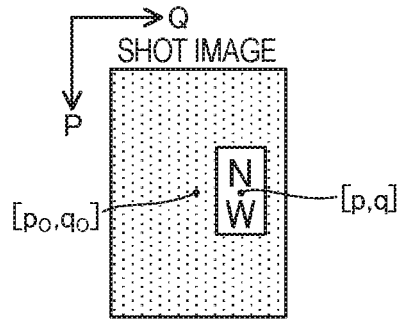
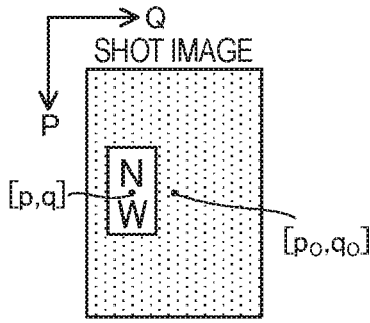
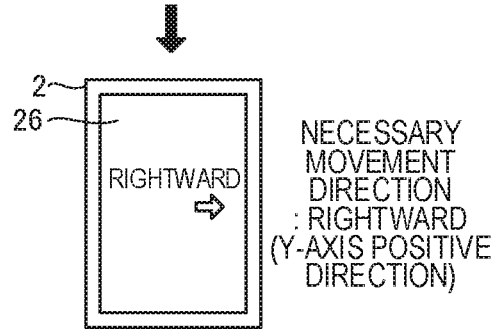
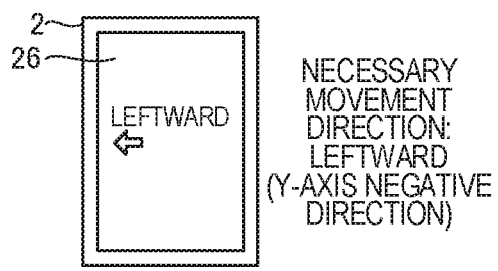
FIG.42A  FIG.42B
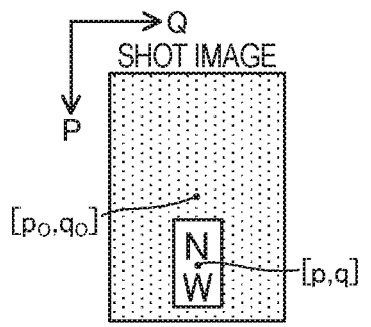
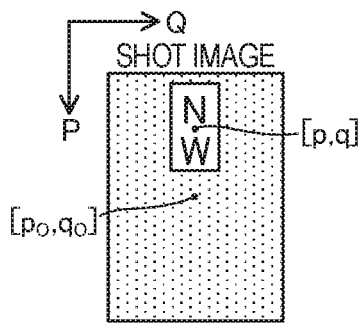
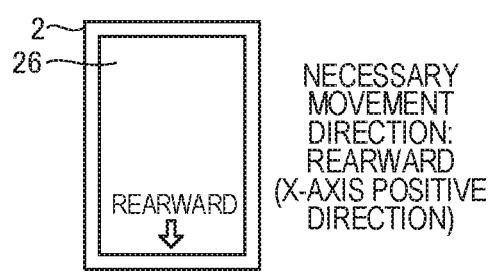
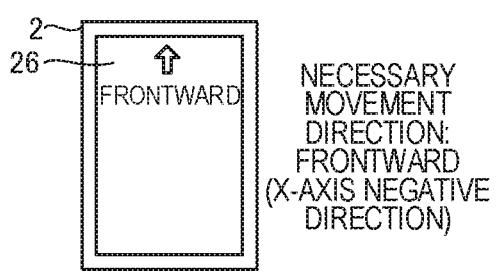
FIG.42C  FIG.42D FIG.43
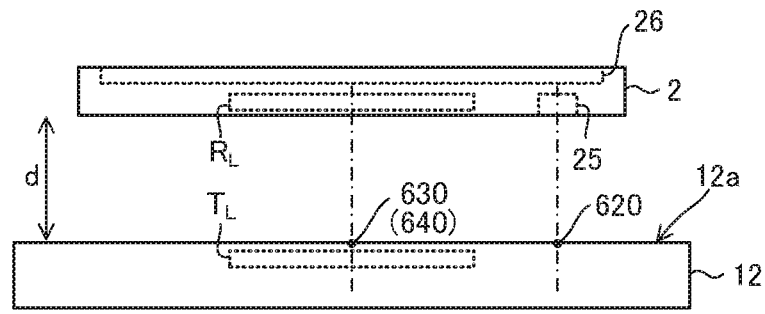
FIG.44
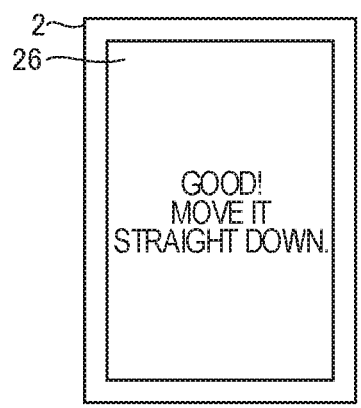
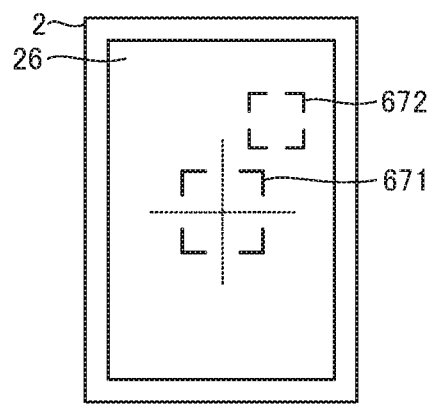
FIG.45A
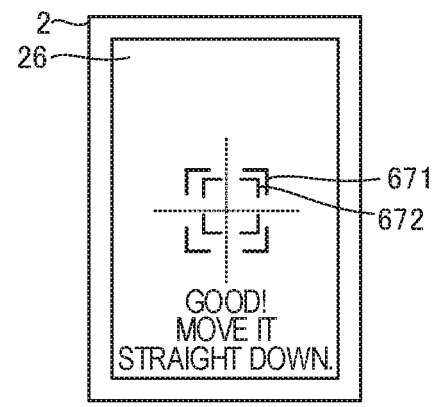
FIG.45B

NON-CONTACT POWER FEEDING SYSTEM

CROSS REFERENCE TO RELATED APPLICATIONS

This is the U.S. national stage of application No. PCT/JP2016/075952, Sep. 5, 2016. Priority under 35 U.S.C. § 119(a) and 35 U.S.C. § 365(b) is claimed from Japanese Application No. 2015-191880, filed Sep. 29, 2015, and Japanese Application No. 2015-179305, filed Sep. 11, 2015, the disclosures of which are also incorporated herein by reference.

TECHNICAL FIELD

The present invention relates to a non-contact power feeding system.

BACKGROUND ART

As a kind of close-range wireless communication, there is known wireless communication by NFC (near-field communication), which uses a carrier frequency of 13.56 MHz. On the other hand, there have been proposed technologies that utilize a coil used for NFC communication to achieve non-contact power feeding by magnetic field resonance.

In non-contact power feeding by magnetic field resonance, a transmission-side resonance circuit including a transmission-side coil is arranged in a power feeding appliance (power transmission device), and a reception-side resonance circuit including a reception-side coil is arranged in an electronic appliance as a power reception appliance (power reception device), with the resonance frequencies of the respective resonance circuits set at a common reference frequency. When, with the power reception appliance (power reception device) arranged on the power feeding stage of the power feeding appliance (power transmission device), an alternating current is passed in the transmission-side coil, an alternating magnetic field at the reference frequency is generated in the transmission-side coil. This alternating magnetic field propagates to the reception-side resonance circuit that resonates at the reference frequency, causing an alternating current to pass in the reception-side coil. Thus, electric power is transferred from the transmission-side resonance circuit including the transmission-side coil to the reception-side resonance circuit including the reception-side coil.

LIST OF CITATIONS

Patent Literature

Patent Document 1: Japanese Patent Application published as No. 2014-33504

SUMMARY OF THE INVENTION

Technical Problem

Normally, only an electronic appliance that is compatible with a power feeding appliance is placed on the power feeding stage (power feeding mat, or power feeding cradle) of the power feeding appliance, in which case power feeding (power transfer) is performed in a desired manner. It can happen, however, that a foreign object that is incompatible with the power feeding appliance is placed on the power feeding stage by mistake. The foreign object here can be, for example, an object (such as a card) incorporating a wireless IC tag including a 13.56 MHz antenna coil that does not respond to NFC communication. Or the foreign object can be an electronic appliance that has an NFC communication function itself but has it disabled. For example, a smartphone, even if it has an NFC communication function, if the function is turned OFF by a software setting, can be a foreign object. Also a smartphone, even if it has an NFC communication function enabled, if it has no power receiving function, it is categorized as a foreign object.

If the power feeding appliance performs power transmission operation with such a foreign object placed on the power feeding stage, the strong magnetic field generated in the transmission-side coil may damage the foreign object. For example, the strong magnetic field during the power transmission operation can raise the terminal voltage of a coil in the foreign object on the power feeding stage to as high as 100 V to 200 V, and if the foreign object is not designed to withstand such a high voltage, it is damaged.

To prevent a foreign object from being damaged or otherwise affected, it is beneficial to detect the presence or absence of one and control the execution of power transmission accordingly. This can be achieved by acquiring evaluation data that enables judgement of the presence or absence of a foreign object under predetermined conditions and permitting power transmission operation when, through judgement of whether or not power transmission is permissible based on the evaluation data, power transmission is judged to be permissible. However, if the evaluation data is obtained only through the flow "acquire evaluation data, then judge whether or not execution of power transmission is permissible, and then control whether or not to execute power transmission", it is difficult to obtain evaluation data sequentially under varying conditions. This can make it difficult to efficiently or detailedly perform evaluation related to judgment of whether or not execution of power transmission is permissible (for example, evaluation of whether or not that judgement is performed properly).

On the other hand, to carry out transmission and reception of electric power in the manner described above, the positional relationship between the power transmission device and the power reception device needs to be set to be a desired positional relationship suitable for transmission and reception of electric power. Possible approaches to make the positional relationship between the power transmission device and the power reception device a desired one include forming a depression in the power feeding stage on which the power reception device is to be placed and marking the power feeding stage with a guide describing the exterior shape of the power reception device. These approaches, however, assume that the power reception device has a given exterior shape, and thus lack versatility considering that any of power reception devices with varying exterior shapes can be a constituent element of the non-contact power feeding system.

Against the background discussed above, an object of the present invention is to provide a non-contact power feeding system that allows efficient or detailed evaluation related to judgement of whether or not execution of power transmission is permissible.

Another object of the present invention is to provide a non-contact power feeding system that can aid in adjusting the positional relationship between a power transmission device and a power reception device to perform transmission and reception of electric power on a non-contact basis.

Means for Solving the Problem

A first non-contact power feeding system according to the present invention is a non-contact power feeding system that comprises a power transmission device and a power reception device and that allows transmission and reception of electric power between them by magnetic field resonance, and is configured as follows. The power transmission device includes: a transmission-side resonance circuit including a transmission-side coil for transmitting the electric power; a power transmission circuit which feeds an alternating-current voltage to the transmission-side resonance circuit to generate a magnetic field in the transmission-side coil; a sensing circuit which senses the amplitude of the current passing in the transmission-side coil; and a transmission-side control circuit which operates in, as its operation mode, one of a plurality of modes including a first mode and a second mode. The power reception device includes: a reception-side resonance circuit including a reception-side coil for receiving the electric power; a changing/short-circuiting circuit which can change the resonance frequency of the reception-side resonance circuit from the resonance frequency during the power reception or short-circuit the reception-side coil; and a reception-side control circuit which operates in, as its operation mode, one of a plurality of modes including the first mode and the second mode. In the first mode, the reception-side control circuit, according to a signal from the power transmission device by communication and by using the changing/short-circuiting circuit, changes the resonance frequency of the reception-side resonance circuit, or short-circuits the reception-side coil, for a predetermined time, and then cancels the change or the short-circuiting; the transmission-side control circuit, during the period in which the resonance frequency of the reception-side resonance circuit is changed or the reception-side coil is short-circuited and prior to the power transmission, controls the power transmission circuit such that a predetermined test magnetic field is generated in the transmission-side coil, then, based on first evaluation data representing the sensed amplitude value obtained from the sensing circuit while the test magnetic field is being generated in the first mode, judges whether or not execution of the power transmission is permissible, and, after judging that execution of the power transmission is permissible, controls the power transmission circuit such that a power transmission magnetic field stronger than the test magnetic field is generated in the transmission-side coil to carry out the power transmission. In the second mode, the reception-side control circuit, by using the changing/short-circuiting circuit, maintains the change of the resonance frequency of the reception-side resonance circuit or the short-circuiting of the reception-side coil; the transmission-side control circuit controls the power transmission circuit such that the test magnetic field is generated continuously in the transmission-side coil, and acquires second evaluation data representing the sensed amplitude value obtained from the sensing circuit while the test magnetic field is being generated in the second mode.

Specifically, for example, with respect to the first non-contact power feeding system described above, in the first mode, the transmission-side control circuit can, based on the first evaluation data, judge presence or absence of a foreign object which differs from the power reception device and in which a current based on the magnetic field generated in the transmission-side coil can be generated, and, based on the result of the judgement, control whether or not execution of the power transmission is permissible.

More specifically, for example, with respect to the first non-contact power feeding system described above, in the first mode, the transmission-side control circuit can, on judging that no foreign object is present, permit execution of the power transmission and, on judging that the foreign object is present, inhibit execution of the power transmission.

Specifically, for another example, with respect to the first non-contact power feeding system described above, in the first mode, the transmission-side control circuit can judge presence or absence of the foreign object by judging whether or not the sensed amplitude value represented by the first evaluation data falls outside a predetermined range.

For another example, with respect to the first non-contact power feeding system described above, a processing unit which performs a predetermined process based on the second evaluation data may be further included in the non-contact power feeding system, and the processing unit can be provided in the transmission-side control circuit or in an external device different from either of the power transmission device and the power reception device.

In that case, for example, with respect to the first non-contact power feeding system described above, the predetermined process can include a process of displaying the second evaluation data on a display device provided in, or connected to, the power transmission device.

For another example, with respect to the first non-contact power feeding system described above, the predetermined process can include a process of recording the second evaluation data to a storage device provided in, or connected to, the power transmission device.

For another example, with respect to the first non-contact power feeding system described above, a processing unit which performs a predetermined process based on the second evaluation data can be further included in the non-contact power feeding system, and the processing unit can be provided in the transmission-side control circuit or in an external device different from either of the power transmission device and the power reception device. The predetermined process can then include a process of judging whether or not a sensed amplitude value represented by the second evaluation data falls outside a predetermined range.

Specifically, for example, with respect to the first non-contact power feeding system described above, the transmission-side control circuit and the reception-side control circuit can each set its operation mode to the second mode on receiving input of a particular instruction, and otherwise set its operation mode to the first mode.

Specifically, for example, with respect to the first non-contact power feeding system described above, the power transmission device and the power reception device can each include an input accepter for receiving input of the particular instruction.

For another example, with respect to the first non-contact power feeding system described above, the plurality of modes in the transmission-side control circuit can further include a mode in which the power transmission magnetic field is generated continuously in the transmission-side coil, and the plurality of modes in the reception-side control circuit can further include a mode in which the change of the resonance frequency of the reception-side resonance circuit or the short-circuiting of the reception-side coil is kept unperformed continuously.

A non-contact power feeding system according to the present invention is a non-contact power feeding system that comprises a power transmission device including a transmission-side resonance circuit having a transmission-side coil for transmitting electric power and a power reception device including a reception-side resonance circuit having a reception-side coil for receiving the electric power and that allows transmission and reception of electric power between them by magnetic field resonance, and is configured as follows. The power transmission device includes a placement surface on which the power reception device is to be placed during transmission and reception of the electric power, and a predetermined mark is indicated at a predetermined position on the placement surface based on the arrangement position of the transmission-side coil. The power reception device includes: a camera unit which shoots an image; and a controller which detects the mark on a shot image obtained by shooting the mark before the power reception device is placed on the placement surface and which gives a particular notification based on the result of detection of the mark.

Specifically, for example, based on the result of detection of the mark on the shot image, the controller can give, in the particular notification, a notification as to adjustment of the positional relationship between the power transmission device and the power reception device on a plane parallel to the placement surface.

More specifically, for example, the notification as to adjustment of the positional relationship can include a notification of the necessary movement direction of the power reception device relative to the power transmission device on the plane parallel to the placement surface to perform transmission and reception of the electric power.

Still more specifically, for example, transmission and reception of the electric power are possible when the power reception device is placed on the placement surface such that the projected position of the center of the reception-side coil on the placement surface lies within a predetermined region on the placement surface based on the arrangement position of the transmission-side coil, and the notification as to adjustment of the positional relationship can include a notification of the necessary movement direction to bring the projected position within the predetermined region.

Then, for example, the controller can judge whether or not the projected position lies within the predetermined region based on the result of detection of the mark on the shot image, and, if the projected position does not lie within the predetermined region, notify the necessary movement direction or, if the projected position lies within the predetermined region, give a predetermined notification different from the notification of the necessary movement direction.

For another example, in the power transmission device, execution of the power transmission can be restricted before the end of the predetermined process for giving the particular notification by the controller.

For another example, the result of detection of the mark on the shot image can include the result of detection of the position of the mark on the shot image.

For another example, the power reception device can include a display screen, and the particular notification can include display on the display screen.

For another example, the housing of the power reception device can have a first face and a second face opposite the first face, the display screen can be provided on the first face, and the camera unit can have a shooting region widening, starting on the second face, in the direction pointing from the first face to the second face.

For another example, the power transmission device can acquire current amplitude information as to the transmission-side coil as obtained when a predetermined magnetic field is being generated in the transmission-side coil as a result of an alternating-current voltage being fed to the transmission-side resonance circuit, and the controller can give a second particular notification according to the current amplitude information received from the power transmission device by communication.

In that case, for example, in the second particular notification, the controller can notify whether or not the positional relationship between the power transmission device and the power reception device is proper, or classify and notify the propriety level of the positional relationship between the power transmission device and the power reception device in three or more grades.

Instead, for example, the power transmission device can acquire current amplitude information as to the transmission-side coil as obtained when a predetermined magnetic field is being generated in the transmission-side coil as a result of an alternating-current voltage being fed to the transmission-side resonance circuit, and give a second particular notification according to the current amplitude information.

In that case, for example, in the second particular notification, the power transmission device can notify whether or not the positional relationship between the power transmission device and the power reception device is proper, or classify and notify the propriety level of the positional relationship between the power transmission device and the power reception device in three or more grades.

Advantageous Effects of the Invention

According to the present invention, it is possible to provide a non-contact power feeding system that allows efficient or detailed evaluation related to judgement of whether or not execution of power transmission is permissible.

According to the present invention, it is also possible to provide a non-contact power feeding system that can aid in adjusting the positional relationship between a power transmission device and a power reception device to perform transmission and reception of electric power on a non-contact basis

BRIEF DESCRIPTION OF DRAWINGS

FIG. 1A and FIG. 1B are schematic exterior views of a power feeding appliance and an electronic appliance according to a first embodiment of the present invention;

FIG. 2 is a schematic internal configuration diagram of the power feeding appliance and the electronic appliance according to the first embodiment of the present invention;

FIG. 3 is a schematic internal configuration diagram of the power feeding appliance and the electronic appliance according to the first embodiment of the present invention;

FIG. 9 is a circuit diagram showing one example of a resonance state changing circuit according to the first embodiment of the present invention;

FIG. 10 is a circuit diagram showing another example of the resonance state changing circuit according to the first embodiment of the present invention;

FIG. 11A and FIG. 11B are a schematic external view and a schematic internal configuration diagram, respectively, of a foreign object according to the first embodiment of the present invention;

FIG. 14A to FIG. 14D are diagrams showing examples of the arrangement relationship among a power feeding stage, an electronic appliance, and a foreign object;

FIG. 15 is a diagram showing one arrangement relationship among a power feeding stage, an electronic appliance, and a foreign object;

FIG. 16 is a diagram illustrating the exchange of signals between the power feeding appliance and the electronic appliance according to the first embodiment of the present invention;

FIG. 17 is a diagram showing how NFC communication, the pFOD process, and power transfer are performed sequentially and repeatedly according to the first embodiment of the present invention;

FIG. 26 is a schematic diagram illustrating a test mode according to a third embodiment of the present invention;

FIG. 33 is a diagram showing a guide mark indicated on the placement surface of the power feeding appliance according to the fourth embodiment of the present invention;

FIG. 34A and FIG. 34B are diagrams showing the center position of the guide mark on the placement surface of the power feeding appliance and the projected position of the transmission-side coil on the placement surface according to the fourth embodiment of the present invention;

FIG. 36 is a flow chart of a guiding process performed in the electronic appliance according to the fourth embodiment of the present invention;

FIG. 37A and FIG. 37B are diagrams showing a first and a second example, respectively, of shot images acquired in the guiding process according to the fourth embodiment of the present invention;

FIG. 38 is a diagram showing table data that can be previously provided in a controller of the electronic appliance according to the fourth embodiment of the present invention;

FIG. 39 is a side view of the power feeding appliance and the electronic appliance arranged apart from each other according to the fourth embodiment of the present invention;

FIG. 40 is a perspective view of the power feeding appliance and the electronic appliance arranged apart from each other according to the fourth embodiment of the present invention;

FIG. 42A to FIG. 42D are diagrams illustrating examples of notifications of the necessary movement direction in relation to the detected position of the mark on shot images according to the fourth embodiment of the present invention;

FIG. 43 is a side view of the power feeding appliance and the electronic appliance, with specific configurations, arranged apart from each other according to the fourth embodiment of the present invention;

FIG. 44 is a diagram illustrating an example of a notification of an adjustment propriety indicator according to the fourth embodiment of the present invention;

FIGS. 45A and 45B are diagrams showing examples of what is displayed in the guiding process according to the fourth embodiment of the present invention.

DESCRIPTION OF EMBODIMENTS

Figure 4:
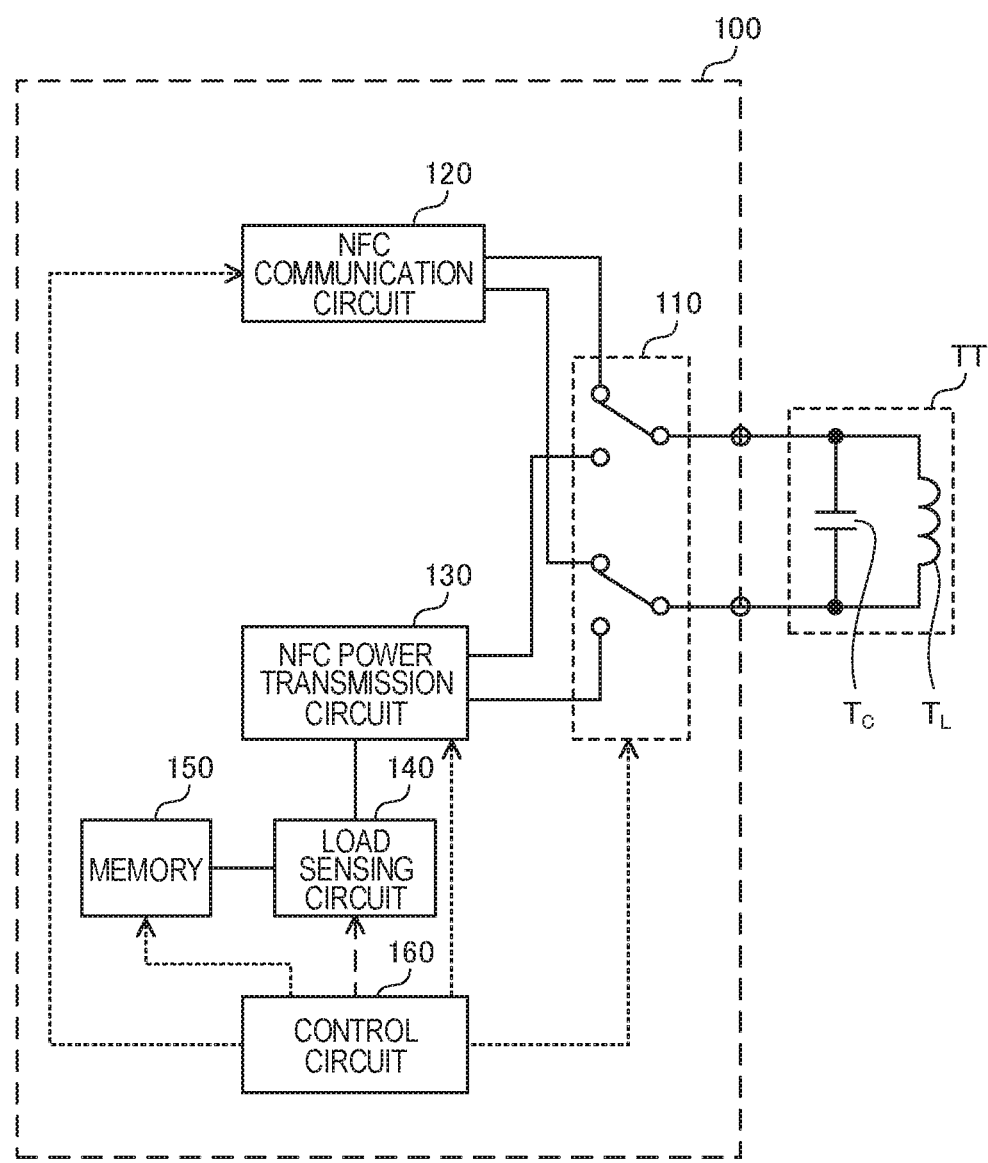
FIG. 4 is a partial configuration diagram of the power feeding appliance, including an internal block diagram of an IC in the power feeding appliance, according to the first embodiment of the present invention.

Embodiments of the present invention will be described specifically below with reference to the accompanying drawings. Among the drawings referred to in the course, the same parts are identified by the same reference numerals, and in principle no overlapping description as to the same parts will be repeated. In the present description, for the sake of simple description, symbols and other designations referring to information, signals, physical quantities, states, components, and the like are occasionally used with the names of the corresponding information, signals, physical quantities, states, components, and the like omitted or abbreviated. In any flow chart referred to later, any plurality of processes in any plurality of steps can be performed in any modified order, or concurrently, so long as they do not conflict with each other.

First Embodiment

A first embodiment of the present invention will be described. FIG. 1A and FIG. 1B are schematic exterior views of a power feeding appliance 1 and an electronic appliance 2 according to the first embodiment of the present invention. While FIG. 1A is an exterior view of the power feeding appliance 1 and the electronic appliance 2 as they are in a detached state, FIG. 1B is an exterior view of the power feeding appliance 1 and the electronic appliance 2 as they are in a regularly placed state. The significance of the detached state and the regularly placed state will be described in detail later. The power feeding appliance 1 and the electronic appliance 2 together constitute a non-contact power feeding system. The power feeding appliance 1 includes a power plug 11 for receiving commercial alternating-current electric power and a power feeding stage 12 formed of a resin material.

FIG. 2 is a schematic internal configuration diagram of the power feeding appliance 1 and the electronic appliance 2. The power feeding appliance 1 includes: an AC-DC converter 13 which generates and outputs, from a commercial alternating-current voltage fed to it via the power plug 11, a direct-current voltage with a predetermined voltage value; a transmission-side IC 100 (hereinafter referred to also as the "IC 100") which is an integrated circuit that operates by using the output voltage of the AC-DC converter 13; and a transmission-side resonance circuit TT (hereinafter referred to also as the "resonance circuit TT") which is connected to the IC 100. The AC-DC converter 13, the transmission-side IC 100, and the resonance circuit TT can be arranged inside the power feeding stage 12. Other than the IC 100, any circuit that operates by using the output voltage of the AC-DC converter 13 can be provided in the power feeding appliance 1.

The electronic appliance 2 includes: a reception-side IC 200 (hereinafter referred to also as the "IC 200") which is an integrated circuit; a reception-side resonance circuit RR (hereinafter referred to also as the "resonance circuit RR") which is connected to the IC 200; a battery 21 which is a secondary battery; and a functional circuit 22 which operates based on the output voltage of the battery 21. As will be described in detail later, the IC 200 can feed charging electric power to the battery 21. The IC 200 may operate by using the output voltage of the battery 21, or may operate based on a voltage from any voltage source other than the battery 21. Instead, a direct-current voltage obtained by rectifying a signal for NFC communication (described in detail later) received from the power feeding appliance 1 may be used as the operating voltage for the IC 200. In that case, even when the battery 21 is depleted of its remaining capacity, the IC 200 can operate.

The electronic appliance 2 may be any electronic appliance, and can be, for example, a mobile telephone (including one classified as a smartphone), personal digital assistant, tablet personal computer, digital camera, MP3 player, pedometer, or Bluetooth (registered trademark) headset. The functional circuit 22 performs the functions to be carried out by the electronic appliance 2. Accordingly, for example, in a case where electronic appliance 2 is a smartphone, the functional circuit 22 includes a telephony processor for conducting telephone communication with a partner device, a communication processor for exchanging information with another device across a network, and the like. For another example, in a case where the electronic appliance 2 is a digital camera, the functional circuit 22 includes a drive circuit for driving an image sensor, an image processing circuit for generating image data from the output signal of the image sensor, and the like. The functional circuit 22 may be taken as a circuit that is provided in a device external to the electronic appliance 2.

As shown in FIG. 3, the resonance circuit TT includes a coil $T_L$, which is a transmission-side coil, and a capacitor $T_C$, which is a transmission-side capacitor; the resonance circuit RR includes a coil $R_L$, which is a reception-side coil, and a capacitor $R_C$, which is a reception-side capacitor. In the following description, for concreteness' sake, unless otherwise stated, it is assumed that the transmission-side coil $T_L$ and the transmission-side capacitor $T_C$ are connected in parallel with each other to form the resonance circuit TT as a parallel resonance circuit, and that the reception-side coil $R_L$ and the reception-side capacitor $R_C$ are connected in parallel with each other to form the resonance circuit RR as a parallel resonance circuit. Instead, the transmission-side coil $T_L$ and the transmission-side capacitor $T_C$ may be connected in series with each other to form the resonance circuit TT as a serial resonance circuit, and the reception-side coil $R_L$ and the reception-side capacitor $R_C$ may be connected in series with each other to form the resonance circuit RR as a serial resonance circuit.

When the electronic appliance 2 is placed in a predetermined region on the power feeding stage 12 as shown in FIG. 1B, between the appliances 1 and 2, communication as well as power transmission and power reception is possible by magnetic field resonance (that is, by utilizing magnetic field resonance). Magnetic field resonance is also known as magnetic field induction or the like.

The communication between the appliances 1 and 2 is wireless communication by NFC communication (near-field communication) (hereinafter referred to as NFC communication), and the frequency of the carrier wave for the communication is 13.56 MHz (megahertz). In the following description, the frequency of 13.56 MHz is referred to as the reference frequency. The NFC communication between the appliances 1 and 2 is conducted by magnetic field resonance utilizing the resonance circuits TT and RR, and thus the resonance frequencies of the resonance circuits TT and RR are both set at the reference frequency. However, as will be described later, the resonance frequency of the resonance circuit RR can be temporarily changed from the reference frequency.

The power transmission and power reception between the appliances 1 and 2 comprise power transmission by NFC from the power feeding appliance 1 to the electronic appliance 2 and power reception by NFC in the electronic appliance 2. Such power transmission and power reception are collectively referred to as NFC power transfer or, simply, power transfer. Through the delivery of electric power from the coil $T_L$ to the coil $R_L$ by magnetic field resonance, power transfer is achieved on a non-contact basis.

In power transfer utilizing magnetic field resonance, passing an alternating current in the transmission-side coil $T_L$ causes an alternating magnetic field at the reference frequency to be generated in the transmission-side coil $T_L$. Then, the alternating magnetic field propagates to the resonance circuit RR which resonates (in other words, resounds) at the reference frequency, and an alternating current passes in the reception-side coil $R_L$. That is, electric power is delivered from the resonance circuit TT including the transmission-side coil $T_L$ to the resonance circuit RR including the reception-side coil $R_L$. In the following description, even though no express mention is made, unless otherwise stated, the magnetic field generated in the coil $T_L$ or $R_L$ in NFC communication or in power transfer is an alternating magnetic field that oscillates at the reference frequency.

A state where the electronic appliance 2 is placed in a predetermined power transmission region on the power feeding stage 12 (the power feeding appliance 1 and the electronic appliance 2 are in a predetermined positional relationship) so that NFC communication and power transfer as mentioned above are possible is called the regularly placed state (see FIG. 1B). On the other hand, a state where the electronic appliance 2 is sufficiently away from the power feeding stage 12 so that NFC communication and power transfer mentioned as above are not possible is called the detached state (see FIG. 1A). Although the power feeding stage 12 shown in FIG. 1A has a flat surface, it may instead have formed in it a depression or the like that fits the shape of the electronic appliance 2 to be placed on it. The regularly placed state can be understood to belong to a state where the electronic appliance 2 is present in a predetermined power transfer region in which power transmission/reception is possible between the power feeding appliance 1 and the electronic appliance 2 (in other words, a region in which to perform power transmission and power reception); the detached state can be understood to belong to a state where the electronic appliance 2 is not present in that power transfer region.

Figure 5:
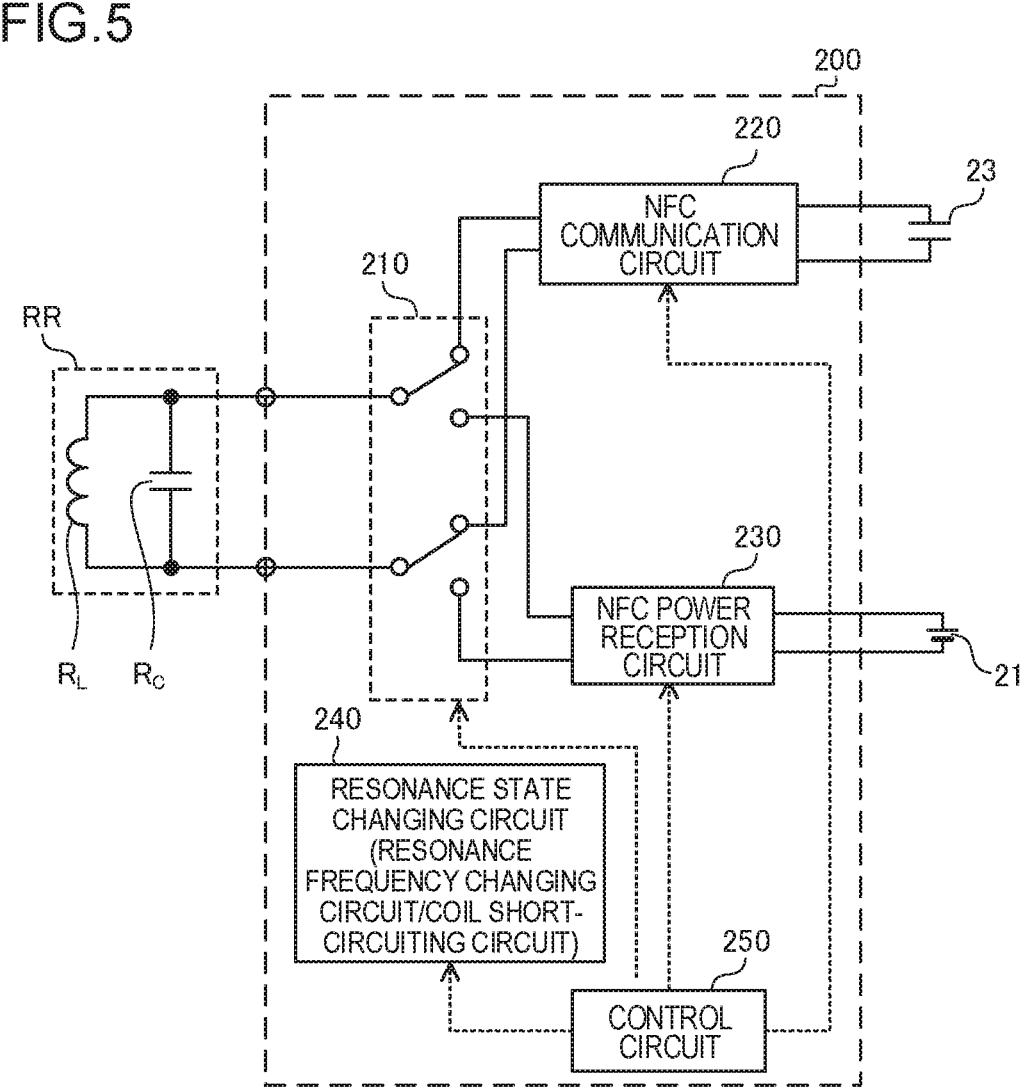
FIG. 5 is a partial configuration diagram of the electronic appliance, including an internal block diagram of an IC in the electronic appliance, according to the first embodiment of the present invention.

FIG. 4 is a partial configuration diagram of the power feeding appliance 1, including an internal block diagram of the IC 100. The IC 100 includes blocks identified by the reference signs 110, 120, 130, 140, 150, and 160. FIG. 5 is a partial configuration diagram of the electronic appliance 2, including an internal block diagram of the IC 200. The IC 200 includes blocks identified by the reference signs 210, 220, 230, 240, and 250. The IC 200 may have connected to it a capacitor 23 which outputs the operating voltage for the IC 200. The capacitor 23 can output a direct-current voltage obtained by rectifying a signal for NFC communication received from the power feeding appliance 1.

A switch circuit 110, under the control of a control circuit 160, connects either an NFC communication circuit 120 or an NFC power transmission circuit 130 to the resonance circuit TT. The switch circuit 110 can comprise a plurality of switches provided between the resonance circuit TT and the circuits 120 and 130. Any switch mentioned in the present description can comprise a semiconductor switching device such as a field-effect transistor.

A switch circuit 210, under the control of a control circuit 250, connects the resonance circuit RR to either an NFC communication circuit 220 or an NFC power reception circuit 230. The switch circuit 210 can comprise a plurality of switches provided between the circuits 220 and 230 and the resonance circuit RR.

A state where the resonance circuit TT is connected via the switch circuit 110 to the NFC communication circuit 120 and in addition the resonance circuit RR is connected via the switch circuit 210 to the NFC communication circuit 220 is called a communication-connected state. In the communication-connected state, NFC communication is possible. In the communication-connected state, the NFC communication circuit 120 can feed an alternating-current signal (alternating-current voltage) at the reference frequency to the resonance circuit TT. The NFC communication between the appliances 1 and 2 is performed by half-duplex operation.

In the communication-connected state, when the power feeding appliance 1 is on the transmitting side, the alternating-current signal that the NFC communication circuit 120 feeds to the resonance circuit TT can be superimposed with any information signal so that the information signal will be transmitted from the coil $T_L$ as a power feeding appliance-side antenna coil and received by the coil $R_L$ as an electronic appliance-side antenna coil. The information signal received by the coil $R_L$ is extracted in the NFC communication circuit 220. In the communication-connected state, when the electronic appliance 2 is on the transmitting side, the NFC communication circuit 220 can transmit any information signal (response signal) from the coil $R_L$ in the resonance circuit RR to the coil $T_L$ in the resonance circuit TT. The transmission here is carried out, as is well known, in conformity with an ISO standard (for example, the ISO 14443 standard), by load modulation which involves varying the impedance of the coil $R_L$ (electronic appliance-side antenna coil) as observed from the coil $T_L$ (power feeding appliance-side antenna coil). The information signal delivered from the electronic appliance 2 is extracted in the NFC communication circuit 120.

A state where the resonance circuit TT is connected via the switch circuit 110 to the NFC power transmission circuit 130 and in addition the resonance circuit RR is connected via the switch circuit 210 to the NFC power reception circuit 230 is called a power feeding-connected state.

In the power feeding-connected state, the NFC power transmission circuit 130 can perform power transmission operation, and the NFC power reception circuit 230 can perform power reception operation. The power transmission operation and the power reception operation together achieve power transfer. In the power transmission operation, the power transmission circuit 130 feeds the resonance circuit TT with a power transmission alternating-current signal (power transmission alternating-current voltage) at the reference frequency to generate a power transmission magnetic field (power transmission alternating magnetic field) at the reference frequency in the transmission-side coil $T_L$; thereby electric power is transmitted from the resonance circuit TT (transmission-side coil $T_L$) to the resonance circuit RR by magnetic field resonance. The electric power received at the reception-side coil $R_L$ as a result of the power transmission operation is fed to the power reception circuit 230, so that, in the power reception operation, the power reception circuit 230 generates and outputs desired direct-current electric power from the receive electric power. With the output power of the power reception circuit 230, the battery 21 can be charged.

Figure 6:
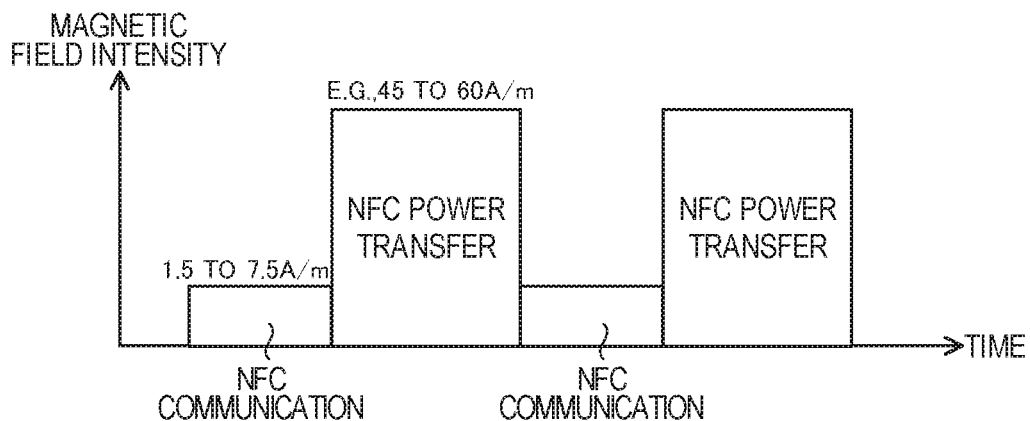
FIG. 6 is a diagram showing how magnetic field intensity changes as NFC communication and power transfer are performed alternately.

Also when NFC communication is performed in the communication-connected state, a magnetic field is generated in the coil $T_L$ or $R_L$; however, the magnetic field intensity in NFC communication falls within a predetermined range. The lower and upper limit values of the range are prescribed in the NFC standard, being 1.5 A/m and 7.5 A/m respectively. By contrast, the intensity of the magnetic field generated in the transmission-side coil $T_L$ in power transfer (that is, in the power transmission operation) (the magnetic field intensity of the power transmission magnetic field) is higher than the just-mentioned upper limit, being, for example, about 45 to 60 A/m. In the non-contact power feeding system including the appliances 1 and 2, NFC communication and power transfer (NFC power transfer) can be performed alternately, and how the magnetic field intensity behaves in such a case is shown in FIG. 6.

Figure 7:
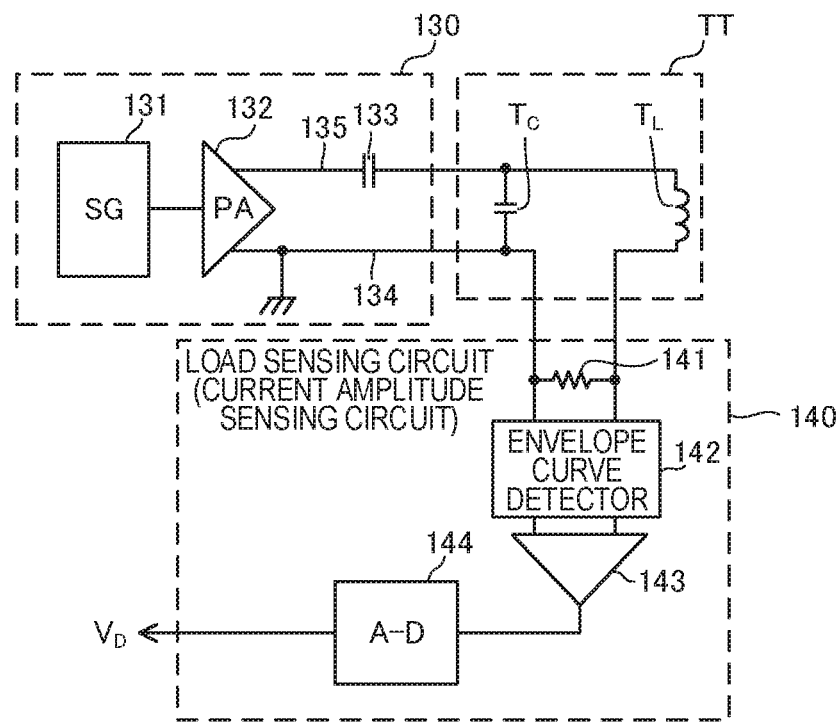
FIG. 7 is a diagram showing the relationship among a power transmission circuit, a load sensing circuit, and a resonance circuit in the power feeding appliance.

A load sensing circuit 140 senses the magnitude of the load of the transmission-side coil $T_L$, that is, the magnitude of the load to the transmission-side coil $T_L$ as observed when the transmission-side coil $T_L$ is fed with an alternating-current signal from the power transmission circuit 130. FIG. 7 shows the relationship among the power transmission circuit 130, the load sensing circuit 140, and the resonance circuit TT in the power feeding-connected state. It should be noted that, in FIG. 7, the switch circuit 110 is omitted from illustration.

The power transmission circuit 130 includes: a signal generator 131 which generates a sine-wave signal at the reference frequency; an amplifier (power amplifier) 132 which amplifies the sine-wave signal generated by the signal generator 131 and which outputs the amplified sine-wave signal between lines 134 and 135 relative to the potential on the line 134; and a capacitor 133. On the other hand, the load sensing circuit 140 includes a sense resistor 141, a envelope curve detector 142, an amplifier 143, and an A-D converter 144. While the signal strength of the sine-wave signal generated by the signal generator 131 is fixed at a constant value, the amplification factor of the amplifier 132 is set variably by the control circuit 160.

One end of the capacitor 133 is connected to the line 135. In the power feeding-connected state, the other end of the capacitor 133 is connected to both one end of the capacitor $T_C$ and one end of the coil $T_L$, and the other end of the coil $T_L$ is connected via the sense resistor 141 to the line 134 and to the other end of the capacitor $T_C$.

Figure 8:
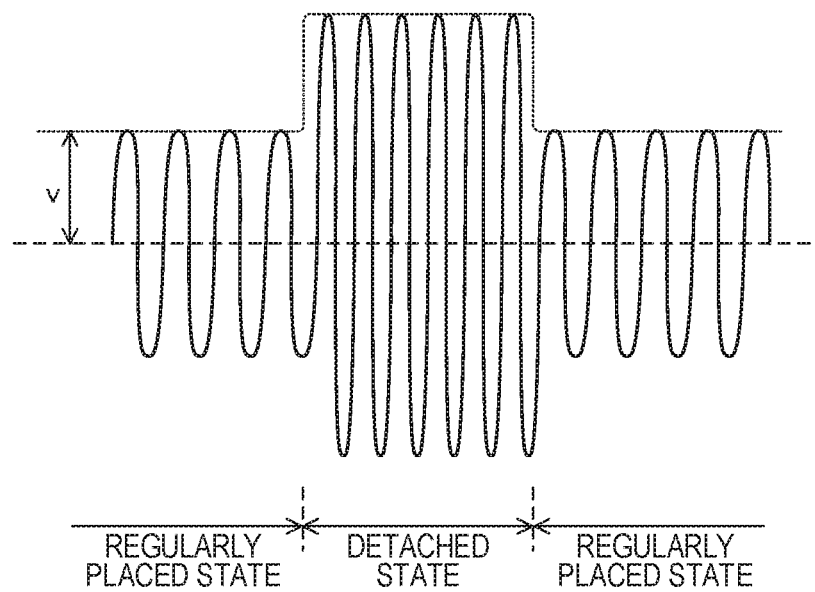
FIG. 8 is a waveform diagram of a voltage drop across a sense resistor in the load sensing circuit in FIG. 7.

The power transmission operation is carried out through the feeding of an alternating-current signal (power transmission alternating-current voltage) from the amplifier 132 via the capacitor 133 to the resonance circuit TT. In the power feeding-connected state, when the alternating-current signal from the amplifier 132 is fed to the resonance circuit TT, an alternating current at the reference frequency passes in the transmission-side coil $T_L$, with the result that an alternating-current voltage drop occurs across the sense resistor 141. In FIG. 8, a solid-line waveform is the voltage waveform of the voltage drop across the sense resistor 141. With respect to the resonance circuit TT, while the intensity of the magnetic field generated in the transmission-side coil $T_L$ is constant, bringing the electronic appliance 2 closer to the power feeding stage 12 causes a current based on the magnetic field generated in the transmission-side coil $T_L$ to pass in the reception-side coil $R_L$; simultaneously, a back electromotive force based on the current passing in the reception-side coil $R_L$ is generated in the transmission-side coil $T_L$, and this back electromotive force acts to reduce the current passing in the transmission-side coil $T_L$. Thus, as shown in FIG. 8, the amplitude of the voltage drop across the sense resistor 141 in the regularly placed state is smaller than that in the detached state.

The envelope curve detector 142 detects the envelope curve of the signal of the voltage drop across the sense resistor 141, and thereby yields an analog voltage signal that is proportional to the voltage v in FIG. 8. The amplifier 143 amplifies and then yields the output signal of the envelope curve detector 142. The A-D converter 144 coverts the output voltage signal of the amplifier 143 into a digital signal, and thereby yields a digital voltage value $V_D$. As will be understood from what has been discussed, the voltage value $V_D$ has a value that is proportional to the amplitude of the current passing in the sense resistor 141 (hence, the amplitude of the current passing in the transmission-side coil $T_L$) (as the amplitude increases, the voltage value $V_D$ increases). Accordingly, the load sensing circuit 140 can be taken as a current amplitude sensing circuit which senses the amplitude of the current passing in the transmission-side coil $T_L$, and its sensed amplitude value can be taken as the voltage value $V_D$. The envelope curve detector 142 may be provided in the stage succeeding the amplifier 143. However, providing the envelope curve detector 142 in the stage preceding the amplifier 143 as shown in FIG. 7 is more advantageous because it is then possible to adopt, as the amplifier 143, one with lower response at high frequencies.

Seen from the transmission-side coil $T_L$, which generates a magnetic field, a coil, like the reception-side coil $R_L$, that magnetically couples with the transmission-side coil $T_L$ can be taken as a load; thus, depending on the magnitude of the load, the sensing value of the load sensing circuit 140, namely the voltage value $V_D$, varies. Thus, the load sensing circuit 140 can be taken as sensing the magnitude of the load by outputting the voltage value $V_D$. Here, the magnitude of the load can be said to be the magnitude of the load to the transmission-side coil $T_L$ during power transmission, or can be said to be the magnitude of the load of the electronic appliance 2 as observed from the power feeding appliance 1 during power transmission. The sense resistor 141 may be provided inside the IC 100, or may be provided outside the IC 100.

A memory 150 (see FIG. 4) comprises a non-volatile memory, and stores any information on a non-volatile basis. The control circuit 160 controls the operation of the individual blocks in the IC 100 in a comprehensive manner. The control performed by the control circuit 160 includes, for example: controlling the switching operation of the switch circuit 110, controlling what to perform in, and whether or not to perform, the communication operation and power transfer operation by the communication circuit 120 and the power transmission circuit 130; controlling the operation of the load sensing circuit 140; and controlling writing to and reading from the memory 150. The control circuit 160 incorporates a timer (unillustrated), and can count the length of time between any time points.

In the electronic appliance 2, a resonance state changing circuit 240 (see FIG. 5) is a resonance frequency changing circuit which can change the resonance frequency of the resonance circuit RR from the reference frequency to another predetermined frequency $f_M$ or a coil short-circuiting circuit which can short-circuit the reception-side coil $R_L$ in the resonance circuit RR.

FIG. 9 shows a resonance frequency changing circuit 240A as an example of a resonance frequency changing circuit as the resonance state changing circuit 240. The resonance frequency changing circuit 240A includes a serial circuit of a capacitor 241 and a switch 242. One end of the serial circuit is connected to both one end of the capacitor $R_C$ and one end of the coil $R_L$. The other end of the serial circuit is connected to both the other end of the capacitor $R_C$ and the other end of the coil $R_L$. The switch 242 is turned ON or OFF under the control of the control circuit 250. When the switch 242 is OFF, the capacitor 241 is disconnected from the capacitor $R_C$ and the coil $R_L$; thus, if the parasitic inductance and the parasitic capacitance are ignored, the resonance circuit RR is composed only of the coil $R_L$ and the capacitor $R_C$, and the resonance frequency of the resonance circuit RR equals the reference frequency. That is, when the switch 242 is OFF, the reception-side capacitance which determines the resonance frequency of the resonance circuit RR is that of the capacitor $R_C$ itself. When the switch 242 is ON, the capacitor 241 is connected in parallel with the capacitor $R_C$; thus, the resonance circuit RR is composed of the coil $R_L$ and the combined capacitance of the capacitors $R_C$ and 241. As a result, the resonance frequency of the resonance circuit RR equals a frequency $f_M$ lower than the reference frequency. That is, when the switch 242 is ON, the reception-side capacitance which determines the resonance frequency of the resonance circuit RR equals the just-mentioned combined capacitance. Here, it is assumed that the frequency $f_M$ is deviated from the reference frequency in such a degree that, when the switch 242 is ON, the resonance circuit RR does not act as a load to the transmission-side coil $T_L$ (that is, in such a degree that no sufficient magnetic resonance occurs between the resonance circuits TT and RR). For example, the resonance frequency of the resonance circuit RR with the switch 242 ON (that is, the frequency $f_M$) is set at several hundred kilohertz to one megahertz.

So long as the resonance frequency of the resonance circuit RR can be changed to the frequency $f_M$, the resonance frequency changing circuit as the changing circuit 240 is not limited to the resonance frequency changing circuit 240A; the frequency $f_M$ may be higher than the reference frequency. For example, the resonance frequency changing circuit may be a circuit that switches the path between the coil $R_L$ and the capacitor $R_C$ between a connected and a disconnected state by turning ON and OFF a switch inserted in series in the current loop connecting the coil $R_L$ and the capacitor $R_C$ together (in the disconnected state, the coil $R_L$ combined with the parasitic capacitance of the wiring and the like determines the resonance frequency (>>the reference frequency) of the resonance circuit RR). Thus, with consideration given to the possibility of the reception-side resonance circuit RR being a serial resonance circuit, the following can be said: the reception-side resonance circuit RR includes a parallel or serial circuit of the reception-side coil ($R_L$) and the reception-side capacitance, and when the reception-side capacitance equals a predetermined reference capacitance, the resonance frequency $f_O$ of the reception-side resonance circuit RR equals the reference frequency. The resonance frequency changing circuit can, as necessary, increase or decrease the reception-side capacitance from the reference capacitance. Thus, in the reception-side resonance circuit RR, the reception-side coil ($R_L$) along with the reception-side capacitance that is higher or lower than the reference capacitance forms a parallel or serial circuit, with the result that the resonance frequency $f_O$ of the reception-side resonance circuit RR is changed from the reference frequency.

FIG. 10 shows a coil short-circuiting circuit 240B as an example of a coil short-circuiting circuit as the resonance state changing circuit 240. The coil short-circuiting circuit 240B comprises a switch 243 connected (inserted) between the node at which one end of the capacitor $R_C$ and one end of the coil $R_L$ are connected together in the resonance circuit RR and the node at which the other end of the capacitor $R_C$ and the other end of the coil $R_L$ are connected together in the resonance circuit RR. The switch 243 is turned ON or OFF under the control of the control circuit 250. When the switch 243 is ON, the coil $R_L$ in the resonance circuit RR is short-circuited (more precisely, the coil $R_L$ is short-circuited across its terminals). With the reception-side coil $R_L$ short-circuited, the reception-side resonance circuit RR is no longer present (a state that is equivalent to a state where no reception-side resonance circuit RR is present comes into effect). Accordingly, with the reception-side coil $R_L$ short-circuited, the load to the transmission-side coil $T_L$ is sufficiently light (that is, a state as if no electronic appliance 2 were present on the power feeding stage 12 comes into effect). So long as the reception-side coil $R_L$ can be short-circuited, the coil short-circuiting circuit as the changing circuit 240 is not limited to the coil short-circuiting circuit 240B.

In the following description, the operation of changing the resonance frequency $f_O$ of the reception-side resonance circuit RR from the reference frequency to the predetermined frequency $f_M$ is called resonance frequency changing operation, and the operation of short-circuiting the reception-side coil $R_L$ by use of the coil short-circuiting circuit is called coil short-circuiting operation. For simplicity's sake, resonance frequency changing operation or coil short-circuiting operation is occasionally referred to as $f_O$ changing/short-circuiting operation.

The control circuit 250 (see FIG. 5) controls the operation of the individual blocks in the IC 200 in a comprehensive manner. The control performed by the control circuit 250 includes, for example: controlling the switching operation of the switch circuit 210; controlling what to perform in, and whether or not to perform, the communication operation and power reception operation by the communication circuit 220 and the power reception circuit 230; and controlling the operation of the changing circuit 240. The control circuit 250 incorporates a timer (unillustrated), and can count the length of time between any time points. For example, the timer in the control circuit 250 can count the time for which the resonance frequency $f_O$ is kept changed to the predetermined frequency $f_M$, or the time for which the reception-side coil $R_L$ is kept short-circuited, by the $f_O$ changing/short-circuiting operation (that is, it can count the time $T_M$ mentioned later; see step S207 in FIG. 19).

The control circuit 160 in the power feeding appliance 1 can judge the presence or absence of a foreign object on the power feeding stage 12 and control the power transmission circuit 130 to perform the power transmission operation only when no foreign object is present. In this embodiment, a foreign object includes an object which differs from the electronic appliance 2 or its constituent elements (such as the reception-side coil $R_L$) and in addition in which, when it is brought close to the power feeding appliance 1, an electric current (an electric current inside the foreign object) can be generated based on the magnetic field generated in the transmission-side coil $T_L$. In this embodiment, the presence of a foreign object can be understood to denote the presence of a foreign object at a position where a non-negligible electric current based on the magnetic field generated in the transmission-side coil $T_L$ passes in the foreign object. The electric current that passes in the foreign object based on the magnetic field generated in the transmission-side coil $T_L$ generates an electromotive force (or back electromotive force) in a coil (such as $T_L$ or $R_L$) located opposite and coupled with the foreign object; thus, it can exert a non-negligible effect on the characteristics of the circuit that includes that coil.

FIG. 11A is a schematic exterior view of a foreign object 3 as a kind of foreign object, and FIG. 11B is a schematic internal configuration diagram of the foreign object 3. The foreign object 3 includes: a resonance circuit JJ comprising a parallel circuit of a coil $J_L$ and a capacitor $J_C$; and a foreign object internal circuit 300 connected to the resonance circuit JJ. The resonance frequency of the resonance circuit JJ is set at the reference frequency. Unlike the electronic appliance 2, the foreign object 3 is a device that is incompatible with the power feeding appliance 1. For example, the foreign object 3 is an object (such as a non-contact IC card) fitted with a wireless IC tag including a 13.56 MHz antenna coil (coil $J_L$) that does not respond to NFC communication. For another example, the foreign object 3 is an electronic appliance that does have an NFC communication function itself but has it disabled. For example, a smartphone that has an NFC communication function but has it turned off by a software setting can be a foreign object 3. Even a smartphone that has an NFC communication function enabled, if it does not have a power reception function, is classified as a foreign object 3.

In a state where a foreign object 3 as mentioned above is placed on the power feeding stage 12, if the power feeding appliance 1 performs the power transmission operation, the strong magnetic field generated by the transmission-side coil $T_L$ (for example, a magnetic field with a magnetic field intensity of 12 A/m or more) may damage the foreign object 3. For example, the strong magnetic field in the power transmission operation can raise the terminal voltage of the coil $J_L$ in the foreign object 3 on the power feeding stage 12 to as high as 100 V to 200 V, and if the foreign object 3 is not designed to withstand such a high voltage, it is damaged.

[pFOD Process (pFOD Process Before Power Transfer)]

Figure 12:
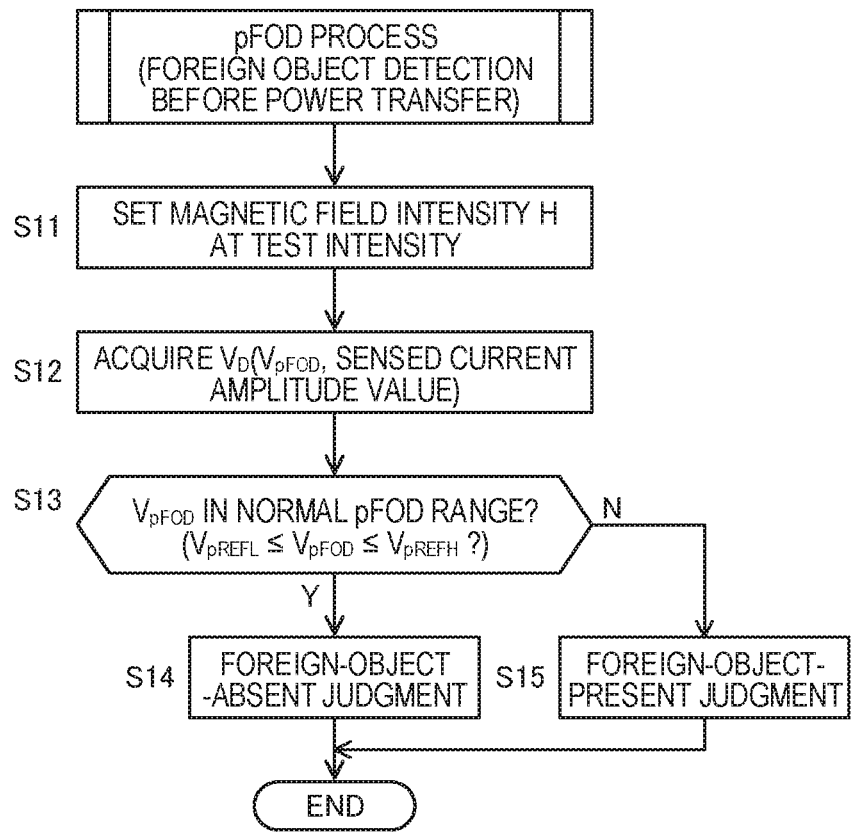
FIG. 12 is an operation flow chart of a pFOD process performed in the power feeding appliance.

With reference to FIG. 12, a foreign object detection process for detecting the presence or absence of a foreign object will be described. FIG. 12 is a flow chart of the foreign object detection process performed by the power feeding appliance 1 before power transfer (hereinafter referred to as the pFOD process).

When the pFOD process is performed, the power transmission circuit 130 is connected to the resonance circuit TT. In the pFOD process, first, at step S11, the control circuit 160 sets the magnetic field intensity H attributable to the transmission-side coil $T_L$ at a predetermined test intensity The magnetic field intensity H is the magnetic field intensity of the magnetic field generated in the transmission-side coil $T_L$, and more precisely it is the magnetic field intensity of the alternating magnetic field generated by the transmission-side coil $T_L$ and oscillating at the reference frequency. Setting the magnetic field intensity H at the test intensity means controlling the power transmission circuit 130 such that a predetermined test alternating-current signal (test alternating-current voltage) is fed to the resonance circuit TT to make the transmission-side coil $T_L$ generate a test magnetic field which is an alternating magnetic field having the test intensity and oscillating at the reference frequency. The test intensity, which is the magnetic field intensity of the test magnetic field, is significantly lower than the intensity of the magnetic field generated in the transmission-side coil $T_L$ in power transfer (that is, in the power transmission operation) (that is, the magnetic field intensity of the power transmission magnetic field; for example, 45 to 60 A/m), and falls within the range between the lower limit value, 1.5 A/m, and the upper limit value, 7.5 A/m, of communication magnetic field intensity. Thus, there is no or almost no danger of the test magnetic field damaging or otherwise affecting the foreign object 3. The control circuit 160 can, by controlling the amplification factor of the amplifier 132 (see FIG. 7), variably set the magnetic field intensity H. The amplification factor of the amplifier 132 can be controlled such that, when the test magnetic field is to be generated, a predetermined test alternating-current voltage is fed and applied to the resonance circuit TT and that, when the power transmission magnetic field is to be generated, a predetermined power transmission alternating-current voltage with an amplitude larger than that of the test alternating-current voltage is fed and applied to the resonance circuit TT.

Subsequently to step S11, at step S12, by using the load sensing circuit 140, the control circuit 160 acquires, as a sensed current amplitude value $V_{pFOD}$, the voltage value $V_D$ as observed when the test magnetic field is being generated. The sensed current amplitude value $V_{pFOD}$ has a value commensurate with the amplitude of the current passing in the transmission-side coil $T_L$ when the test magnetic field is being generated in the transmission-side coil $T_L$. During the period in which the pFOD process is performed, according to an instruction from the power feeding appliance 1 via NFC communication, the $f_O$ changing/short-circuiting operation (resonance frequency changing operation or coil short-circuiting operation) is performed in the electronic appliance 2. Accordingly, the resonance circuit RR (reception-side coil $R_L$) generally does not act as a load to the transmission-side coil $T_L$, and thus causes no or almost no decrease in the sensed current amplitude value $V_{pFOD}$.

Subsequently to step S12, at step S13, the control circuit 160 checks whether or not the sensed current amplitude value $V_{pFOD}$ falls within a predetermined normal pFOD range. If the sensed current amplitude value $V_{pFOD}$ falls within the normal pFOD range, the control circuit 160 judges that no foreign object 3 is present on the power feeding stage 12 (step S14). This judgment is referred to as a foreign-object-absent judgment. On the other hand, if the sensed current amplitude value $V_{pFOD}$ falls outside the normal pFOD range, the control circuit 160 judges that a foreign object 3 is present on the power feeding stage 12 (step S15). This judgment is referred to as a foreign-object-present judgment. On making a foreign-object-absent judgement, the control circuit 160 recognizes that the power transmission operation by the power transmission circuit 130 is permissible, and permits the power transmission circuit 130 to perform the power transmission operation (power transmission using the resonance circuit TT); on making a foreign-object-present judgment, the control circuit 160 recognizes that the power transmission operation by the power transmission circuit 130 is not permissible, and inhibits the power transmission circuit 130 from performing the power transmission operation. When it is judged that the power transmission operation is permissible, in the power transmission operation, the control circuit 160 can control the power transmission circuit 130 such that a predetermined power transmission magnetic field is generated in the transmission-side coil $T_L$.

The normal pFOD range is a range of values equal to or larger than a predetermined lower limit value $V_{pREFL}$ but equal to or smaller than a predetermined upper limit value $V_{pREFH}$ ($0<V_{pREFL}<V_{pREFH}$). Accordingly, when the check inequality "$V_{pREFL} \le V_{pFOD} \le V_{pREFH}$" is satisfied, a foreign-object-absent judgment is made, and otherwise a foreign-object-present judgment is made.

When the pFOD process is performed, if a foreign object 3 is present on the power feeding stage 12, the resonance circuit JJ (coil $J_L$) in the foreign object 3 acts as a load to the transmission-side coil $T_L$, with the result that a decrease is observed in the sensed current amplitude value $V_{pFOD}$ as compared with when no foreign object 3 is present on the power feeding stage 12.

A foreign object can be a foreign object 3a (unillustrated) different from the foreign object 3. The foreign object 3a is, for example, a metal body containing aluminum (a foil or sheet of aluminum) or a metal body containing copper.

When the pFOD process is performed, if a foreign object 3a is present on the power feeding stage 12, due to electric and magnetic effects, an increase is observed in the sensed current amplitude value $V_{pFOD}$ as compared with when no foreign object 3a is present on the power feeding stage 12.

The lower limit value $V_{pREFL}$ and the upper limit value $V_{pREFH}$ are set beforehand through experiments or the like and stored in the memory 150 such that, before power transfer is performed: if a foreign object 3 is present on the power feeding stage 12, the sensed current amplitude value $V_{pFOD}$ is lower than the lower limit value $V_{pREFL}$; if a foreign object 3a is present on the power feeding stage 12, the sensed current amplitude value $V_{pFOD}$ is higher than the upper limit value $V_{pREFH}$; and if no foreign object (3 or 3a) is present on the power feeding stage 12, the sensed current amplitude value $V_{pFOD}$ falls within the normal pFOD range.

When a power transmission magnetic field is generated with a foreign object 3a present on the power feeding stage 12, the foreign object 3a may absorb electric power and heat up. In this embodiment, where the reference frequency as the carrier frequency for power transfer is assumed to be 13.56 MHz, it can be said that no such heating-up is likely. Accordingly, it is also possible, with no consideration given to the presence of the foreign object 3a, to make a foreign-object-present judgment only if the sensed current amplitude value $V_{pFOD}$ is lower than the lower limit value $V_{pREFL}$ and to make a foreign-object-absent judgment always if the sensed current amplitude value $V_{pFOD}$ is equal to or higher than the lower limit value $V_{pREFL}$ (that is, the upper limit value $V_{pREFH}$ may be omitted). However, in the invention according to this embodiment, the reference frequency is not limited to 13.56 MHz; when the reference frequency is set at, for example, about several hundred kilohertz, the foreign object 3a is likely to heat up, and therefore it is preferable to adopt the previously described method in which the normal pFOD range is defined by not only the lower limit value $V_{pREFL}$ but also the upper limit value $V_{pREFH}$.

Figure 13:
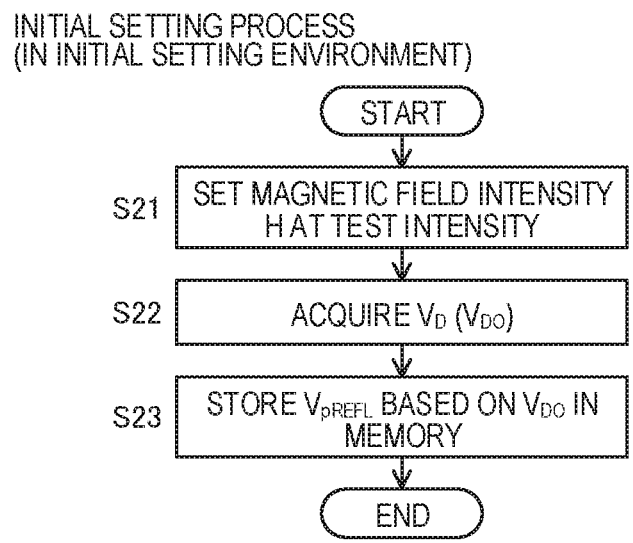
FIG. 13 is an operation flow chart of an initial setting process performed in the power feeding appliance.

An additional description will now be given of how the lower limit value $V_{pREFL}$ is determined. The lower limit value $V_{pREFL}$ is determined in an initial setting process. FIG. 13 is an operation flow chart of the initial setting process. The initial setting process is performed by the IC 100 in an initial setting environment as described below. In the initial setting environment, the load (including a coil that magnetically couples with the transmission-side coil $T_L$) to the transmission-side coil $T_L$ is null or negligibly small, and no object in which an electric current can be generated by the magnetic field generated in the transmission-side coil $T_L$ is present except the components of the power feeding appliance 1. The detached state in FIG. 1A can be taken as satisfying the initial setting environment. To secure an initial setting environment, the initial setting process can be performed, for example, at the time of manufacture, shipment, or the like of the power feeding appliance 1. So long as an initial setting environment can be secured, the initial setting process can be performed at any time.

When the initial setting process is performed, the power transmission circuit 130 is connected to the resonance circuit TT. Then, at step S21, the magnetic field intensity H attributable to the transmission-side coil $T_L$ is set at a predetermined test intensity. Subsequently, at step S22, the voltage value $V_D$ as obtained from the A-D converter 144 with that setting is acquired as a voltage value $V_{DO}$. Thereafter, at step S23, a lower limit value $V_{pREFL}$ based on the voltage value $V_{DO}$ is stored in the memory 150. The lower limit value $V_{pREFL}$ is set at a value lower than the voltage value $V_{DO}$ so that, only when a foreign object 3 is present, the pFOD process yields a foreign-object-present judgment. For example, the setting may be such that "$V_{pREFL}=V_{DO}-\Delta V$" or "$V_{pREFL}=V_{DO}\times k$". Here, $\Delta V$ is a predetermined positive minute value (it may also be that $\Delta V=0$); k represents a coefficient with a predetermined positive value smaller than 1. The voltage value $V_D$ that is expected to be obtained when the magnetic field intensity H is set at a predetermined test intensity in the initial setting environment can be estimated at the stage of designing. Based on the value derived from the estimation, it is possible, without performing the initial setting process, to determine the lower limit value $V_{pREFL}$ and store it in the memory 150.

With reference to FIG. 14A to FIG. 14D, a first to a fourth case related to the detection of a foreign object 3 will be considered. In the first case, only the electronic appliance 2 is present on the power feeding stage 12. In the second case, the electronic appliance 2 and a foreign object 3 are present on the power feeding stage 12. In the third case, only a foreign object 3 is present on the power feeding stage 12. In the fourth case, neither the electronic appliance 2 nor a foreign object 3 is present on the power feeding stage 12.

As mentioned earlier, during the period in which the pFOD process is performed, the $f_O$ changing/short-circuiting operation is performed in the electronic appliance 2. Thus, in the first case, the load to the transmission-side coil $T_L$ is sufficiently light (a state as if no electronic appliance 2 were present on the power feeding stage 12), and the sensed current amplitude value $V_{pFOD}$ is sufficiently large, so that a foreign-object-absent judgment is made. On the other hand, in the second case, though the resonance frequency of the resonance circuit RR is changed to the above-mentioned frequency $f_M$, or the reception-side coil $R_L$ is short-circuited, the foreign object 3 remains a load to the transmission-side coil $T_L$ (the resonance frequency of the resonance circuit JJ in the foreign object 3 remains at the reference frequency), and thus the sensed current amplitude value $V_{pFOD}$ is sufficiently small, so that a foreign-object-present judgment is made.

In the third and fourth cases, no electronic appliance 2 that responds to NFC communication is present on the power feeding stage 12, and thus in the first place, no power transmission operation is necessary; accordingly, the pFOD process itself is not performed. The power feeding appliance 1 can, by NFC communication, check whether or not an electronic appliance 2 compatible with power transfer is present on the power feeding stage 12. A state where a foreign object 3 is present on the power feeding stage 12 is not limited to a state where the foreign object 3 is in direct contact with the power feeding stage 12. For example, as shown in FIG. 15, a state where the electronic appliance 2 is present on the power feeding stage 12 in direct contact with it and a foreign object 3 is present on the electronic appliance 2 also counts, so long as a foreign-object-present judgment is made, as a state where a foreign object 3 is present on the power feeding stage 12.

[Signal Exchange Before Power Transfer, FIG. 16]

With reference to FIG. 16, the exchange of signals between the appliances 1 and 2 before power transfer is performed will be described. Unless otherwise stated, the following description assumes that the electronic appliance 2 is present on the power feeding stage 12 in the regularly placed state (FIG. 1B).

First, with the power feeding appliance 1 on the transmitting side and the electronic appliance 2 on the receiving side, the power feeding appliance 1 (IC 100) transmits an inquiry signal 510 to a device on the power feeding stage 2 (hereinafter referred to also as the power feeding target appliance) by NFC communication. The power feeding target appliance includes the electronic appliance 2, and can include a foreign object 3. The inquiry signal 510 includes, for example, a signal inquiring individual identification information of the power feeding target appliance, a signal inquiring whether or not the power feeding target appliance is in a state enabled to perform NFC communication, and a signal inquiring whether or not the power feeding target appliance can receive electric power or is requesting transmission of electric power.

On receiving the inquiry signal 510, the electronic appliance 2 (IC 200) transmits a response signal 520 responding to the inquiry of the inquiry signal 510 to the power feeding appliance 1 by NFC communication. On receiving the response signal 520, the power feeding appliance 1 (IC 100) analyzes the response signal 520, and if the power feeding target appliance is enabled to perform NFC communication and in addition it can receive electric power or is requesting transmission of electric power, the power feeding appliance 1 (IC 100) transmits a test request signal 530 to the power feeding target appliance by NFC communication. On receiving the test request signal 530, the electronic appliance 2 (IC 200) as the power feeding target appliance transmits a response signal 540 responding to the test request signal 530 to the power feeding appliance 1 by NFC communication, and then promptly performs the $f_O$ changing/short-circuiting operation (resonance frequency changing operation or coil short-circuiting operation). The test request signal 530 is, for example, a signal requesting and indicating the execution of the $f_O$ changing/short-circuiting operation, and when triggered by the reception of the test request signal 530, the control circuit 250 in the electronic appliance 2 makes the resonance state changing circuit 240 perform the $f_O$ changing/short-circuiting operation. Before the reception of the test request signal 530, the $f_O$ changing/short-circuiting operation remains unperformed. The test request signal 530 may be any signal so long as it can trigger the execution of the $f_O$ changing/short-circuiting operation, and may be contained in the inquiry signal 510.

On receiving the response signal 540, the power feeding appliance 1 (IC 100) performs the above-described pFOD process. During the period in which the pFOD process is performed, the electronic appliance 2 (IC 200) continues performing the $f_O$ changing/short-circuiting operation. Specifically, the electronic appliance 2 (IC 200), by using an incorporated timer, continues performing the $f_O$ changing/short-circuiting operation for a time corresponding to the length of the period for which the pFOD process is performed, and then stops the $f_O$ changing/short-circuiting operation.

In the pFOD process, if it is judged that no foreign object is present on the power feeding stage 12, the power feeding appliance 1 (IC 100) transmits a verification signal 550 to the power feeding target appliance by NFC communication. The verification signal 550 includes, for example, a signal notifying the power feeding target appliance of the forthcoming power transmission. On receiving the verification signal 550, the electronic appliance 2 (IC 200) transmits a response signal 560 responding to the verification signal 550 to the power feeding appliance 1 by NFC communication. The response signal 560 includes, for example, a signal notifying recognition of what is conveyed by the verification signal 550 or a signal giving permission to what is conveyed by the verification signal 550. On receiving the response signal 560, the power feeding appliance 1 (IC 100) connects the power transmission circuit 130 to the resonance circuit TT to perform the power transmission operation, and thus power transfer 570 is achieved.

In the first case in FIG. 14A, power transfer 570 is performed through the procedure described above. However, in the second case in FIG. 14B, although the procedure proceeds up to the transmission and reception of the response signal 540, in the pFOD process, it is judged that a foreign object is present on the power feeding stage 12; thus, no power transfer 570 is performed. A single session of power transfer 570 may be performed for a predetermined time. The sequence of operation from the transmission of the inquiry signal 510 to power transfer 570 may be performed repeatedly. In practice, as shown in FIG. 17, NFC communication, a pFOD process, and power transfer (NFC power transfer) can be performed sequentially and repeatedly. That is, in the non-contact power feeding system, operation for performing NFC communication, operation for performing a pFOD process, and operation for performing power transfer (NFC power transfer) can be performed sequentially and repeatedly on a time-division basis.

[Operation Flow Chart of a Power Feeding Appliance and an Electronic Appliance]

Figure 18:
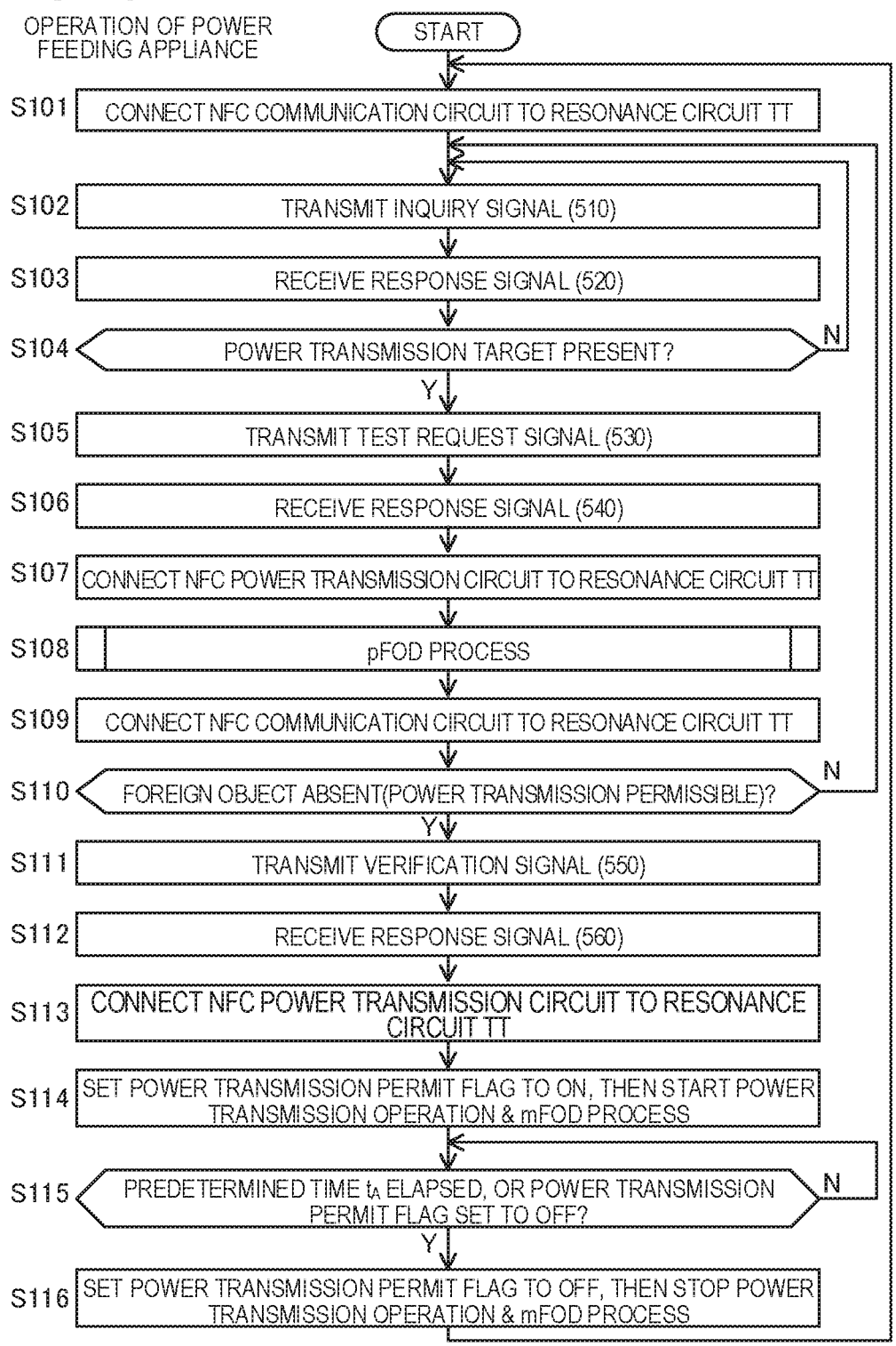
FIG. 18 is an operation flow chart of the power feeding appliance according to the first embodiment of the present invention.

Next, the flow of the operation of the power feeding appliance 1 will be described. FIG. 18 is an operation flow chart of the power feeding appliance 1. The operation of the communication circuit 120 and the power transmission circuit 130 is performed under the control of the control circuit 160.

When the power feeding appliance 1 starts up, first, at step S101, the control circuit 160 controls the switch circuit 110 such that the communication circuit 120 is connected to the resonance circuit TT. Subsequently, at step S102, the control circuit 160 transmits an inquiry signal 510 to the power feeding target appliance by NFC communication using the communication circuit 120 and the resonance circuit TT, and then, at step S103, the control circuit 160 waits for the reception of a response signal 520. When the communication circuit 120 receives the response signal 520, the control circuit 160 analyzes the response signal 520, and if the power feeding target appliance is enabled to perform NFC communication and in addition it can receive electric power or is requesting transmission of electric power, it is judged that a power transmission target is present (step S104, Y), and an advance is made to step S105; otherwise (step S104, N), a return is made to step S102.

At step S105, the control circuit 160 transmits a test request signal 530 to the power feeding target appliance by NFC communication using the communication circuit 120 and the resonance circuit TT, and then, at step S106, the control circuit 160 waits for the reception of a response signal 540. When the communication circuit 120 receives the response signal 540, then, at step S107, the control circuit 160 controls the switch circuit 110 such that the power transmission circuit 130 is connected to the resonance circuit TT, and subsequently, at step S108, the control circuit 160 performs the above-described pFOD process.

After the pFOD process, at step S109, the control circuit 160 controls the switch circuit 110 such that the communication circuit 120 is connected to the resonance circuit TT, and an advance is made to step S110. If, in the pFOD process at step S108, a foreign-object-present judgment has been made, a return is made from step S110 to step S102; if a foreign-object-absent judgment has been made, an advance is made from step S110 to step S111.

At step S111, the control circuit 160 transmits a verification signal 550 to the power feeding target appliance by NFC communication using the communication circuit 120 and the resonance circuit TT, and then, at step S112, the control circuit 160 waits for the reception of a response signal 560. When the communication circuit 120 receives the response signal 560, then, at step S113, the control circuit 160 controls the switch circuit 110 such that the power transmission circuit 130 is connected to the resonance circuit TT, and an advance is made to step S114.

At step S114, the control circuit 160 sets a power transmission permit flag to ON, and starts power transmission operation and an mFOD process, and then an advance is made to step S115. As will be described in detail later, through the mFOD process, the presence or absence of a foreign object during power transfer is detected, and if a foreign object is detected, the power transmission permit flag is turned to OFF. The control circuit 160 counts the time that has elapsed from the start of the power transmission operation, and, at step S115, the control circuit 160 compares the time elapsed with a predetermined time $t_A$ (for example, 10 minutes) and checks the status of the power transmission permit flag. When the time elapsed reaches the predetermined time $t_A$, or when through the mFOD process the power transmission permit flag is set to OFF, an advance is made to step S116. At step S116, the control circuit 160 turns the power transmission permit flag from ON to OFF, or keeps the power transmission permit flag set to OFF, and stops the power transmission operation and the mFOD process; a return is then made to step S101.

Figure 19:
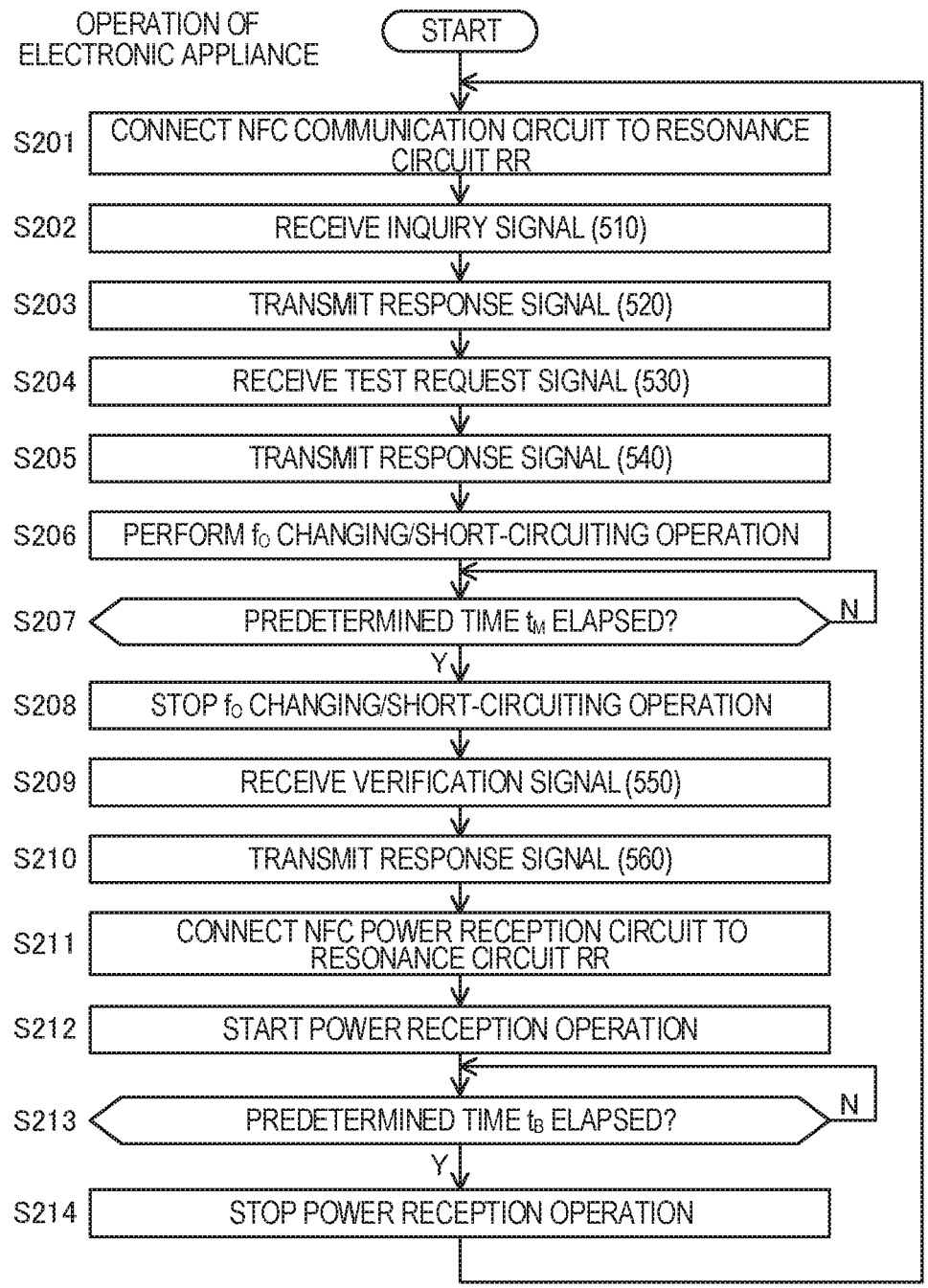
FIG. 19 is an operation flow chart of the electronic appliance in coordination with the operation in FIG. 18.

Next, the flow of the operation of the electronic appliance 2 will be described. FIG. 19 is an operation flow chart of the electronic appliance 2, and the procedure starting at step S201 is performed in coordination with the operation of the power feeding appliance 1 shown in FIG. 18. The operation of the communication circuit 220 and the power reception circuit 230 is performed under the control of the control circuit 250.

When the electronic appliance 2 starts up, first, at step S201, the control circuit 250 controls the switch circuit 210 such that the communication circuit 220 is connected to the resonance circuit RR. When the electronic appliance 2 starts up, the $f_O$ changing/short-circuiting operation remains unperformed. Subsequently, at step S202, the control circuit 250, by using the communication circuit 220, waits for the reception of an inquiry signal 510. When the communication circuit 220 receives the inquiry signal 510, then, at step S203, the control circuit 250 analyzes the inquiry signal 510 to generate a response signal 520, and transmits the response signal 520 to the power feeding appliance 1 by NFC communication using the communication circuit 220. At this point, the control circuit 250 checks the condition of the battery 21, and if the battery 21 is not in a fully charged state and in addition the battery 21 does not exhibit any abnormality, the control circuit 250 includes in the response signal 520 a signal indicating readiness to receive electric power or requesting transmission of electric power. On the other hand, if the battery 21 is in a fully charged state or the battery 21 exhibits an abnormality, the control circuit 250 includes in the response signal 520 a signal indicating unreadiness to receive electric power.

Thereafter, when, at step S204, the test request signal 530 is received by the communication circuit 220, an advance is made to step S205. At step S205, the control circuit 250 transmits a response signal 540 to the power feeding appliance 1 by NFC communication using the communication circuit 220, and subsequently, at step S206, the control circuit 250, by using the resonance state changing circuit 240, performs the $f_O$ changing/short-circuiting operation. Specifically, the control circuit 250 changes the resonance frequency $f_O$ from the reference frequency to the frequency $f_M$, or short-circuits the reception-side coil $R_L$. The control circuit 250 counts the time that elapses after the start of the execution of the $f_O$ changing/short-circuiting operation (step S207), and when the time elapsed reaches a predetermined time $t_M$, the control circuit 250 stops the $f_O$ changing/short-circuiting operation (step S208). Specifically, the control circuit 250 changes the resonance frequency $f_O$ back to the reference frequency, or ceases to short-circuit the reception-side coil $R_L$. Then, an advance is made to step S209. The time $t_M$ is determined beforehand such that, during the period in which the pFOD process is performed in the power feeding appliance 1 (that is, during the period in which the test magnetic field is being generated), the execution of the $f_O$ changing/short-circuiting operation is continued and, as soon as the period expires, the $f_O$ changing/short-circuiting operation is promptly stopped. The time $t_M$ may be specified in the test request signal 530.

At step S209, the control circuit 250 waits for the reception of a verification signal 550 by use of the communication circuit 220. When the communication circuit 220 receives the verification signal 550, then, at step S210, the control circuit 250 transmits a response signal 560 responding to the verification signal 550 to the power feeding appliance 1 by NFC communication using the communication circuit 220. If a foreign object is present on the power feeding stage 12, no verification signal 550 is transmitted from the power feeding appliance 1 (see step S110 in FIG. 18), and thus if, at step S209, no verification signal 550 is received for a predetermined time, a return can be made to step S201.

After the transmission of the response signal 560, at step S211, the control circuit 250 controls the switch circuit 210 such that the power reception circuit 230 is connected to the resonance circuit RR, and subsequently, at step S212, the control circuit 250 starts the power reception operation using the power reception circuit 230. The control circuit 250 counts the time that elapses after the start of the power reception operation, and compares the time elapsed with a predetermined time $t_B$ (step S213). When the time elapsed reaches the time $t_B$ (step S213, Y), then, at step S214, the control circuit 250 stops the power reception operation; a return is then made to step S201.

The time $t_B$ is previously determined or is specified in the verification signal 550 previously such that the period in which the power reception operation is performed generally coincides with the period in which the power transmission operation is performed in the power feeding appliance 1. A configuration is also possible where, after the start of the power reception operation, the control circuit 250 monitors the charge current to the battery 21, and when the charge current value becomes equal to or smaller than a predetermined value, the control circuit 250 judges that the power transmission operation has ended and stops the power reception operation, an advance then being made to step S201.

[mFOD Process]

It can happen that a foreign object is placed on the power feeding stage 12 after the start of power transmission operation. An mFOD process serves as a foreign object detection process during power transfer, and through the mFOD process, the presence or absence of a foreign object is constantly monitored during power transfer.

Figure 20:
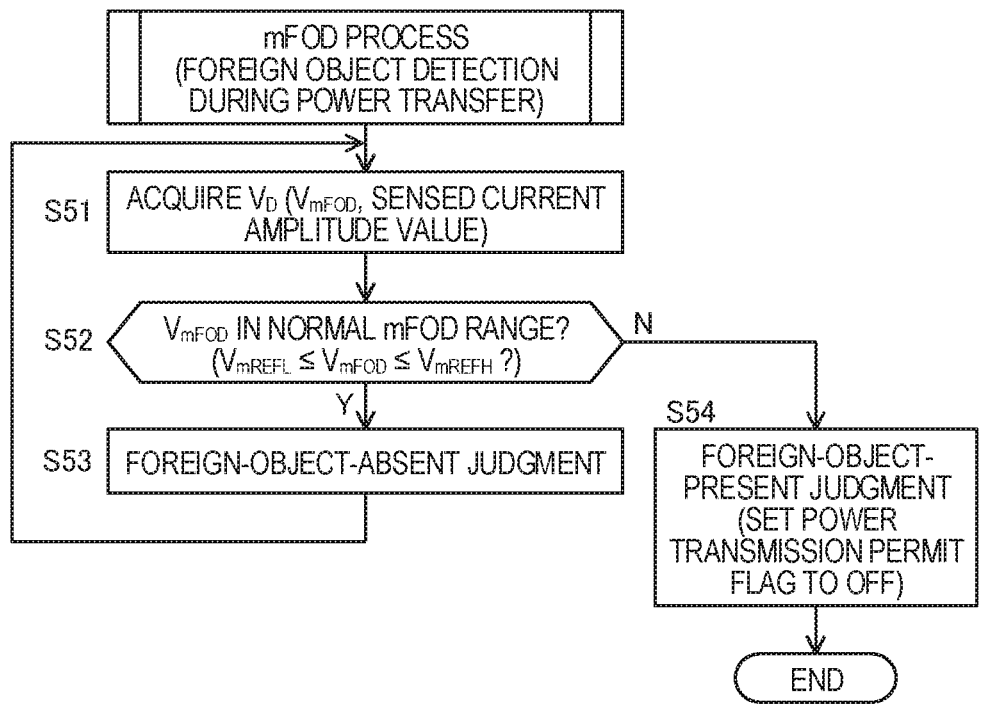
FIG. 20 is an operation flow chart of an mFOD process performed in the power feeding appliance.

FIG. 20 is an operation flow chart of the mFOD process. During the period in which the power transmission operation is performed, the control circuit 160 performs the mFOD process in FIG. 20 repeatedly. In the mFOD process, first, at step S51, the control circuit 160 acquires the most recent voltage value $V_D$ as a sensed current amplitude value $V_{mFOD}$. The sensed current amplitude value $V_{mFOD}$ has a value commensurate with the amplitude of the current that passes in the transmission-side coil $T_L$ when a power transmission magnetic field is being generated in the transmission-side coil $T_L$. Subsequently, at step S52, the control circuit 160 checks whether or not the sensed current amplitude value $V_{mFOD}$ falls within a predetermined normal mFOD range. If the sensed current amplitude value $V_{mFOD}$ falls within the normal mFOD range, a foreign-object-absent judgment is made (step S53), and a return is made to step S51, so that steps S51 and S52 are repeated. On the other hand, if the sensed current amplitude value $V_{mFOD}$ falls outside the normal mFOD range, then, at step S54, a foreign-object-present judgment is made, and a power transmission permit flag is set to OFF. The power transmission permit flag is a flag that is controlled by the control circuit 160, and is set to ON or OFF. When the power transmission permit flag is set to ON, the control circuit 160 permits the execution of the power transmission operation; when the power transmission permit flag is set to OFF, the control circuit 160 inhibits the execution of the power transmission operation, or stops the power transmission operation.

The normal mFOD range is a range of values equal to or larger than a predetermined lower limit value $V_{mREFL}$ but equal to or smaller than a predetermined upper limit value $V_{mREFH}$ ($0 < V_{mREFL} < V_{mREFH}$). Accordingly, when the check inequality "$V_{mREFL} \leq V_{mFOD} \leq V_{mREFH}$" is satisfied, a foreign-object-absent judgment is made, and otherwise a foreign-object-present judgment is made.

Figure 21A:
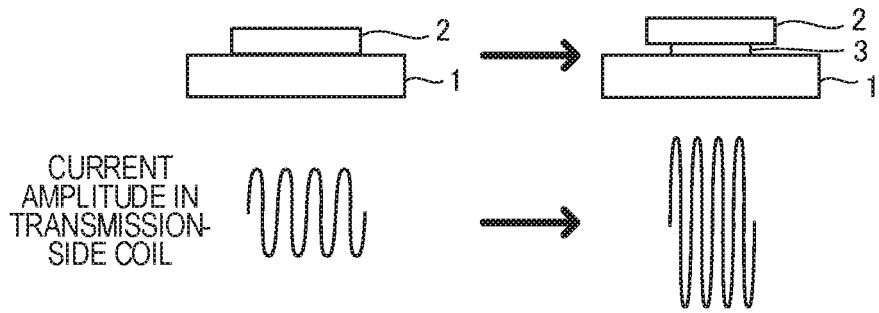
FIG. 21A and FIG. 21B are diagrams illustrating current amplitude variations in a transmission-side coil resulting from insertion of a foreign object during power transfer.

With reference to FIG. 21A, consider, for example, a case where, while the power transmission operation is being performed, a foreign object 3 configured as a non-contact IC card is inserted between the power feeding stage 12 of the power feeding appliance 1 and the electronic appliance 2. In this case, the reception-side coil $R_L$ in the electronic appliance 2 and the coil $J_L$ in the foreign object 3 magnetically couple, and, along with the resonance frequency of the resonance circuit JJ in the foreign object 3, the resonance frequency of the resonance circuit RR in the electronic appliance 2 deviates from the reference frequency (13.56 MHz). Then, the reception electric power in the reception-side coil $R_L$ lowers, and the power transmission load as observed from the transmission-side coil $T_L$ becomes lighter, with the result that the amplitude of the current passing in the transmission-side coil $T_L$ becomes larger (the upper limit value $V_{mREFH}$ can be determined such that "$V_{mREFH} < V_{mFOD}$" in this case).

Figure 21B:
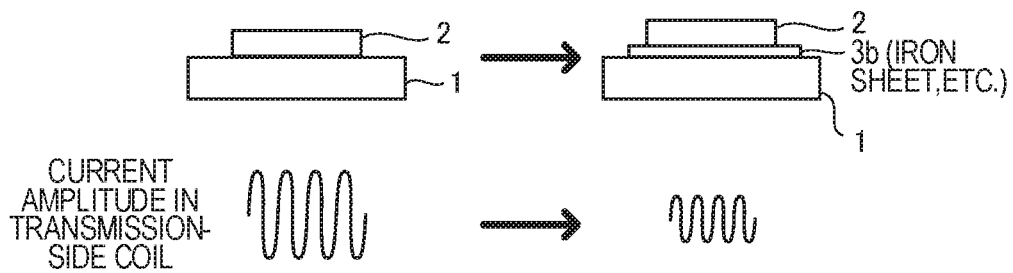

For another example, with reference to FIG. 21B, consider a case where, while the power transmission operation is being performed, a foreign object 3b configured as a sheet of iron or ferrite is inserted between the power feeding stage 12 of the power feeding appliance 1 and the electronic appliance 2. Then, due to electric and magnetic effects, an electric current passes in the foreign object 3b, with the result that the amplitude of the current passing in the transmission-side coil $T_L$ becomes smaller (the lower limit value $V_{mREFL}$ can be determined such that "$V_{mFOD} < V_{mREFL}$" in this case).

Thus, the presence or absence of a foreign object like the foreign object 3 and the foreign object 3b causes a variation in the sensed current amplitude value $V_{mFOD}$. A lower limit value $V_{mREFL}$ and an upper limit value $V_{mREFH}$ that have been determined appropriately beforehand through experiments or the like with consideration given to every imaginable type of foreign object and every imaginable state of arrangement can be stored in the memory 150. Instead, how far the sensed current amplitude value $V_{mFOD}$ varies due to the presence of a foreign object during power transfer may be estimated by theoretic calculation so that, based on the results of the estimation, with no need for experiments, a lower limit value $V_{mREFL}$ and an upper limit value $V_{mREFH}$ can be determined and stored in the memory 150. In that case, for example, an object that causes the sensed current amplitude value $V_{mFOD}$ to vary by a predetermined factor of variation or more about the center value of the normal mFOD range can be defined as a foreign object.

The amplification factor of the amplifier 143 shown in FIG. 7 is variable. The amplitude of the current passing in the transmission-side coil $T_L$ is significantly larger when the power transmission operation and the mFOD process are preformed than when the pFOD process is performed. Accordingly, the control circuit 160 sets the amplification factor of the amplifier 143 lower when the mFOD process is performed than when the pFOD process is performed, and thereby keeps generally equal the input signal range of the A-D converter 144 between in the pFOD process and in the mFOD process.

For another example, between the envelope curve detector 142 and the A-D converter 144 (more specifically, between the envelope curve detector 142 and the amplifier 143, or between the amplifier 143 and the A-D converter 144), a high-range reduction circuit (unillustrated) may be inserted. In that case, amplitude information obtained by subjecting the voltage drop signal across the sense resistor 141 to high-range reduction (in other words, averaging or low-pass filtering) can be obtained as the voltage value $V_D$ from the A-D converter 144. The high-range reduction here is a process whereby, of the voltage drop signal across the sense resistor 141, comparatively low-frequency signal components are passed while comparatively high-frequency signal components are reduced (attenuated). Through the high-range reduction, inhibition of power transmission is prevented from occurring due to noise, slight vibration of the electronic appliance 2 on the power feeding stage 12, or the like.

For another example, instead of a high-range reduction circuit being provided between the envelope detector 142 and the A-D converter 144, high-range reduction by calculation may be applied to the voltage value $V_D$ based on the output signal of the A-D converter 144 so that the voltage value $V_D$ after the high-range reduction is used as the sensed current amplitude value $V_{mFOD}$ (similar handling is possible also for the sensed current amplitude value $V_{pFOD}$ in the pFOD process). High-range reduction by calculation is a process performed in the control circuit 160 whereby, of the output signal of the A-D converter 144, comparatively low-frequency signal components are passed while comparatively high-frequency signal components are reduced (attenuated).

The function of the mFOD process is not limited to foreign object presence/absence judgment. The mFOD process serves to turn the power transmission permit flag to OFF in any situation unsuitable to continue the power transmission operation such as when the sensed current amplitude value $V_{mFOD}$ falls outside the normal mFOD range. For example, after the start of the power transmission operation, when the electronic appliance 2 is removed off the power feeding stage 12, the load of power transmission as observed from the transmission-side coil $T_L$ becomes lighter and the sensed current amplitude value $V_{mFOD}$ exceeds the upper limit value $V_{mREFH}$; thus, the power transmission permit flag is turned to OFF (step S54 in FIG. 20).

As described above, while electric power is being transmitted in the power transmission operation, the control circuit 160 monitors whether or not the sensed current amplitude value $V_{mFOD}$ falls outside the normal mFOD range to control whether or not to continue power transmission. Thus, in a situation unsuitable to continue the power transmission operation as when a foreign object is placed on the power feeding stage 12 after the start of the power transmission operation, through the mFOD process, the power transmission operation is stopped. It is thus possible to prevent the foreign object from being damaged or otherwise affected as a result of the power transmission operation being continued.

Second Embodiment

A second embodiment of the present invention will be described below. The second embodiment is based on the first embodiment, and thus, for those features of the second embodiment which are not specifically mentioned, unless inconsistent, the relevant parts of the description given above in connection with the first embodiment apply to the second embodiment.

Though not mentioned in connection with the first embodiment, the control circuit 160 in the power feeding appliance 1 sets as its operation mode one of a plurality of modes including a normal mode and a test mode and operates in the set operation mode; likewise, the control circuit 250 in the electronic appliance 2 sets as its operation mode one of a plurality of modes including a normal mode and a test mode and operates in the set operation mode. The plurality of modes for the control circuit 160 may be identical with, or may be different from, the plurality of modes for the control circuit 250. While the plurality of modes for the control circuit 160 and the control circuit 250 can include any mode other than the normal mode and the test mode, the following description focuses only on the normal mode and the test mode.

The operation of the power feeding appliance 1 and the electronic appliance 2 described in connection with the first embodiment is all that observed when the operation modes of the control circuit 160 and the control circuit 250 are set to the normal mode (except the initial setting process).

The control circuit 160 in the power feeding appliance 1 sets its operation mode to the test mode only when it receives the input of a previously determined test mode setting instruction at the start-up of the power feeding appliance 1 or at any time after the start-up of the power feeding appliance 1; otherwise, the control circuit 160 sets its operation mode to the normal mode. Likewise, the control circuit 250 in the electronic appliance 2 sets its operation mode to the test mode only when it receives the input of a previously determined test mode setting instruction at the start-up of the electronic appliance 2 or at any time after the start-up of the electronic appliance 2; otherwise, the control circuit 250 sets its operation mode to the normal mode.

Figure 22:
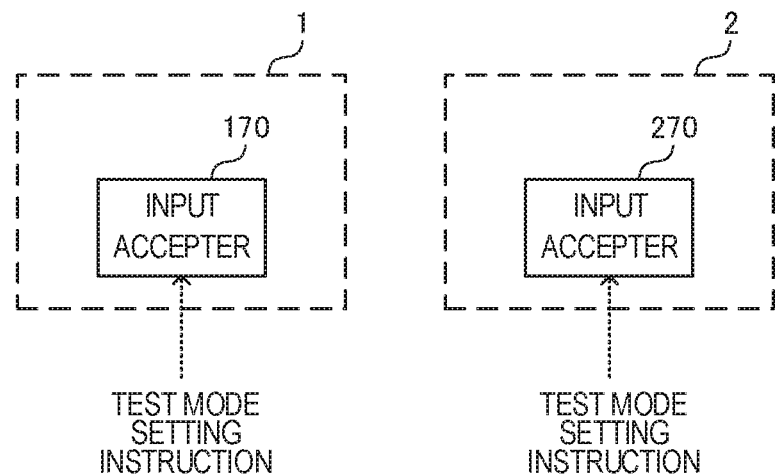
FIG. 22 is a diagram showing a power feeding appliance and an electronic appliance each provided with an input accepter according to a second embodiment of the present invention.

As shown in FIG. 22, the power feeding appliance 1 includes an input accepter 170 for receiving various instructions including a test mode setting instruction, and the electronic appliance 2 includes an input accepter 270 for receiving various instructions including a test mode setting instruction.

The input accepter 170 can comprise, for example, one or more push-button switches. In that case, when the operator presses one push-button switch on the input accepter 170, or when the operator presses simultaneously a plurality of push-button switches on the input accepter 170, a test mode setting instruction is fed to the power feeding appliance 1 and the input accepter 170. In a case where the power feeding appliance 1 includes a touch screen, any push-button switch that can be included in the input accepter 170 may be a button on the touch screen.

The input accepter 170 may instead be configured as a communication port which can receive signals transmitted from an external device. In that case, the reception of a predetermined test mode entry request signal from the external device by the communication port of the input accepter 170 serves as the input of a test mode setting instruction for the power feeding appliance 1 and the input accepter 170, and when the test mode entry request signal is received, the operation mode of the control circuit 160 is set to the test mode.

The external device is a device different from either of the power feeding appliance 1 and the electronic appliance 2, and can be, for example, a computer device 4 (see FIG. 23) as will be described later.

The input accepter 270 can comprise, for example, one or more push-button switches. In that case, when the operator presses one push-button switch on the input accepter 270, or when the operator presses simultaneously a plurality of push-button switches on the input accepter 270, a test mode setting instruction is fed to the electronic appliance 2 and the input accepter 270. In a case where the electronic appliance 2 includes a touch screen, any push-button switch that can be included in the input accepter 270 may be a button on the touch screen.

The input accepter 270 may instead be configured as a communication port which can receive signals transmitted from an external device. In that case, the reception of a predetermined test mode entry request signal from the external device by the communication port of the input accepter 270 serves as the input of a test mode setting instruction for the electronic appliance 2 and the input accepter 270, and when the test mode entry request signal is received, the operation mode of the control circuit 250 is set to the test mode.

In the control circuit 160 of the power feeding appliance 1, setting the operation mode to the test mode, then turning off the power to the power feeding appliance 1, and then restarting the power feeding appliance 1 brings the operation mode back to the normal mode. The control circuit 160 may be configured to shift its operation mode to the normal mode when, after setting its operation mode to the test mode, a predetermined condition is satisfied (for example, when the input accepter 170 has received input of a normal mode shift instruction which differs from a test mode setting instruction).

In the control circuit 250 of the electronic appliance 2, setting the operation mode to the test mode, then turning off the power to the electronic appliance 2, and then restarting the electronic appliance 2 brings the operation mode back to the normal mode. The control circuit 250 may be configured to shift its operation mode to the normal mode when, after setting its operation mode to the test mode, a predetermined condition is satisfied (for example, when the input accepter 270 has received input of a normal mode shift instruction which differs from a test mode setting instruction).

The operation of the electronic appliance 2 in the test mode will now be described. In the test mode (that is, when the operation mode of the control circuit 250 is set to the test mode), the control circuit 250 continuously performs the $f_O$ changing/short-circuiting operation by using the resonance state changing circuit 240. That is, the control circuit 250 maintains a state where the resonance frequency $f_O$ of the resonance circuit RR is changed to the frequency $f_M$ or a state where the reception-side coil $R_L$ is short-circuited. This condition is maintained as long as the operation mode of the control circuit 250 is set to the test mode. The time $T_M$ (see FIG. 19, step S207) for which the $f_O$ changing/short-circuiting operation is performed for the pFOD process in the normal mode is about several tens of milliseconds to several hundred milliseconds. Thus, it can be said that, in the test mode, the state where the resonance frequency $f_O$ of the resonance circuit RR is changed to the frequency $f_M$ or the state where the coil $R_L$ is short-circuited is maintained longer than the predetermined time $T_M$. In the test mode, the resonance circuit RR may be connected via the switch circuit 210 to the communication circuit 220 or the power reception circuit 230.

The operation of the power feeding appliance 1 in the test mode will now be described. In the test mode (that is, when the operation mode of the control circuit 160 is set to the test mode), the control circuit 160, by controlling the switch circuit 110 and the power transmission circuit 130, maintains a state where the resonance circuit TT is connected via the switch circuit 110 to the power transmission circuit 130 and a state where a test magnetic field is being generated in the transmission-side coil $T_L$ as a result of a predetermined test alternating-current voltage being fed and applied from the power transmission circuit 130 to the resonance circuit TT. This condition is maintained as long as the operation mode of the control circuit 160 is set to the test mode. That is, in the test mode, the control circuit 160, by controlling the switch circuit 110 and the power transmission circuit 130, keeps the test magnetic field being generated continuously in the transmission-side coil $T_L$.

Also in the test mode, the amplitude of the current passing in the transmission-side coil $T_L$ is sensed continuously, and the sensing result is obtained as the voltage value $V_D$ (see FIG. 7). The voltage value $V_D$ (that is, the sensed current amplitude value in the transmission-side coil $T_L$ as sensed by the sensing circuit 140) obtained when the transmission-side coil $T_L$ is generating the test magnetic field in the test mode, in particular, is called the test mode sensed value, and is represented by the symbol $V_{TEST}$. As long as the test mode is maintained, the test mode sensed value $V_{TEST}$ is acquired periodically (it is acquired, for example, every one millisecond).

The non-contact power feeding system according to the second embodiment includes a processing unit which performs a predetermined test process based on the test mode sensed value $V_{TEST}$. The processing unit may be provided in the control circuit 160 of the power feeding appliance 1, or may be provided in an external device different from either of the power feeding appliance 1 and the electronic appliance 2. Here, it is assumed that the processing unit in question is provided in an external device. The external device may be taken as included in the constituent elements of the non-contact power feeding system.

Figure 23:
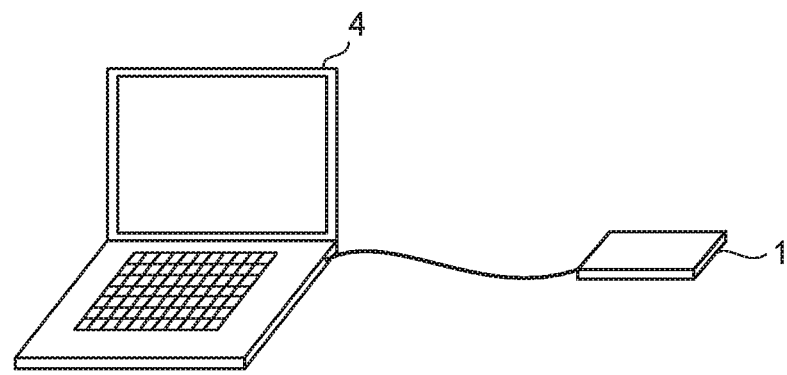
FIG. 23 is an exterior view of a computer device and a power feeding appliance connected together according to the second embodiment of the present invention.
Figure 24:
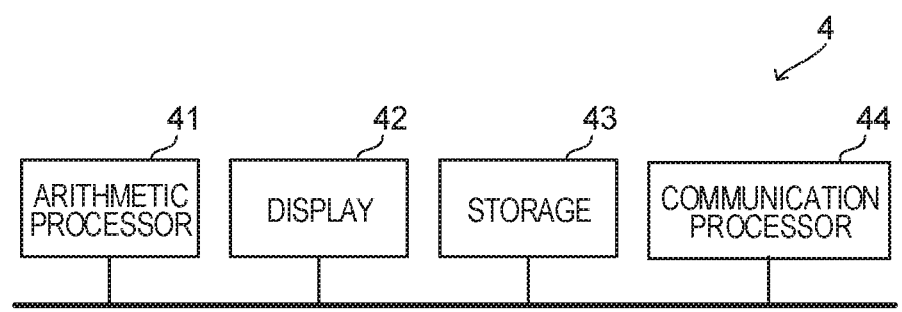
FIG. 24 is a schematic internal block diagram of the computer device according to the second embodiment of the present invention.

FIG. 23 shows the exterior appearance of a computer device 4 as an example of the external device, along with the exterior appearance of the power feeding appliance 1. FIG. 24 is a schematic internal block diagram of the computer device 4. The computer device 4 includes blocks identified by the reference signs 41 to 44.

An arithmetic processor 41 comprises a CPU (central processing unit), ROM (read-only memory), RAM (random memory), and the like. The arithmetic processor 41 performs various kinds of arithmetic processing, and also controls the operation of the individual blocks in the computer device 4 in a comprehensive manner.

A display 42 comprises a liquid crystal display panel or the like, and displays, under the control of the arithmetic processor 41, any information as an image. A storage 43 comprises a magnetic disk, a semiconductor memory, and the like, and stores any information.

A communication processor 44 performs communication with a device different from the computer device 4 on a wireless or wired basis. Here, it is assumed that, between the power feeding appliance 1 and the computer device 4, wired communication conforming to a predetermined wired communication standard (for example, the USB (universal serial bus) standard) is possible, and that a communication port provided in the power feeding appliance 1 and a communication port provided in the computer device 4 are connected together by a predetermined communication cable so that bidirectional communication of any information is possible between the power feeding appliance 1 and the computer device 4. However, in a case where a function for wireless communication with the computer device 4 is provided in the power feeding appliance 1, the communication between the power feeding appliance 1 and the computer device 4 (including the delivery of the test mode sensed value $V_{TEST}$ from the power feeding appliance 1 to the computer device 4) may be wireless communication.

Figure 25:
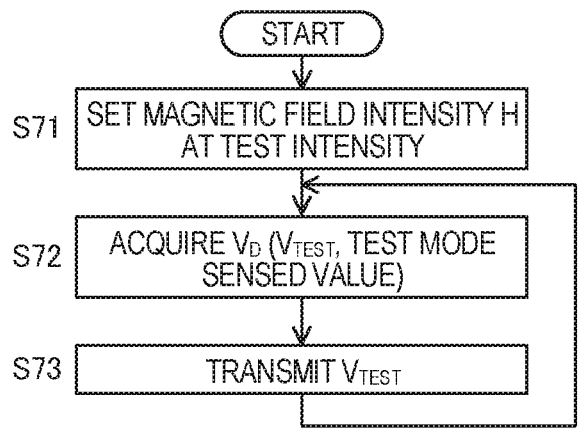
FIG. 25 is an operation flow chart of the power feeding appliance in a test mode according to the second embodiment of the present invention.

FIG. 25 is an operation flow chart of the power feeding appliance 1 in the test mode. In the test mode, the power transmission circuit 130 is connected to the resonance circuit TT. At step S71, the magnetic field intensity H by the transmission-side coil $T_L$ is set at a predetermined test intensity, and subsequently, at step S72, the control circuit 160 obtains, as the test mode sensed value $V_{TEST}$, the voltage value $V_D$ acquired from the A-D converter 144 with that setting. Then, at step S73, the control circuit 160 transmits the obtained test mode sensed value $V_{TEST}$ via the communication port provided in the power feeding appliance 1 to the computer device 4. Thereafter, the operation at steps S72 and S73 is repeated periodically.

The arithmetic processor 41 can perform a predetermined test process based on the test mode sensed value $V_{TEST}$.

The test process may include a process of displaying the test mode sensed value $V_{TEST}$ on the display 42. In that case, the test mode sensed value $V_{TEST}$ itself, or a value obtained by applying a predetermined operation (for example, a predetermined arithmetic operation) to the test mode sensed value $V_{TEST}$, may be displayed on the display 42. Instead, time-series data of the test mode sensed value $V_{TEST}$, or time-series data of a value obtained by applying a predetermined operation to the test mode sensed value $V_{TEST}$, may be displayed in the form of a graph on the display 42.

The test process may include a process of recording the test mode sensed value $V_{TEST}$ to the storage 43. In that case, the test mode sensed value $V_{TEST}$ itself, or a value obtained by applying a predetermined operation (for example, a predetermined arithmetic operation) to the test mode sensed value $V_{TEST}$, may be recorded to the storage 43. Considering that one test mode sensed value $V_{TEST}$ after another is obtained periodically, time-series data of the test mode sensed value $V_{TEST}$, or time-series data of a value obtained by applying a predetermined operation to the test mode sensed value $V_{TEST}$, may be recorded to the storage 43.

The test process can include a process of judging whether or not the test mode sensed value $V_{TEST}$ falls within the normal pFOD range described in connection with the first embodiment (see FIG. 12). The judgment result can be displayed on the display 42. At step S73 in FIG. 25, the control circuit 160 can also judge whether or not the test mode sensed value $V_{TEST}$ falls within the normal pFOD range, and the judgment result can be indicated by emission of light from a light-emitting diode or the like that can be provided in the power feeding appliance 1.

The test mode sensed value $V_{TEST}$, which is the target of the test process, can include a test mode sensed value $V_{TESTA}$ acquired with only the electronic appliance 2 in the test mode placed in the predetermined power transmission region on the power feeding stage 12 and a test mode sensed value $V_{TESTB}$ acquired with the electronic appliance 2 in the test mode placed, together with a foreign object (for example, a foreign object 3), in the predetermined power transmission region on the power feeding stage 12. If there is no fault in the power feeding appliance 1 or the electronic appliance 2 in the test mode, the former test mode sensed value $V_{TESTA}$ is supposed to fall within the normal pFOD range, while the latter test mode sensed value $V_{TESTB}$ is supposed to fall outside the normal pFOD range.

In the normal mode, when the electronic appliance 2 is placed on the power feeding stage 12, the pFOD process and power transfer are performed alternately and repeatedly (see FIG. 17); meanwhile, whereas one session of power transfer lasts for about several minutes to several hours, one session of the pFOD process ends in about 100 milliseconds.

While the presence or absence of a foreign object is judged in every session of the pFOD process, there can arise a case where evaluation is desired as to whether or not foreign object presence/absence judgment is performed in a desired manner in varying situations. For example, in shipment inspection of the power feeding appliance 1 or the electronic appliance 2, there is a demand for brief but detailed evaluation of whether or not a foreign-object-present judgment is actually made in various situations where a foreign-object-present judgment is supposed to be made (in situations such as those in FIG. 14B and FIG. 15) and whether or not a necessary margin is secured in such situations. Likewise, there is also a demand for brief but detailed evaluation of whether or not a foreign-object-absent judgment is actually made in various situations where a foreign-object-absent judgment is supposed to be made and whether or not a necessary margin is secured in such situations. Similar demands arise in design evaluation inspection and shipment inspection for examining whether or not the power feeding appliance 1 or the electronic appliance 2 meets the design values for NFC power transfer.

Such evaluation is difficult to complete in the pFOD process in the normal mode, which lasts for as short as about one hundred milliseconds per session. With this taken into consideration, operation in the test mode as described above is allowed. In the test mode, a situation similar to that in which the pFOD process is performed in the normal mode is continuously in effect, and the test mode sensed value $V_{TEST}$ that corresponds to the sensed current amplitude value $V_{pFOD}$ (see FIG. 12) obtained in the pFOD process in the normal mode can be acquired efficiently under varying acquisition conditions. Specifically, for example, in the test mode, the test mode sensed values $V_{TESTA}$ and $V_{TESTB}$ mentioned above can be acquired sequentially, and whether or not the test mode sensed values $V_{TESTA}$ and $V_{TESTB}$ fall within the normal pFOD range can be checked through the test process.

For another example, it is also possible to acquire a first test mode sensed value $V_{TEST}$ in a first state where the electronic appliance 2 is placed in a predetermined position on the power feeding stage 12 and a foreign object 3 is placed in a predetermined position away from the power feeding stage 12, and to acquire a second test mode sensed value $V_{TEST}$ in a second state where the electronic appliance 2 and the foreign object 3 are placed in a first and a second predetermined position on the power feeding stage 12. Then, for example, if a foreign-object-absent judgment is to be made in the first state, whether the first test mode sensed value $V_{TEST}$ falls within the normal pFOD range can be checked through the test process and, if a foreign-object-present judgment is to be made in the second state, whether the second test mode sensed value $V_{TEST}$ falls outside the normal pFOD range can be checked through the test process.

As described above, providing the test mode makes it possible to perform, in an efficient and detailed manner, an operation check related to foreign object detection before power transfer (evaluation of whether or not the foreign object detection process before power transmission is performed properly).

Although the above description assumes that the arithmetic processor 41 is provided in the computer device 4, the arithmetic processor 41, which performs a predetermined test process based on the test mode sensed value $V_{TEST}$, may instead be provided in the control circuit 160. In a case where the display 42 is provided in the computer device 4, the display 42 can be said to be connected via the communication processor 44 to the power feeding appliance 1; instead, the display 42 may be provided not in the computer device 4 but in the power feeding appliance 1. Likewise, in a case where the storage 43 is provided in the computer device 4, the storage 43 can be said to be connected via the communication processor 44 to the power feeding appliance 1; instead, the storage 43 may be provided not in the computer device 4 but in the power feeding appliance 1.

Third Embodiment

A third embodiment of the present invention will be described below. The third embodiment is based on the first and second embodiments, and thus, for those features of the third embodiment which are not specifically mentioned, unless inconsistent, the relevant parts of the description given above in connection with the first and second embodiments apply to the third embodiment. In the third embodiment, for those features of the third embodiment which contradict the corresponding features in the first or second embodiment, the description given in connection with the third embodiment prevails.

As shown in FIG. 26, in the third embodiment, as the test mode of the control circuit 160 in the power feeding appliance 1, modes MA1 to MA4 are provided, and as the test mode of the control circuit 250 in the electronic appliance 2, modes MB1 and MB2 are provided.

For example, the control circuit 160 in the power feeding appliance 1 sets its operation mode to one of modes MA1 to MA4 when it receives one of predetermined first to fourth test mode setting instructions, respectively, at the start-up of the power feeding appliance 1 or at any time after the start-up of the power feeding appliance 1; otherwise, the control circuit 160 sets its operation mode to the normal mode. Likewise, for example, the control circuit 250 in the electronic appliance 2 sets its operation mode to either of modes MB1 and MB2 when it receives either of predetermined first and second test mode setting instructions, respectively, at the start-up of the electronic appliance 2 or at any time after the start-up of the electronic appliance 2; otherwise, the control circuit 250 sets its operation mode to the normal mode. Input of the test mode setting instructions can be accepted on the input accepters 170 and 270 (see FIG. 22).

In the electronic appliance 2, mode MB1 is nothing less than the test mode described in connection with the second embodiment. In mode MB1 (that is, when the operation mode of the control circuit 250 is set to mode MB1), the control circuit 250 continuously performs the $f_O$ changing/short-circuiting operation by using the resonance state changing circuit 240. That is, the control circuit 250 maintains a state where the resonance frequency $f_O$ of the resonance circuit RR is changed to the frequency $f_M$ or the state where the reception-side coil $R_L$ is short-circuited. This condition is maintained as long as the operation mode of the control circuit 250 is set to mode MB1. The time $T_M$ (see FIG. 19, step S207) for which the $f_O$ changing/short-circuiting operation is performed for the pFOD process in the normal mode is about several tens of milliseconds to several hundred milliseconds. Thus, it can be said that, in mode MB1, the state where the resonance frequency $f_O$ of the resonance circuit RR is changed to the frequency $f_M$ or the state where the reception-side coil $R_L$ is short-circuited is maintained longer than the predetermined time $T_M$. In mode MB1, the resonance circuit RR may be connected via the switch circuit 210 to the communication circuit 220 or the power reception circuit 230.

In mode MB2 (that is, when the operation mode of the control circuit 250 is set to mode MB2), the control circuit 250 continuously keeps the $f_O$ changing/short-circuiting operation unperformed, and accordingly the resonance frequency $f_O$ of the resonance circuit RR is kept at the reference frequency. This condition is maintained as long as the operation mode of the control circuit 250 is set to mode MB2. Moreover, in mode MB2, the resonance circuit RR is connected via the switch circuit 210 to the power reception circuit 230. That is, in mode MB2, the electronic appliance 2 is in the same state as when the power reception operation is performed.

In modes MA1 and MA2 (that is, when the operation mode of the control circuit 160 is set to mode MA1 or MA2), the control circuit 160, by controlling the switch circuit 110 and the power transmission circuit 130, maintains a state where the resonance circuit TT is connected via the switch circuit 110 to the power transmission circuit 130 and a state where a test magnetic field is being generated in the transmission-side coil $T_L$ as a result of a predetermined test alternating-current voltage being fed and applied from the power transmission circuit 130 to the resonance circuit TT. This condition is maintained as long as the operation mode of the control circuit 160 is set to mode MA1 or MA2. That is, in modes MA1 and MA2, the control circuit 160, by controlling the switch circuit 110 and the power transmission circuit 130, keeps the test magnetic field being generated continuously in the transmission-side coil $T_L$.

In modes MA3 and MA4 (that is, when the operation mode of the control circuit 160 is set to mode MA3 or MA4), the control circuit 160, by controlling the switch circuit 110 and the power transmission circuit 130, maintains a state where the resonance circuit TT is connected via the switch circuit 110 to the power transmission circuit 130 and a state where a power transmission magnetic field is being generated in the transmission-side coil $T_L$ as a result of a predetermined power transmission alternating-current voltage being fed and applied from the power transmission circuit 130 to the resonance circuit TT. This condition is maintained as long as the operation mode of the control circuit 160 is set to mode MA3 or MA4. That is, in modes MA3 and MA4, the control circuit 160, by controlling the switch circuit 110 and the power transmission circuit 130, keeps the power transmission magnetic field being generated continuously in the transmission-side coil $T_L$.

In any of modes MA1 to MA4, the amplitude of the current passing in the transmission-side coil $T_L$ is continuously sensed, and the sensing result is obtained as the voltage value $V_D$ (see FIG. 7). The voltage values $V_D$ (that is, the sensed current amplitude values in the transmission-side coil $T_L$ as sensed by the sensing circuit 140) obtained in modes MA1 to MA4, in particular, are called the test mode sensed values. Of these values, the voltage value $V_D$ obtained while the transmission-side coil $T_L$ is generating the test magnetic field in mode MA1 or MA2 is represented by the symbol $V_{TEST}$, and the voltage value $V_D$ obtained while the transmission-side coil $T_L$ is generating the power transmission magnetic field in mode MA3 or MA4 is represented by the symbol $V_{TEST2}$. In mode MA1 or MA2, the test mode sensed value $V_{TEST}$, and in mode MA3 or MA4, the test mode sensed value $V_{TEST2}$, is acquired periodically (it is acquired, for example, every one millisecond). The sequentially acquired test mode sensed values $V_{TEST}$ or $V_{TEST2}$ can be delivered via the communication processor 44 in FIG. 24 to the arithmetic processor 41.

Here, of the test mode sensed values $V_{TEST}$ and $V_{TEST2}$, the test mode sensed value $V_{TEST}$ is similar to the test mode sensed value $V_{TEST}$ mentioned in connection with the second embodiment. Thus, when the operation mode of the control circuit 160 is set to mode MA1 or MA2, the non-contact power feeding system can carry out the various kinds of operation described in connection with the second embodiment (including the operation in FIG. 25 and the test process). Also when the operation mode of the control circuit 160 is set to mode MA3 or MA4, the operation in FIG. 25 and the test process can be applied and performed. However, in a case where the operation in FIG. 25 and the test process are applied in a state where the operation mode of the control circuit 160 is set to mode MA3 or MA4, the terms "test intensity", "$V_{TEST}$", "normal pFOD range", and "electronic appliance 2 in the test mode" in the description of the second embodiment are to be read as "power transmission magnetic field", "$V_{TEST2}$", "normal mFOD range", and "electronic appliance 2 in mode MB2" respectively.

As test schemes using mode MA1 or MA2, a first to a fourth test scheme will be described.

In the first test scheme, the operation mode of the control circuit 160 is set to mode MA1, and in addition the initial setting environment mentioned previously is established (that is, neither the electronic appliance 2 nor a foreign object is placed on the power feeding stage 12). Based on the test mode sensed value $V_{TEST}$ obtained in this state, the value $V_{pREFL}$ mentioned previously can be set (see FIG. 13).

In the second test scheme, the operation mode of the control circuit 160 is set to mode MA1, and in addition the electronic appliance 2 in mode MB1 is placed on the power feeding stage 12. Based on the test mode sensed value $V_{TEST}$ obtained in this state, the arithmetic processor 41 can evaluate whether or not the $f_O$ changing/short-circuiting operation is being performed properly. For example, if the difference between the sensed value $V_{TEST}$ obtained in the first test scheme and the sensed value $V_{TEST}$ obtained in the second test scheme is equal to or smaller than a predetermined value, the arithmetic processor 41 judges that the $f_O$ changing/short-circuiting operation is being performed properly, and otherwise, it judges that the $f_O$ changing/short-circuiting operation is not being performed properly. Ideally, the sensed value $V_{TEST}$ obtained in the first test scheme and the sensed value $V_{TEST}$ obtained in the second test scheme are equal.

In the third test scheme, the operation mode of the control circuit 160 is set to mode MA2, and in addition the initial setting environment mentioned previously is established (that is, neither the electronic appliance 2 nor a foreign object is paced on the power feeding stage 12). Based on the test mode sensed value $V_{TEST}$ obtained in this state, the value $V_{pREFL}$ mentioned previously can be set (see FIG. 13). The third test scheme is equivalent to the first test scheme described above.

In the fourth test scheme, the operation mode of the control circuit 160 is set to mode MA2, and in addition the electronic appliance 2 in mode MB1 is placed, together with a foreign object 3, on the power feeding stage 12. Based on the test mode sensed value $V_{TEST}$ obtained in this state, the arithmetic processor 41 checks whether a foreign-object-present judgment is made properly for the presence of the foreign object 3 (whether, in the pFOD process in the normal mode, a foreign-object-present judgment is made properly for the presence of the foreign object 3) and also checks the margin. The margin here is given as a difference ($V_{pREFL}-V_{TEST}$) by using the sensed value $V_{TEST}$ obtained in the fourth test scheme (the sensed value as obtained when, as the foreign object, a foreign object 3 is placed on the power feeding stage 12). If the difference is equal to or larger than a predetermined value, it is judged that a sufficient margin is secured.

Instead, in the fourth test scheme, the operation mode of the control circuit 160 is set to mode MA2, and in addition the electronic appliance 2 in mode MB1 is placed, together with a foreign object 3a (such as a sheet of aluminum), on the power feeding stage 12. Based on the test mode sensed value $V_{TEST}$ obtained in this state, the arithmetic processor 41 checks whether a foreign-object-present judgment is made properly for the presence of the foreign object 3a (whether, in the pFOD process in the normal mode, a foreign-object-present judgment is made properly for the presence of the foreign object 3a) and also checks the margin. The margin here is given as a difference ($V_{TEST}-V_{pREFH}$) by using the sensed value $V_{TEST}$ obtained in the fourth test scheme (the sensed value as obtained when, as the foreign object, a foreign object 3a is placed on the power feeding stage 12), If the difference is equal to or larger than a predetermined value, it is judged that a sufficient margin is secured.

By using modes MA1 and MA2, it is possible, for example, to perform, in an efficient and detailed manner, an operation check related to the foreign object detection process before power transfer (evaluation of whether or not the foreign object detection process before power transmission is performed properly).

As test schemes using mode MA3 or MA4, a fifth to a seventh test scheme will be described.

In the fifth test scheme, the operation mode of the control circuit 160 is set to mode MA3, and in addition the electronic appliance 2 in mode MB2 is moved in various ways on the power feeding stage 12 or near the power feeding stage 12. More specifically, with respect to, as a reference, the state where the electronic appliance 2 in mode MB2 is placed at the center in a predetermined power transmission region on the power feeding stage 12, the relative positional relationship between the power feeding stage 12 and the electronic appliance 2 is varied in each of three mutually perpendicular directions, and meanwhile the electric power received by the electronic appliance 2 in each of different relative positional relationships is measured. By referring to the measurement results, it is possible to check whether electric power is received properly in each relative positional relationship. The measurement of the electric power received by the electronic appliance 2 may be achieved by actually sensing the electric power received by the power reception circuit 230 in the power reception operation, or the measurement may be achieved by estimating the electric power received by the electronic appliance 2 in each relative positional relationship based on the sensed value $V_{TEST2}$ in that relative positional relationship.

In the sixth test scheme, the operation mode of the control circuit 160 is set to mode MA4, and in addition the electronic appliance 2 in mode MB2 is placed on the power feeding stage 12. Based on the test mode sensed value $V_{TEST2}$ obtained in this state, it is possible to set the values $V_{mREFL}$ and $V_{mREFH}$ mentioned previously.

In the seventh test scheme, the operation mode of the control circuit 160 is set to mode MA4, and in addition the electronic appliance 2 in mode MB2 is placed, together with a foreign object 3, on the power feeding stage 12. Based on the test mode sensed value $V_{TEST2}$ obtained in this state, the arithmetic processor 41 checks whether a foreign-object-present judgment is made properly for the presence of the foreign object 3 (whether, in the mFOD process in the normal mode, a foreign-object-present judgment is made properly for the presence of the foreign object 3) and also checks the margin. The margin here is given as a difference ($V_{TEST2}-V_{mREFH}$) by using the sensed value $V_{TEST2}$ obtained in the seventh test scheme (the sensed value as obtained when, as a foreign object, the foreign object 3 is placed on the power feeding stage 12). If the difference is equal to or larger than a predetermined value, it is judged that a sufficient margin is secured.

Instead, in the seventh test scheme, the operation mode of the control circuit 160 is set to mode MA4, and in addition the electronic appliance 2 in mode MB2 is placed, together with a foreign object 3b (such as a sheet of iron), on the power feeding stage 12. Based on the test mode sensed value $V_{TEST2}$ obtained in this state, the arithmetic processor 41 checks whether a foreign-object-present judgment is made properly for the presence of the foreign object 3b (whether, in the mFOD process in the normal mode, a foreign-object-present judgment is made properly for the presence of the foreign object 3b) and also checks the margin. The margin here is given as a difference ($V_{pREFL}-V_{TEST2}$) by using the sensed value $V_{TEST2}$ obtained in the seventh test scheme (the sensed value as obtained when, as a foreign object, the foreign object 3b is placed on the power feeding stage 12). If the difference is equal to or larger than a predetermined value, it is judged that a sufficient margin is secured.

By using modes MA3 and MA4, it is possible, for example, to perform, in an efficient and detailed manner, a check on the amount of electric power during power transfer and an operation check related to the foreign object detection process during power transfer (evaluation of whether or not the foreign object detection process during power transfer is performed properly).

<<Studies on the Present Invention, Part 1>>

To follow are studies on the present invention as embodied as the embodiments described above.

A non-contact power feeding system $W_1$ according to one aspect of the present invention is a non-contact power feeding system that comprises a power transmission device and a power reception device and that allows transmission and reception of electric power between them by magnetic field resonance, and is configured as follows. The power transmission device includes: a transmission-side resonance circuit (TT) including a transmission-side coil ($T_L$) for transmitting the electric power; a power transmission circuit (130) which feeds an alternating-current voltage to the transmission-side resonance circuit to generate a magnetic field in the transmission-side coil; a sensing circuit (140) which senses the amplitude of the current passing in the transmission-side coil; and a transmission-side control circuit (160) which operates in, as its operation mode, one of a plurality of modes including a first mode (normal mode) and a second mode (test mode). The power reception device includes: a reception-side resonance circuit (RR) including a reception-side coil ($R_L$) for receiving the electric power; a changing/short-circuiting circuit (240) which can change the resonance frequency of the reception-side resonance circuit from the resonance frequency during the power reception or short-circuit the reception-side coil; and a reception-side control circuit (250) which operates in, as its operation mode, one of a plurality of modes including the first mode and the second mode.

In the first mode, the reception-side control circuit, according to a signal from the power transmission device by communication and by using the changing/short-circuiting circuit, changes the resonance frequency of the reception-side resonance circuit, or short-circuits the reception-side coil, for a predetermined time, and then cancels the change or the short-circuiting; the transmission-side control circuit, during the period in which the resonance frequency of the reception-side resonance circuit is changed or the reception-side coil is short-circuited and prior to the power transmission, controls the power transmission circuit such that a predetermined test magnetic field is generated in the transmission-side coil, then, based on first evaluation data ($V_{p\text{-}FOD}$) representing the sensed amplitude value obtained from the sensing circuit while the test magnetic field is being generated in the first mode, judges whether or not execution of the power transmission is permissible, and, after judging that execution of the power transmission is permissible, controls the power transmission circuit such that a power transmission magnetic field stronger than the test magnetic field is generated in the transmission-side coil to carry out the power transmission.

On the other hand, in the second mode, the reception-side control circuit, by using the changing/short-circuiting circuit, maintains the change of the resonance frequency of the reception-side resonance circuit or the short-circuiting of the reception-side coil; the transmission-side control circuit controls the power transmission circuit such that the test magnetic field is generated continuously in the transmission-side coil, and acquires second evaluation data ($V_{TEST}$) representing the sensed amplitude value obtained from the sensing circuit while the test magnetic field is being generated in the second mode.

The transmission-side coil has a property such that, when a foreign object is present at a place where it responds to the magnetic field generated in the transmission-side coil, a variation occurs in the current amplitude in the transmission-side coil. By utilizing this property, it is possible to detect the presence or absence of a foreign object based on a variation in the current amplitude and, on detecting the presence of a foreign object, to inhibit the execution of power transmission. However, if a resonance current passes in the reception-side coil during the presence/absence detection of a foreign object, this too causes a variation in the current amplitude in the transmission-side coil, and this makes it difficult to monitor whether or not there is a variation in the current amplitude due to the presence or absence of a foreign object. Accordingly, in the first mode, while the resonance frequency of the reception-side resonance circuit is changed or the reception-side coil is short-circuited, first evaluation data as to the current amplitude in the transmission-side coil is acquired, and based on the first evaluation data, whether or not execution of power transmission is permissible is determined and controlled.

On the other hand, in shipment inspection or the like of the power transmission device, the power reception device, and the non-contact power feeding system, there can arise a case where evaluation is desired as to whether or not the judgment of whether or not the execution of power transmission is permissible is proper for various kinds of foreign objects actually prepared. By allowing operation in the second mode, it is possible to conduct such evaluation efficiently under varying conditions. This is because, whereas in the first mode, through the flow "acquire first evaluation data, then judge whether or not execution of power transmission is permissible, and then control whether or not to execute power transmission", the sensed amplitude value (first evaluation data) is obtained only at limited time points, in the second mode, as many samples as desired of second evaluation data, which corresponds to the first evaluation data, can be acquired. That is, by allowing operation in the second mode, it is possible to perform efficiently or detailedly an operation check related to the judgement of whether or not the execution of power transmission in the first mode is permissible (for example, evaluation of whether or not that judgement is performed properly).

Specifically, for example, with respect to the non-contact power feeding system $W_1$, in the first mode, the transmission-side control circuit can, based on the first evaluation data, judge presence or absence of a foreign object which differs from the power reception device and in which a current based on the magnetic field generated in the transmission-side coil can be generated, and, based on the result of the judgement, control whether or not execution of the power transmission is permissible.

More specifically, for example, with respect to the non-contact power feeding system $W_1$, in the first mode, the transmission-side control circuit can, on judging that no foreign object is present, permit execution of the power transmission and, on judging that the foreign object is present, inhibit execution of the power transmission.

In this way, it is possible to avoid damaging or otherwise affecting the foreign object.

For another example, with respect to the non-contact power feeding system $W_1$, in the first mode, the transmission-side control circuit can judge presence or absence of the foreign object by judging whether or not the sensed amplitude value represented by the first evaluation data falls outside a predetermined range.

For another example, a processing unit (41) which performs a predetermined process (test process) based on the second evaluation data can be included in the non-contact power feeding system $W_1$, and the processing unit can be provided in the transmission-side control circuit or in an external device (4) different from either of the power transmission device and the power reception device.

Providing such a processing unit makes it possible, through the execution of the predetermined process, to perform efficiently or detailedly an operation check related to the judgement of whether or not the execution of power transmission in the first mode is permissible (for example, evaluation of whether or not that judgement is performed properly).

Specifically, for example, with respect to the non-contact power feeding system $W_1$, the predetermined process can include a process of displaying the second evaluation data on a display device provided in, or connected to, the power transmission device.

For another example, with respect to the non-contact power feeding system $W_1$, the predetermined process can include a process of recording the second evaluation data to a storage device provided in, or connected to, the power transmission device.

For another example, a processing unit (41) which performs a predetermined process (test process) based on the second evaluation data can be included in the non-contact power feeding system $W_1$, and the processing unit can be provided in the transmission-side control circuit or in an external device (4) different from either of the power transmission device and the power reception device. The predetermined process can then include a process of judging whether or not a sensed amplitude value represented by the second evaluation data falls outside a predetermined range.

Providing such a processing unit makes it possible, through the execution of the predetermined process, to perform efficiently or detailedly an operation check related to the judgement of whether or not the execution of power transmission in the first mode is permissible (for example, evaluation of whether or not that judgement is performed properly).

For another example, with respect to the non-contact power feeding system $W_1$, the transmission-side control circuit and the reception-side control circuit can each set its operation mode to the second mode on receiving input of a particular instruction, and otherwise set its operation mode to the first mode.

This makes it possible to let operation proceed in the first mode in principle and in the second mode only on receipt of a particular instruction.

In that case, for example, with respect to the non-contact power feeding system $W_1$, the power transmission device and the power reception device can each include an input accepter (170, 270) for receiving input of the particular instruction.

For another example, with respect to the non-contact power feeding system $W_1$, the plurality of modes in the transmission-side control circuit can further include a mode in which the power transmission magnetic field is generated continuously in the transmission-side coil (mode MA3 or MA4 in the third embodiment), and the plurality of modes in the reception-side control circuit can further include a mode in which the change of the resonance frequency of the reception-side resonance circuit or the short-circuiting of the reception-side coil is kept unperformed continuously (mode MB2 in the third embodiment).

The power feeding appliance 1 itself in the embodiments described above may function as a power transmission device according to the present invention, or a part of the power feeding appliance 1 in the embodiments described above may function as a power transmission device according to the present invention. Likewise, the electronic appliance 2 itself in the embodiments described above may function as a power reception device according to the present invention, or a part of the electronic appliance 2 in the embodiments described above may function as a power reception device according to the present invention.

Fourth Embodiment

A fourth embodiment of the present invention will be described below. The fourth embodiment is based on the first to third embodiments, and thus, for those features of the fourth embodiment which are not specifically mentioned, unless inconsistent, the relevant parts of the description given above in connection with the first to third embodiments apply to the fourth embodiment. In the fourth embodiment, for those features of the fourth embodiment which contradict the corresponding features in the first, second, or third embodiment, the description given in connection with the fourth embodiment prevails. The fourth embodiment deals with another specific example of the configuration and operation of a non-contact power feeding system comprising a power feeding appliance 1 including a IC 100 and an electronic appliance 2 including a IC 200.

Figure 27:
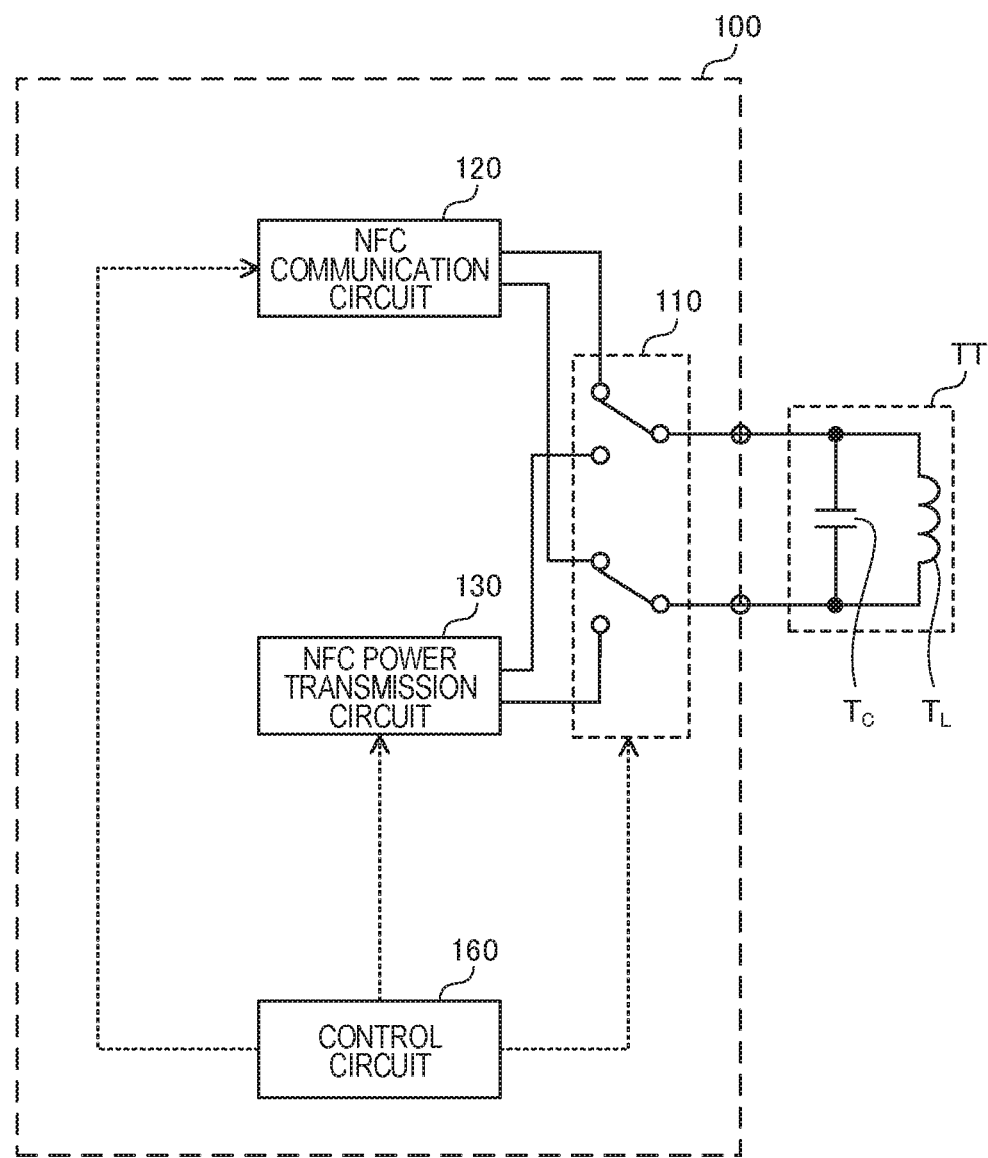
FIG. 27 is a partial configuration diagram of a power feeding appliance, including an internal block diagram of an IC in the power feeding appliance, according to a fourth embodiment of the present invention.
Figure 28:
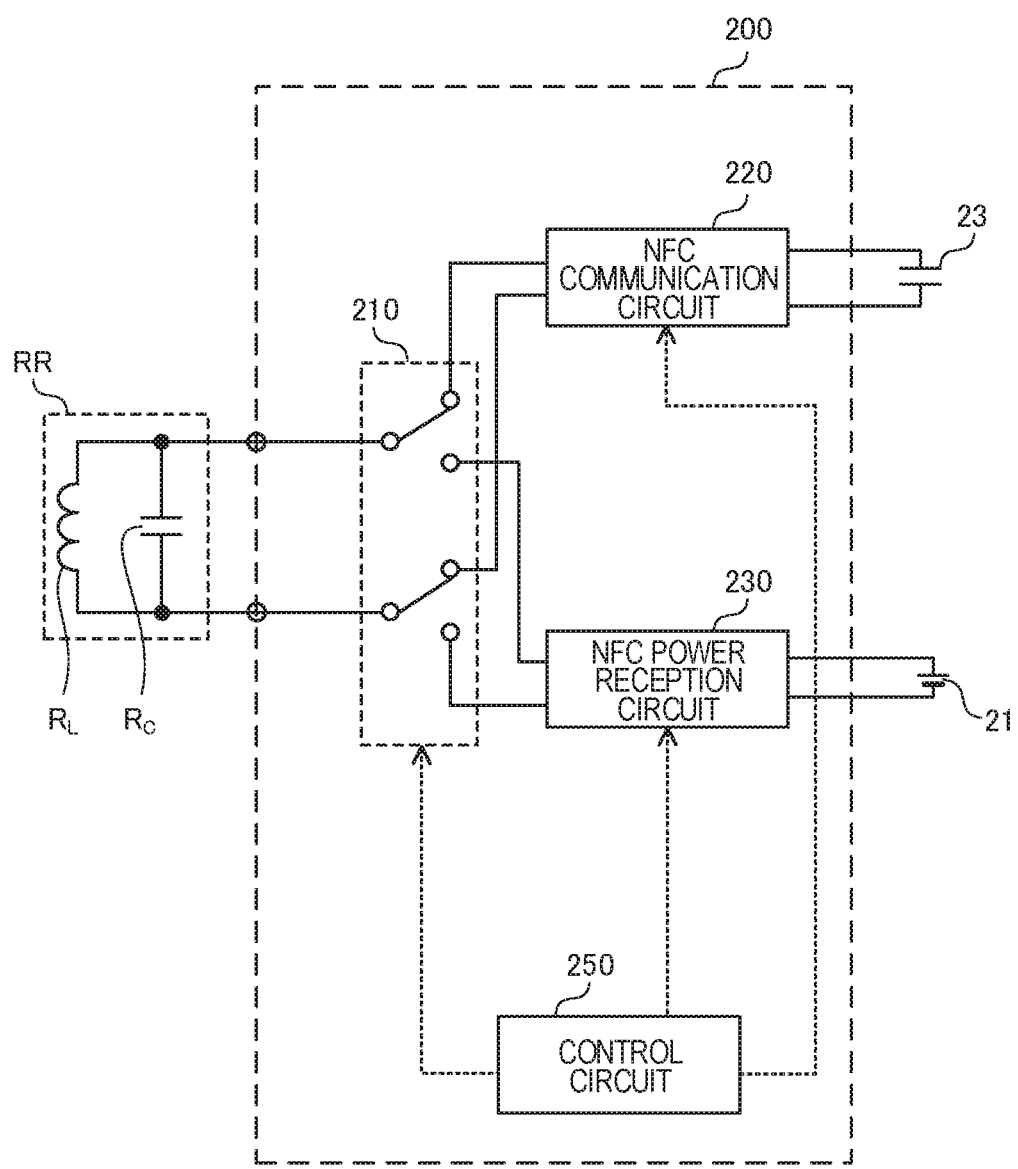
FIG. 28 is a partial configuration diagram of an electronic appliance, including an internal block diagram of an IC in the electronic appliance, according to the fourth embodiment of the present invention.

FIG. 27 is a partial configuration diagram of the power feeding appliance 1, including an internal block diagram of the IC 100. The IC 100 includes blocks identified by the reference signs 110, 120, 130, and 160. FIG. 28 is a partial configuration diagram of the electronic appliance 2, including an internal block diagram of the IC 200. The IC 200 includes blocks identified by the reference signs 210, 220, 230, and 250. The IC 200 may have connected to it a capacitor 23 which outputs the operating voltage for the IC 200. The capacitor 23 can output a direct-current voltage obtained by rectifying a signal for NFC communication received from the power feeding appliance 1.

The configuration and operation of, as well as the interconnection among, the switch circuit 110, the NFC communication circuit 120, the NFC power transmission circuit 130, the control circuit 160, and the resonance circuit TT provided in the power feeding appliance 1 can be similar to those described in connection with the first to third embodiments, and the configuration and operation of, as well as the interconnection among, the switch circuit 210, the NFC communication circuit 220, the NFC power reception circuit 230, the control circuit 250, and the resonance circuit RR provided in the electronic appliance 2 can be similar to those described in connection with the first to third embodiments.

The IC 100 in the fourth embodiment, as in the first to third embodiments, may further include a load sensing circuit 140 and a memory 150 (see FIG. 4), and the IC 200 in the fourth embodiment, as in the first to third embodiments, may further include a resonance state changing circuit 240 (see FIG. 5). Also in such cases, the configuration and operation of, as well as the interconnection among, the switch circuit 110, the NFC communication circuit 120, the NFC power transmission circuit 130, the load sensing circuit 140, the memory 150, the control circuit 160, and the resonance circuit TT provided in the power feeding appliance 1 can be similar to those described in connection with the first to third embodiments, and the configuration and operation of, as well as the interconnection among, the switch circuit 210, the NFC communication circuit 220, the NFC power reception circuit 230, the resonance state changing circuit 240, the control circuit 250, and the resonance circuit RR provided in the electronic appliance 2 can be similar to those described in connection with the first to third embodiments.

As mentioned earlier, a state where the resonance circuit TT is connected via the switch circuit 110 to the NFC communication circuit 120 and in addition the resonance circuit RR is connected via the switch circuit 210 to the NFC communication circuit 220 is called a communication-connected state. As mentioned earlier, a state where the resonance circuit TT is connected via the switch circuit 110 to the NFC power transmission circuit 130 and in addition the resonance circuit RR is connected via the switch circuit 210 to the NFC power reception circuit 230 is called a power feeding-connected state.

Also when NFC communication is performed in the communication-connected state, the NFC communication circuit 120 feeds a predetermined alternating-current signal, more specifically an alternating-current voltage at the reference frequency with a predetermined amplitude, to the resonance circuit TT, so that a communication magnetic field is generated in the transmission-side coil $T_L$; however, as mentioned earlier, the magnetic field intensity in NFC communication (that is the magnetic field intensity of the communication magnetic field) falls within a predetermined range. The lower and upper limit values of the range are prescribed in the NFC standard, being 1.5 A/m and 7.5 A/m respectively. By contrast, the intensity of the magnetic field generated in the transmission-side coil $T_L$ in power transfer (that is, in the power transmission operation) (the magnetic field intensity of the power transmission magnetic field) is higher than the just-mentioned upper limit, being, for example, about 45 to 60 A/m. In the non-contact power feeding system including the appliances 1 and 2, NFC communication and power transfer (NFC power transfer) can be performed alternately, and how the magnetic field intensity behaves in such a case is shown in FIG. 6.

Figure 29:
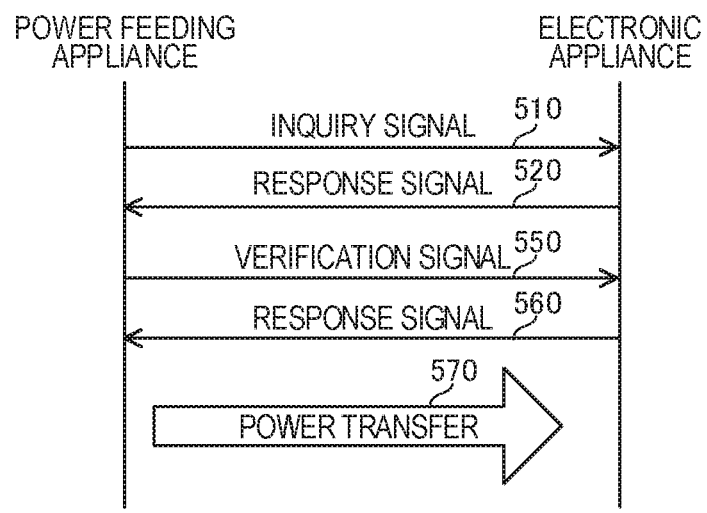
FIG. 29 is a diagram illustrating the exchange of signals between the power feeding appliance and the electronic appliance according to the fourth embodiment of the present invention.

With reference to FIG. 29, the exchange of signals between the appliances 1 and 2 before power transfer is performed will be described. First, in the communication-connected state, with the power feeding appliance 1 on the transmitting side and the electronic appliance 2 on the receiving side, the power feeding appliance 1 (IC 100) transmits an inquiry signal 510 to the electronic appliance 2 by NFC communication. The inquiry signal 510 includes, for example, a signal inquiring individual identification information of the electronic appliance 2, a signal inquiring whether or not the electronic appliance 2 is in a state enabled to perform NFC communication, and a signal inquiring whether or not the electronic appliance 2 can receive electric power or is requesting transmission of electric power.

Suppose now that the electronic appliance 2 is present at a position where it can receive the inquiry signal 510. Then, on receiving the inquiry signal 510, the electronic appliance 2 (IC 200) transmits a response signal 520 responding to the inquiry of the inquiry signal 510 to the power feeding appliance 1 by NFC communication. On receiving the response signal 520, the power feeding appliance 1 (IC 100) analyzes the response signal 520, and if the electronic appliance 2 is enabled to perform NFC communication and in addition it can receive electric power or is requesting transmission of electric power, the power feeding appliance 1 (IC 100) transmits a verification signal 550 to the electronic appliance 2 by NFC communication. The verification signal 550 includes, for example, a signal notifying the electronic appliance 2 of the forthcoming power transmission. On receiving the verification signal 550, the electronic appliance 2 (IC 200) transmits a response signal 560 responding to the verification signal 550 to the power feeding appliance 1 by NFC communication. The response signal 560 includes, for example, a signal notifying recognition of what is conveyed by the verification signal 550 or a signal giving permission to what is conveyed by the verification signal 550. After transmitting the response signal 560, the control circuit 250 promptly connects the resonance circuit RR to the power reception circuit 230. On receiving the response signal 560, the power feeding appliance 1 (IC 100) connects the power transmission circuit 130 to the resonance circuit TT to perform the power transmission operation, and thus power transfer 570 is achieved.

As mentioned in connection with the first embodiment, the power feeding appliance 1 (IC 100) may, after receiving the response signal 520, perform a foreign object detection process to detect whether or not a foreign object is present on the power feeding stage 12 so that, only if no foreign object is judged to be present, exchange the verification signal 550 and the response signal 560 to proceed to power transfer 570. As the foreign object detection process, the pFOD process described in connection with the first embodiment can be used. A foreign object is, for example, an object (such as a non-contact IC card) fitted with a wireless IC tag including a 13.56 MHz antenna coil that does not respond to NFC communication.

Figure 30:
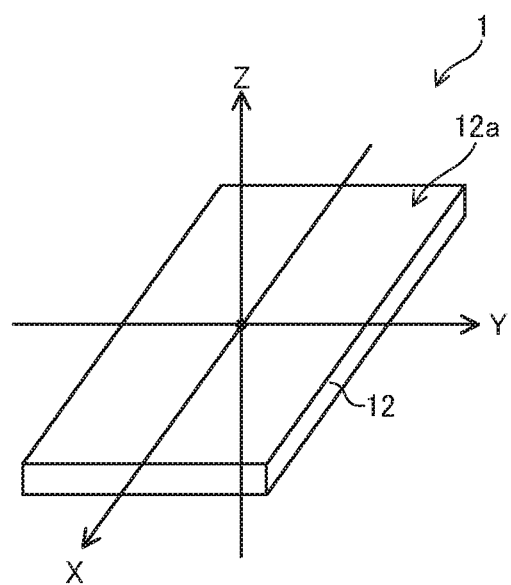
FIG. 30 is a diagram defining X, Y, and Z axes in relation to the power feeding stage and the placement surface of the power feeding appliance according to the fourth embodiment of the present invention.

To perform NFC communication and, in addition, to perform power transfer with desired transfer efficiency, the positional relationship between the power feeding appliance 1 and the electronic appliance 2 has to be a desired positional relationship. For specific illustration of such a positional relationship, an X axis, a Y axis, and a Z axis which are perpendicular to each other are defined as shown in FIG. 30. The plane parallel to the X and Y axes, the plane parallel to the Y and Z axes, and the plane parallel to the Z and X axes will occasionally be referred to as the XY, YZ, and ZX planes respectively. The X and Y axes are parallel to one surface, referred to as the placement surface 12*a*, of the power feeding stage 12, and thus the Z axis is perpendicular to the placement surface 12*a*. The placement surface 12*a* of the power feeding stage 12 is a surface on which the electronic appliance 2 is to be placed when power transfer is performed, and thus the electronic appliance 2 can be placed on the placement surface 12*a*.

Figure 31A:
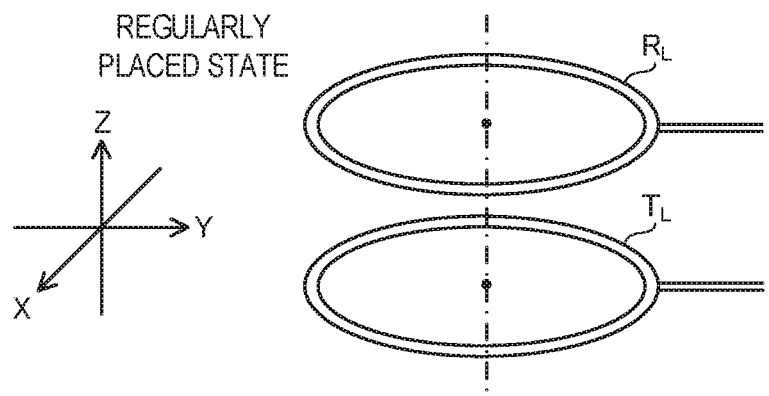
FIG. 31A and FIG. 31B are a schematic perspective view and a schematic sectional view, respectively, of a transmission-side coil and a reception-side coil in the power feeding appliance and the electronic appliance in a regularly placed state according to the fourth embodiment of the present invention.
Figure 31B:
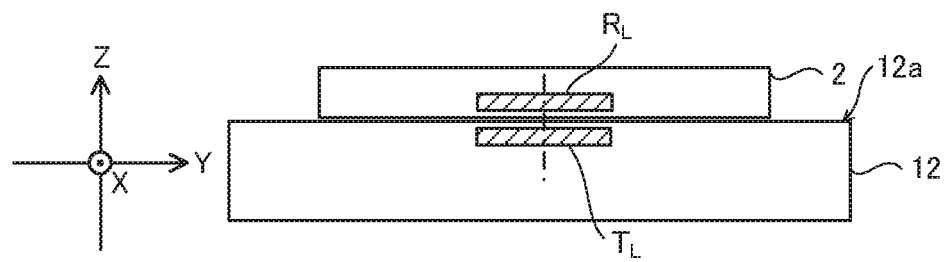

FIG. 31A and FIG. 31B are a schematic perspective view and a schematic sectional view, respectively, of the transmission-side coil $T_L$ and the reception-side coil $R_L$ in the power feeding appliance 1 and the electronic appliance 2 in the regularly placed state. In FIG. 31A, to simplify illustration and avoid complication, the windings of the coils $T_L$ and $R_L$ are represented by double circles (the same applies to FIG. 34B and the like referred to later). In any diagram illustrating a coil, line segments extending sideways from the double circles representing the coil represent leads leading from the coil. The sectional view in FIG. 31B shows a sectional plane parallel to the YZ plane. The coils $T_L$ and $R_L$ each form a loop antenna. In the regularly placed state, it is assumed that the loop planes of the loop antennas as the coils $T_L$ and $R_L$ (that is, the plane on which the windings of the coils $T_L$ and $R_L$ are arranged) are parallel to the XY plane, accordingly that the center axes of the coils $T_L$ and $R_L$ are parallel to the Z axis, and in addition that the center axes of the coils $T_L$ and $R_L$ coincide. The coil $T_L$ is formed of a winding (such as of copper wire) wound about its center axis (the same applies to the coil $R_L$).

For an increased coupling coefficient between the coils $T_L$ and $R_L$, the coils $T_L$ and $R_L$ are given the same shape on the XY plane (though they may be given different shapes). In the present description, the shape of a coil is a concept that includes the size of the coil. For a given coil, the size of the coil can be taken as the area occupied by the circumference of the coil in the direction perpendicular to the center axis of the coil. In a case where a coil forms a loop antenna, the area of that part of the loop plane (the plane on which the winding of the coil is arranged) of the loop antenna which is surrounded by the winding of the coil corresponds to the size of the coil.

Although in FIG. 31A and the like, the circumferential shapes (in other words, exterior shapes) of the coils $T_L$ and $R_L$ are shown circular, in either of the coils $T_L$ and $R_L$, the circumferential shape of the coil is not limited to circular but may instead be elliptical or polygonal (such as rectangular), and the circumferential shape of the coil may be composed of straight and curved parts mixed.

In the regularly placed state described above, the coupling coefficient between the coils $T_L$ and $R_L$ is maximized, with the result that the transfer efficiency of power transfer is maximized. The user of the non-contact power feeding system is expected to place the electronic appliance 2 on the placement surface 12a of the power feeding stage 12 while aiming at the regularly placed state so that efficient power transfer will be carried out; however, the user usually is not aware where on the placement surface 12a to place the electronic appliance 2 to attain the regularly placed state. The coils $T_L$ and $R_L$ are housed in the respective housings of the power feeding appliance 1 and the electronic appliance 2, and thus the user does not recognize the arrangement positions of the coils $T_L$ and $R_L$ in the power feeding appliance 1 and the electronic appliance 2. Moreover, even if the user can recognize those positions, most users do not feel the necessity to aim at a state as shown in FIG. 31B based on an understanding of the principle of magnetic coupling.

Figure 32:
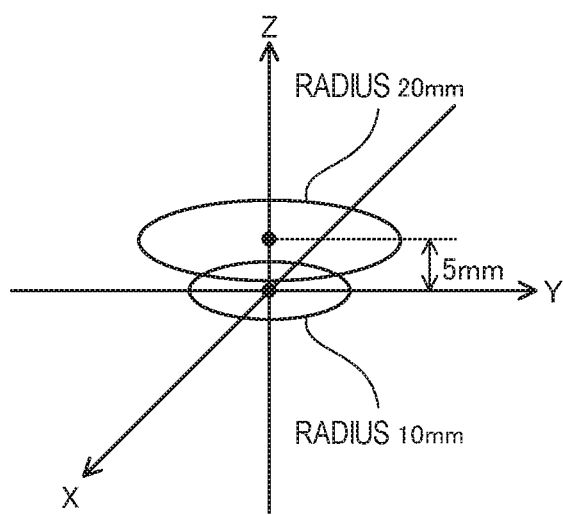
FIG. 32 is a diagram illustrating a standard-prescribed NFC communicable range assumed in the fourth embodiment of the present invention.

As shown in FIG. 32, one standard for devices that perform NFC communication prescribes that NFC communication should be possible, in a case where the electronic appliance 2 is placed on the placement surface 12a, when the electronic appliance 2 is located within the region of a radius of 10 mm relative to the regularly placed state, and in addition that NFC communication should be possible, in a case where the electronic appliance 2 is moved 5 mm away from the placement surface 12a of the electronic appliance 2 starting in the regularly placed state, when the electronic appliance 2 is located within the region of a radius of 20 mm on the XY plane relative to the moved-away state. Then, considering that power transfer is performed when NFC communication is possible (see FIG. 29), for power transfer to be possible, the user is required to place the electronic appliance 2 on the placement surface 12a such that the error of the placement position of the electronic appliance 2 from the predetermined position is equal to or less than 10 mm. This requirement is often too strict to the user. The effective value of the range of NFC communication is often greater than the standard-prescribed range, and even when the electronic appliance 2 is located outside the standard-prescribed range, NFC communication can be possible; however, to perform power transfer with high transfer efficiency, it is important to make the positional relationship between the appliances 1 and 2 close to the regularly placed state, and thus the introduction of a setup is desired that aids the user in recognizing where on the placement surface 12a to aim at when placing the electronic appliance 2. Possible approaches to guide the placement position of the electronic appliance 2 toward the desired position include forming a depression in the power feeding stage 12 and marking the power feeding stage 12 with a guide describing the exterior shape of the electronic appliance 2. These approaches, however, assume that the electronic appliance 2 has a given exterior shape, and thus lack versatility considering that any of electronic appliances 2 with varying exterior shapes can be a constituent element of the non-contact power feeding system.

In view of the foreqOing, in the non-contact power feeding system according to this embodiment, first. as shown in FIG. 33, a predetermined guide mark MK is indicated on the placement surface 12a of the power feeding appliance 1. The guide mark MK may be indicated by affixing to the placement surface 12a a resin sticker having the guide mark MK printed on it, or by printing the guide mark MK directly on the placement surface 12a. Instead, the guide mark MK may be indicated on the placement surface 12a by pressing the placement surface 12a with a stamp of the guide mark MK. The guide mark MK may be any mark so long as the guide mark MK can be recognized as such on an image taken by a camera unit, which will be described later; the guide mark MK may be composed of a plurality of marks separate from each other. It is here assumed that the guide mark MK is composed of character marks "N" and "W" located beside each other along the X axis and a rectangular mark surrounding the character marks "N" and "W".

Where to indicate the guide mark MK is determined in relation to the arrangement position of the transmission-side coil $T_L$. Specifically, it is assumed that the guide mark MK is indicated at a predetermined position on the placement surface 12a that is determined based on the arrangement position of the transmission-side coil $T_L$. The aim is to give the guide mark MK a function of letting the electronic appliance 2 know the position of the transmission-side coil $T_L$ so as to contribute to attaining the regularly placed state.

FIG. 34A and FIG. 34B show the center position 620 of the guide mark MK and the projected position 630 of the center of the transmission-side coil $T_L$ on the placement surface 12a. The transmission-side coil $T_L$ is arranged and fixed inside the power feeding stage 12, which functions as the housing of the power feeding appliance 1, and the position of the point at which the center of the transmission-side coil $T_L$ is projected on the placement surface 12a along the Z axis corresponds to the projected position 630. To permit the electronic appliance 2 to recognize the position (projected position 630) of the transmission-side coil $T_L$ based on the position of the guide mark MK, information that identifies the positional relationship between the center position 620 and the projected position 630 in the real space can be previously fed to the electronic appliance 2. The positions 620 and the 630 may be different from each other, or may be coincident with each other.

Figure 35A:
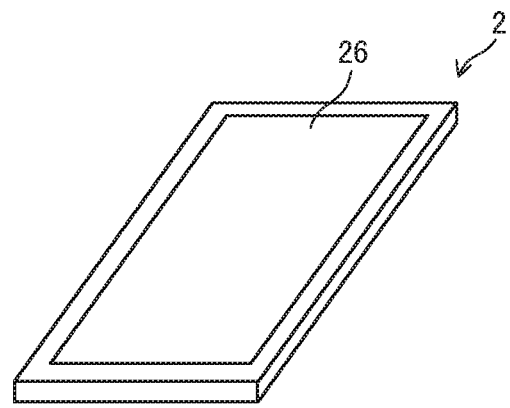
FIG. 35A to FIG. 35C are a perspective exterior view, a side view, and a partial functional block diagram of the electronic appliance according to the fourth embodiment of the present invention.
Figure 35B:
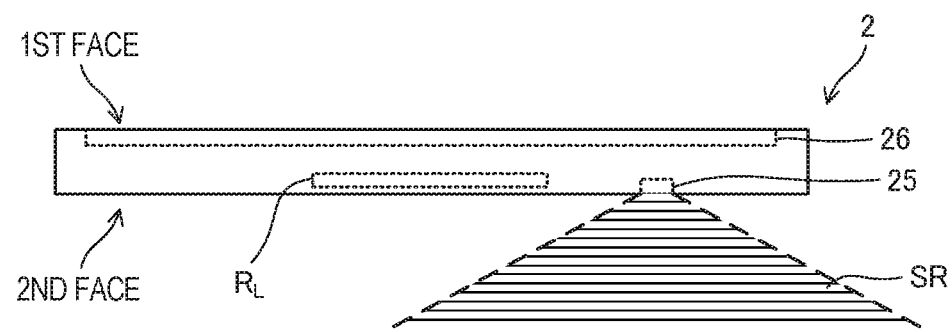
Figure 35C:
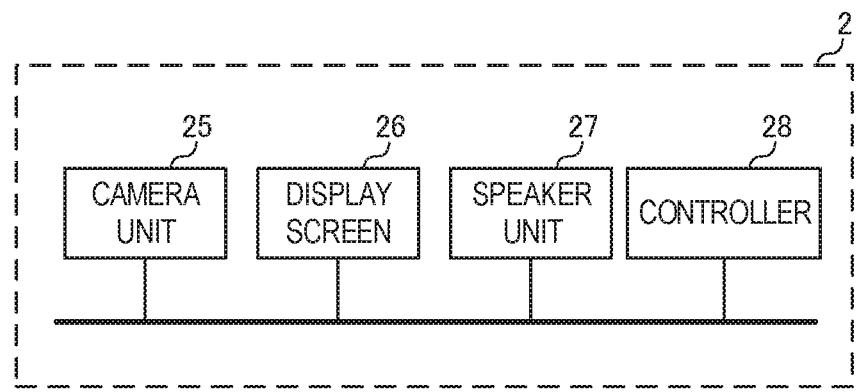

FIG. 35A is a perspective exterior view of an electronic appliance 2 assumed in this embodiment, and FIG. 35B is a side view of the electronic appliance 2. In FIG. 35B, of the components of the electronic appliance 2, only the reception-side coil $R_L$, a camera unit 25, and a display screen 26, which are provided on or in the housing of the electronic appliance 2, are indicated by broken lines. FIG. 35C is a partial functional block diagram of the electronic appliance 2. The electronic appliance 2 includes the camera unit 25, the display screen 26, a speaker unit 27, and a controller 28. The camera unit 25, the display screen 26, the speaker unit 27, and the controller 28 can be taken as constituent elements of the functional circuit 22 (see FIG. 2).

The housing of the electronic appliance 2 has a generally rectangular parallelepiped shape; accordingly, the housing of the electronic appliance 2 has a first face and a second face opposite the first face. The display screen 26 is provided on the first face, and a user facing the first face can view the display screen 26. The camera unit 25 has a shooting region (field of view) SR that widens, starting on the second face, in the direction pointing from the first face to the second face. The optical axis of the camera unit 25 is perpendicular to the second face. Of the first and second faces, the second face faces the placement surface 12a. That is, when the electronic appliance 2 is placed on the placement surface 12a with the intention of making it perform NFC communication and power transfer, the second face makes contact with the placement surface 12a.

The camera unit 25 shoots an image to generate and acquire an image signal (image data) representing the shot image. More specifically, the camera unit 25 includes an image sensing device comprising a CCD (charge-coupled device) or CMOS (complementary metal-oxide-semiconductor) image sensor and an optical system. The camera unit 25 performs photoelectric conversion on the optical image represented by the incident light from the shooting region SR, and thereby obtains, as a shot image, the optical image of the subject within the shooting region SR. It is here assumed that the subject within the shooting region SR includes the placement surface 12a and the guide mark MK. The shot image produced by the camera unit 25 is a two-dimensional image composed of a plurality of pixels arrayed in both the horizontal and vertical directions. The reception-side coil $R_L$ and the camera unit 25 are provided stationarily at a first and a second predetermined position in the housing of the electronic appliance 2, and the positional relationship between the reception-side coil $R_L$ and the camera unit 25 (more precisely, the positional relationship between the center of the reception-side coil $R_L$ and the optical center of the camera unit 25 or the center of the image sensing device) is determined previously.

The display screen 26 comprises a liquid crystal display panel or the like, and, under the control of the controller 28, displays any image including the shot image from the camera unit 25. The speaker unit 27, under the control of the controller 28, outputs any audio signal as sound. The controller 28 includes a CPU (central processing unit), ROM (read-only memory), RAM (random-access memory), and the like. The controller 28 performs various arithmetic operations, and also controls the operation of the individual blocks in the electronic appliance 2 in a comprehensive manner. The controller 28 may be understood as included in the control circuit 250 (see FIG. 28).

[Guiding Process Including a Notifying Process]

As the electronic appliance 2 is brought closer to the placement surface 12a starting in the detached state, the controller 28 can start a guiding program previously stored in the ROM in it and perform a guiding process according to the guiding program.

The guiding program may be started in response to an instruction from the user of the electronic appliance 2. Specifically, for example, the guiding program may start, when the user of the electronic appliance 2 enters a predetermined operation on the operation unit of the electronic appliance 2, in response to the input. The operation unit may comprise unillustrated buttons provided on the electronic appliance 2, or the display screen 26 configured as a touch screen may function as the operation unit. When not performing power transfer, the power feeding appliance 1 transmits the inquiry signal 510 in FIG. 29 periodically; as the electronic appliance 2 is brought closer to the placement surface 12a to a certain degree starting in the detached state, the inquiry signal 510 is received by the electronic appliance 2. The controller 28 can then, in response to the reception of the inquiry signal 510, start the guiding program without being instructed by the user. In a case where the camera unit 25 is configured such that the shooting angle of view is optically or electronically variable within a predetermined angle-of-view range, when the guiding process is performed, the shooting angle of view can be fixed at the maximum angle of view within the angle-of-view range to make it easy for the guide mark MK to remain within the shooting region SR.

FIG. 36 is a flow chart of the guiding process. In the guiding process, the operation at steps S231 through S233 is performed repeatedly. At step S231, the camera unit 25 acquires a shot image of the guide mark MK. It is assumed that, unless otherwise stated, any shot image in the following description, including the one acquired at step S231, is a shot image that is acquired before the electronic appliance 2 is placed on the placement surface 12a and that in addition is in a state where the guide mark MK appears within the shooting region SR (that is, a shot image according to an image signal containing the image signal of the guide mark MK). It is also assumed that the second face of the housing of the electronic appliance 2 is parallel to the placement surface 12a, and thus the optical axis of the camera unit 25 is perpendicular to the placement surface 12a.

Subsequently, at step S232, based on the image signal of the shot image acquired at step S231, the controller 28 detects the guide mark MK on the shot image. The detection here involves detecting the position [p, q] and size SIZE of the guide mark MK on the shot image. The position [p, q] represents the center position (center coordinates) of the guide mark MK on the shot image. The size SIZE of the guide mark MK on the shot image is the size of the region in the shot image in which the image signal of the guide mark MK fits, and is given as a number of pixels that belong to the region. The controller 28 previously holds a template image which is an image of the guide mark MK, and can carry out the detection at step S232 through template matching using the template image.

Subsequently, at step S233, the controller 28 performs a notifying process to give the user a notification according to the result of the detection at step S232. In the notifying process, as to adjustment of the positional relationship between the appliances 1 and 2, an indicator is notified, of which the details will be given later. After step S233, a return is made to step S231, so that, based on the most recent shot image, the operation at step S231 through S233 is repeated. Meanwhile, the camera unit 25 acquires shot images sequentially at a predetermined frame period.

FIG. 37A and FIG. 37B show examples of shot images obtained when the distance d between the electronic appliance 2 and the placement surface 12a (more precisely, the distance between the second face of the housing of the electronic appliance 2 and the placement surface 12a) is comparatively long and when it is comparatively short. In any diagram showing a shot image, it is assumed that the shot image has an aspect ratio of 5:3, and the image region of the placement surface 12a excluding the guide mark MK is represented as a dotted region. Whereas the shot image in FIG. 37A corresponding to a comparatively long distance d contains the image of the exterior shape of the placement surface 12a, the shot image in FIG. 37B corresponding to a comparatively short distance d does not contain the image of the exterior shape of the placement surface 12a. The shot image is composed of a plurality of pixels arrayed along each of a P axis parallel to the horizontal direction of the image space and a Q axis parallel to the vertical direction of the image space, p and q at the position [p, q] thus representing the coordinate values in the P-axis and Q-axis directions respectively.

Based on the size of the guide mark MK in the real space and the shooting parameters of the camera unit 25 (the shooting angle of view and focal length of the camera unit 25, the size and the effective number of pixels of the image sensing device, and the like), it is possible to calculate, from the size SIZE of the guide mark MK on the shot image, the distance d between the electronic appliance 2 and the placement surface 12a (more precisely, the distance between the second face of the housing of the electronic appliance 2 and the placement surface 12a).

The controller 28 determines the distance d by converting the size SIZE to the distance d based on a predetermined calculation formula or previously prepared table data which defines the relationship between the size SIZE of the guide mark MK on the shot image and the distance d between the electronic appliance 2 and the placement surface 12a. Then based on the determined distance d, the controller 28 identifies the ideal center position $[p_O, q_O]$ which is the ideal center position of the guide mark MK on the shot image. For example, table data as shown in FIG. 38 can be previously stored in the ROM in the controller 28. In the table data in FIG. 38, for any integer i that fulfills "$1 \le i \le n$", the size $SIZE_i$ of the guide mark MK on the shot image, the distance $d_i$ between the electronic appliance 2 and the placement surface 12a, and the ideal center position $[p_{Oi}, q_{Oi}]$ of the guide mark MK on the shot image are associated with each other (where n is an integer of 2 or more). By use of the table data in F. 38, from the size $SIZE_i$ of the guide mark MK on the shot image, the distance $d_i$ and the ideal center position $[p_{Oi}, q_{Oi}]$ are identified. The sizes $SIZE_1$ to $SIZE_n$ are a first to an nth size SIZE which differ from each other, and the distances $d_1$ to $d_n$ are a first to an nth distance d which differ from each other. The ideal center positions $[p_{O1}, q_{O1}]$ to $[p_{On}, q_{On}]$ are a first to an nth ideal center position $[p_O, q_O]$ which correspond to the sizes $SIZE_1$ to $SIZE_n$ and which in addition correspond to the distances $d_1$ to $d_n$. In a case where the size SIZE of the detected guide mark MK lies between $SIZE_i$ and $SIZE_{i+1}$, the distance d and the ideal center position d $[p_O, q_O]$ can be identified through interpolation based on the distances $d_i$ and $d_{i+1}$ and interpolation based on the positions $[p_{Oi}, q_{Oi}]$ and $[p_{Oi+1}, q_{Oi+1}]$.

An additional description will now be given of the ideal center position of the guide mark MK on the shot image. FIG. 39 and FIG. 40 are a side view (as seen from the X-axis direction) and a perspective view, respectively, of the power feeding appliance 1 and the electronic appliance 2 arranged apart from each other. For the sake of convenience, in FIG. 39, the transmission-side coil $T_L$ and the reception-side coil $R_L$ are indicated by broken lines, and in FIG. 40, only the transmission-side coil $T_L$ is indicated by broken lines. In FIG. 39 and FIG. 40, the position 630 is the same as that shown in FIG. 34B, that is, the projected position of the center of the transmission-side coil $T_L$ on the placement surface 12a (hereinafter also referred to as the transmission-side coil projected position), and a position 640 is the projected position of the center of the reception-side coil $R_L$ on the placement surface 12a (hereinafter also referred to as the reception-side coil projected position). It is here assumed that the center position 620 of the guide mark MK and the transmission-side coil projected position 630 lie on a straight line parallel to the X axis, and that the center position 620 of the guide mark MK is located at a position a predetermined distance away from the transmission-side coil projected position 630 in the negative direction of the X axis. A region 631 is a predetermined region on the placement surface 12a (hereinafter also referred to as the target arrangement region) determined based on the transmission-side coil projected position 630, and the center position of the target arrangement region 631 coincides with the transmission-side coil projected position 630.

When the electronic appliance 2 is placed on the placement surface 12a with the reception-side coil projected position 640 lying inside the target arrangement region 631, not only is NFC communication between the appliances 1 and 2 reliably possible, but power transfer is also possible with transfer efficiency equal to or higher than a predetermined value. When the electronic appliance 2 is placed on the placement surface 12a with the reception-side coil projected position 640 coincident with the transmission-side coil projected position 630, the regularly placed state mentioned earlier is attained, so that the coupling efficiency between the coils $T_L$ and $R_L$ is maximized, and the transfer efficiency of power transfer is maximized. According to the standard mentioned with reference to FIG. 32, the target arrangement region 631 is a circular region with a radius of 10 mm. This, however, is not meant to limit the shape and size of the target arrangement region 631.

The ideal center position $[p_O, q_O]$ of the guide mark MK on the shot image is the center position of the guide mark MK on the shot image as observed when the projected positions 630 and 640 coincide. The controller 28 can be previously fed with known information including information on the positional relationship between the center position 620 of the guide mark MK and the transmission-side coil projected position 630 in the real space, information on the positional relationship between the center of the reception-side coil $R_L$ and the optical center of the camera unit 25 or the center of the image sensing device, and information on the shooting parameters of the camera unit 25 (the shooting angle of view and focal length of the camera unit 25, the size and the effective number of pixels of the image sensing device, and the like). By using the known information, the controller 28 can then identify the ideal center position $[p_O, q_O]$ for each of the distances $d_1$ to $d_n$.

In the guiding process, a notifying process (step S233 in FIG. 36) is performed to encourage the reception-side coil projected position 640 to be located within the target arrangement region 631 and ideally coincide with the transmission-side coil projected position 630.

Specifically, in the guiding process, the controller 28 detects the position [p, q] and the size SIZE of the guide mark MK on the shot image based on the image signal of the shot image, then identifies the ideal center position $[p_O, q_O]$ from the detected size SIZE, and then performs a notifying process (step S233 in FIG. 36) based on the detected position [p, q] and the identified ideal center position $[p_O, q_O]$. In the notifying process, an indicator related to adjustment of the positional relationship between the appliances 1 and 2 (hereinafter referred to as the positional relationship adjustment indicator) is notified. The notification of the positional relationship adjustment indicator may be an express presentation or an implicit suggestion of the positional relationship adjustment indicator. In the present description, notification means notification that is performed to the user of the non-contact power feeding system. Notification may be performed in any manner perceivable to any of the five senses of the user. For example, notification may be performed by sound output from the speaker unit 27, but can be performed at least by display on the display screen 26.

The positional relationship between the appliances 1 and 2 related to the positional relationship adjustment indicator denotes the positional relationship between the appliances 1 and 2 on a plane parallel to the placement surface 12a (in the direction parallel to the placement surface 12a). In the following description, the positional relationship between the appliances 1 and 2 can be taken as the positional relationship between the appliances 1 and 2 on a plane parallel to the placement surface 12*a* (in the direction parallel to the placement surface 12*a*).

Figure 41:
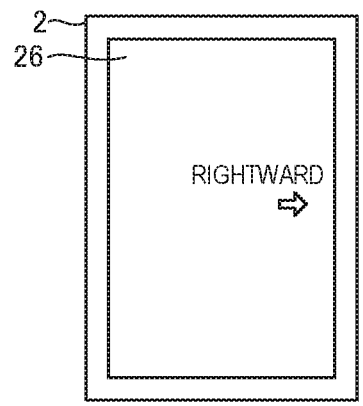
FIG. 41 is a diagram illustrating an example of a notification of a necessary movement direction according to the fourth embodiment of the present invention.

As one kind of the positional relationship adjustment indicator, a necessary movement direction (necessary movement direction indicator) indicates the direction in which the electronic appliance 2 needs to be moved relative to the power feeding appliance 1 to bring the reception-side coil projected position 640 within the target arrangement region 631 (more precisely, to make it coincide with the transmission-side coil projected position 630), and hence to make power transfer possible. That is, the necessary movement direction is the direction (on the XY plane) in which the electronic appliance 2 should be moved relative to the position of the power feeding appliance 1 to bring the reception-side coil projected position 640 within the target arrangement region 631 (ideally, to make it coincide with the transmission-side coil projected position 630), and thereby to make power transfer possible. The notification of the necessary movement direction can include the display of an arrow image and/or a character image indicating the necessary movement direction on the display screen 26 (see FIG. 41), and can include the output of sound indicating the necessary movement direction from the speaker unit 27. With respect to the notification of the necessary movement direction, the display of an image on the display screen 26 is notification to the sense of vision, and the output of sound from the speaker unit 27 is notification to the sense of hearing (similar statements hold with any other notification).

To the controller 28, information on the positional relationship between the center position 620 of the guide mark MK and the transmission-side coil projected position 630 in the real space, information on the positional relationship between the center of the reception-side coil $R_L$ and the optical center of the camera unit 25 or the center of the image sensing device, and information on the shooting parameters of the camera unit 25 (the shooting angle of view and focal length of the camera unit 25, the size and the effective number of pixels of the image sensing device, and the like) are known. Based on these sets of information, the detected position [p, q] of the guide mark MK on the shot image, and the ideal center position [$p_O$, $q_O$], the necessary movement direction is determined.

More specifically, referring to FIG. 42A to FIG. 42D, suppose, for example, it is previously determined, based on the known information mentioned above, that, when the detected position [p, q] of the guide mark MK on the shot image is deviated from the ideal center position [$p_O$, $q_O$] in the positive direction of the Q axis, in the negative direction of the Q axis, in the positive direction of the P axis, or in the negative direction of the P axis, the necessary movement direction is the rightward, leftward, rearward, or frontward direction respectively. Then, if the detected position [p, q] of the guide mark MK on the shot image is recognized to be deviated from the ideal center position [$p_O$, $q_O$] in the positive direction of the Q axis, in the negative direction of the Q axis, in the positive direction of the P axis, or in the negative direction of the P axis, the controller 28 can notify as the necessary movement direction the rightward, leftward, rearward, or frontward direction respectively. Here, the rightward, leftward, rearward, and frontward directions coincide respectively with the positive direction of the Y axis, the negative direction of the Y axis, the positive direction of the X axis, and the negative direction of the X axis (see also FIG. 40). The frontward, rearward, leftward, and rightward directions here correspond to those as seen from a user viewing the display screen 26 at a position facing the display screen 26 and the placement surface 12*a*. It should be noted however that, for the user, the direction pointing from the transmission-side coil projected position 630 to the center position 620 of the guide mark MK is the frontward direction.

It is here assumed that the shot image is acquired under the following standard shooting conditions. Under the standard shooting conditions, on the shot image, the centers of the character marks "N" and "M" in the guide mark MK lie beside each other on the P axis, and in addition the character mark "N" is located on the negative side along the P axis relative to the character mark "M". Under the standard shooting conditions, the inclination of the guide mark MK on the shot image is zero. If, for argument's sake, the electronic appliance 2 is rotated about the optical axis of the camera unit 25 relative to the standard shooting conditions, the direction and angle of the rotation can be detected from the direction and size of the inclination of the guide mark MK on the shot image; the necessary movement direction can then be determined with consideration given also to the results of that detection.

As shown in FIG. 43, the appliances 1 and 2 may be configured such that, when the transmission-side coil projected position 630 and the reception-side coil projected position 640 coincide with each other, the center position 620 of the guide mark MK lies on the optical axis of the camera unit 25. In that case, when the center position [p, q] of the guide mark MK on the shot image is located at the center of the shot image, the projected positions 630 and 640 coincide; thus, irrespective of the distance d, the ideal center position [$p_O$, $q_O$] always coincides with the center of the shot image (and thus the detection of the size SIZE for the determination of the ideal center position [$p_O$, $q_O$] is no longer essential).

In the guiding process, based on the result of the detection of the guide mark MK on the shot image (the result of the detection of the position [p, q] or the result of the detection of the position [p, q] and the size SIZE), the controller 28 checks whether or not the reception-side coil projected position 640 lies within the target arrangement region 631. If it is judged that the reception-side coil projected position 640 does not lie within the target arrangement region 631, the controller 28 gives a notification of the necessary movement direction as described above; on the other hand, if it is judged that the reception-side coil projected position 640 lies within the target arrangement region 631, the controller 28 can give, instead of a notification of the necessary movement direction (a necessary movement direction indicator), a notification of a predetermined adjustment propriety indicator. Also the adjustment propriety indicator can be understood to be a kind of indicator (a positional relationship adjustment indicator) related to the adjustment of the positional relationship between the appliances 1 and 2.

The adjustment propriety indicator is an indicator that indicates that the reception-side coil projected position 640 likes within the target arrangement region 631. Accordingly, when the adjustment propriety indicator is notified, bringing the electronic appliance 2 straight down toward the placement surface 12*a* perpendicularly to it permits the electronic appliance 2 to be placed on the placement surface 12*a* while the reception-side coil projected position 640 remains within the target arrangement region 631. The notification of the adjustment propriety indicator includes display of a predetermined image indicating that the positional relationship between the appliances 1 and 2 is proper or that the electronic appliance 2 can be brought straight down onto the placement surface 12*a* (see FIG. 44), and can include output of predetermined sound indicating that the positional relationship between the appliances 1 and 2 is proper or that the electronic appliance 2 can be brought straight down onto the placement surface 12*a*.

The controller 28 can be previously fed with known information including information on the positional relationship between, at one end, the center position 620 of the guide mark MK and, at the other end, the transmission-side coil projected position 630 and the target arrangement region 631, all in the real space, information on the positional relationship between the center of the reception-side coil $R_L$ and the optical center of the camera unit 25 or the center of the image sensing device, and information on the shooting parameters of the camera unit 25 (the shooting angle of view and focal length of the camera unit 25, the size and the effective number of pixels of the image sensing device, and the like). By using the known information, when the reception-side coil projected position 640 lies within the target arrangement region 631, the controller 28 can identify an image region A to which the position [p, q] should belong on the shot image. The image region A is a region to which the ideal center position [$p_O$, $q_O$] belongs, and is identified for each of the distances $d_1$ to $d_n$. Typically, the image region A is a circular image region having its center at the ideal center position [$p_O$, $q_O$], and the size of the image region A is the larger the smaller the distance d. The controller 28 can, by checking whether or not the detection position [p, q] of the guide mark MK on the shot image belongs to a predetermined image region A, check whether or not the reception-side coil projected position 640 lies within the target arrangement region 631.

Instead, for example, the controller 28 may find the distance between the detected position [p, q] of the guide mark MK on the shot image and the ideal center position [$p_O$, $q_O$] so that the controller 28 can, by checking whether or not the distance is equal to or less than a predetermined value on the shot image, check whether or not the reception-side coil projected position 640 lies within the target arrangement region 631. The predetermined value here depends on the distance d between the appliances 1 and 2.

The indicator related to the adjustment of the positional relationship between the appliances 1 and 2 (the positional relationship adjustment indicator) may be in any form. For example, as shown in FIG. 45A and FIG. 45B, in the guiding process, the controller 28 can, while displaying a predetermined reference frame image 671 on the display screen 26, display an adjustment frame image 672 according to the detection result of the guide mark MK on the shot image as well on the display screen 26. Whereas the reference frame image 671 is displayed fixedly at a predetermined position on the display screen 26, the display position of the adjustment frame image 672 varies with the detection result of the guide mark MK on the shot image.

Specifically, for example, if the reception-side coil projected position 640 is judged not to lie within the target arrangement region 631 and in addition the necessary movement direction is the rightward, leftward, rearward, or frontward direction, the adjustment frame image 672 is displayed in a position shifted in the rightward, leftward, rearward, or frontward direction respectively relative to the reference frame image 671 (see FIG. 45A). At this time, the controller 28 can increase the amount of shifting the greater the distance between the detected position [p, q] of the guide mark MK on the shot image and the ideal center position [$p_O$, $q_O$]. If it is judged that the reception-side coil projected position 640 lies within the target arrangement region 631, display is performed such that the reference frame image 671 and the adjustment frame image 672 overlap with each other on the display screen 26 or such that the adjustment frame image 672 lies inside the reference frame image 671 (see FIG. 45B).

The user of the electronic appliance 2 thus performs position adjustment of the electronic appliance 2 in the X-axis or Y-axis direction such that, on the display screen 26, the reference frame image 671 and the adjustment frame image 672 overlap with each other or the adjustment frame image 672 lies inside the reference frame image 671 as if performing a shooting game. When the reception-side coil projected position 640 is judged not to lie within the target arrangement region 631, displaying the adjustment frame image 672 at a position shifted in the rightward, leftward, rearward, or frontward direction relative to the reference frame image 671 corresponds to notifying the necessary movement direction (necessary movement direction indicator). When the reception-side coil projected position 640 is judged to lie within the target arrangement region 631, displaying the reference frame image 671 and the adjustment frame image 672 in a way overlapping with each other or displaying the adjustment frame image 672 inside the reference frame image 671 corresponds to notifying the adjustment propriety indicator.

After the start of the guiding process, when the electronic appliance 2 comes close to the placement surface 12*a* to a considerable degree and the distance d between the electronic appliance 2 and the placement surface 12*a* becomes equal to or less than a predetermined distance, the shot image becomes blurred or part or the whole of the guide mark MK moves outside the shooting region SR, and this makes the guide mark MK undetectable from the shot image. When this undetectable state lasts for a predetermined time (for example, several hundred milliseconds), the controller 28 ends the guiding process. Instead, for example, after the start of the guiding process, when the electronic appliance 2 comes close to the placement surface 12*a* to a considerable degree and the size SIZE of the guide mark MK on the shot image becomes equal to or larger than a predetermined size, the controller 28 can end the guiding process.

[Second Notifying Process]

Before the start of the guiding process or during the execution of the guiding process, when the reception of the inquiry signal 510 or the verification signal 550 (see FIG. 29) by the NFC communication circuit 220 is confirmed, the controller 28 can control the NFC communication circuit 220 such that the transmission of the response signal 520 or the response signal 560 is performed, for example, after the end of the guiding process. That is, after the start of the guiding process, when a predetermined end condition is fulfilled, the controller 28 can end the guiding process and, after the end of the guiding process, transmit the response signal 520 or response signal 560 to the power feeding appliance 1 by using the NFC communication circuit 220. In the power feeding appliance 1, unless the reception of the response signal 520 or the response signal 560 is gone through, power transfer 570 is not started (see FIG. 29), and thus, before the end of the guiding process, execution of power transmission is restricted. Through the guiding process, properization of the positional relationship between the appliances 1 and 2 is ensured, and thus it is desirable that, after such ensuring, power transfer 570 be performed; however, waiting for the end of the guiding process and then performing power transfer promotes the ensuring. If the properization of the positional relationship between the appliances 1 and 2 is insufficient, during power transfer, the output from the power transmission circuit 130 may be discharged as an unnecessary radiation; however, waiting for the end of the guiding process and then performing power transfer is expected to reduce such possibility. In the following description, as an example, it is assumed that, before the start of the guiding process or during the execution of the guiding process, when the reception of the inquiry signal 510 (see FIG. 29) by the NFC communication circuit 220 is confirmed, the controller 28 controls the NFC communication circuit 220 such that the transmission of the response signal 520 is performed after the end of the guiding process. After the transmission of the response signal 520, until power transfer 570 is started, the controller 28 can perform a second notifying process as described below. The controller 28 can perform the second notifying process even in a state where the electronic appliance 2 is already placed on the placement surface 12a.

Figure 46:
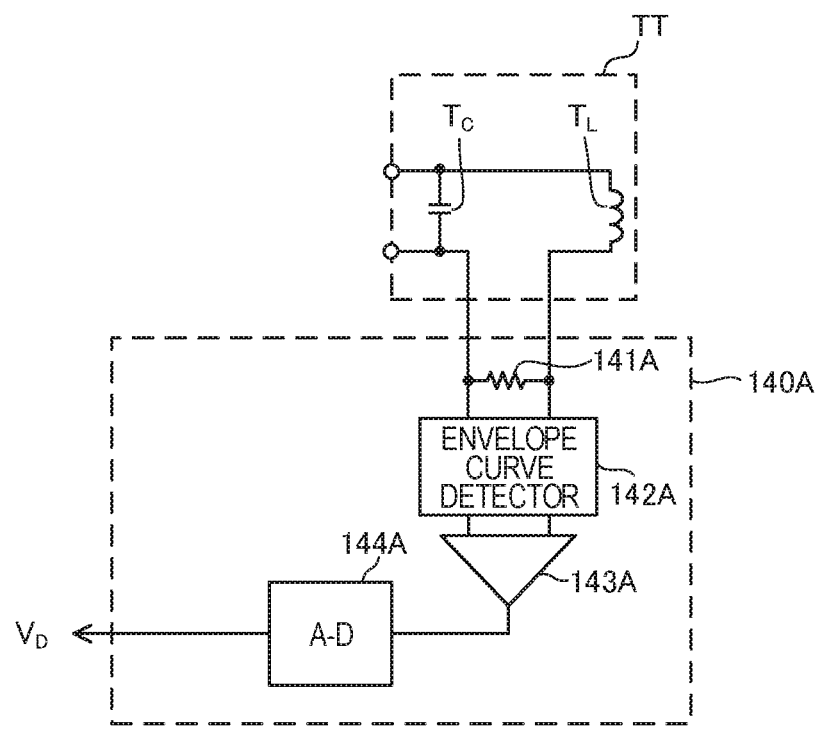
FIG. 46 is a circuit diagram of a resonance circuit and a current amplitude sensing circuit in the power feeding appliance according to the fourth embodiment of the present invention.

In the second notifying process, current amplitude information generated in the power feeding appliance 1 is utilized. The power feeding appliance 1 (for example, IC 100) includes a current amplitude sensing circuit 140A as shown in FIG. 46 which senses the amplitude of the current passing in the transmission-side coil $T_L$ (hereinafter referred to also as the current amplitude in the transmission-side coil $T_L$). For example, the current amplitude sensing circuit 140A can be composed of: a sense resistor 141A which is connected in series with the transmission-side coil $T_L$ and in which the same current passes as the current that passes in the transmission-side coil $T_L$; an envelope curve detector 142A which detects the envelope curve of the signal of the voltage drop across the sense resistor 141A; an amplifier 143A which amplifies the thus detected signal; and an A-D converter 144A which converts the thus amplified signal into a digital signal. The output digital value $V_D$ of the A-D converter 144A thus represents the current amplitude in the transmission-side coil $T_L$.

In the power feeding appliance 1, before the start of power transfer 570, the NFC communication circuit 120 feeds an alternating-current voltage at the reference frequency with a predetermined amplitude to the resonance circuit TT for NFC communication, so that a communication magnetic field is generated in the transmission-side coil $T_L$. Then, after the reception of the response signal 520 before the start of power transfer 570, while the communication magnetic field is being generated in the transmission-side coil $T_L$, the control circuit 160 can periodically generate and acquire current amplitude information representing the current amplitude in the transmission-side coil $T_L$ based on the output digital value $V_D$ of the A-D converter 144A, and can periodically transmit the acquired current amplitude information to the electronic appliance 2 by NFC communication by using the NFC communication circuit 120. The current amplitude information may be contained in the verification signal 550 (see FIG. 29).

The controller 28 can perform the second notifying process according to the current amplitude information received from the power feeding appliance 1 by NFC communication. Seen from the transmission-side coil $T_L$, which generates a magnetic field, a coil, like the reception-side coil $R_L$, that magnetically couples with the transmission-side coil $T_L$ can be taken as a load; thus, depending on the magnitude of the load, the current amplitude in the transmission-side coil $T_L$ varies. Specifically, the higher the degree of magnetic coupling between the coils $T_L$ and $R_L$, the smaller the current amplitude in the transmission-side coil $T_L$. Accordingly, based on the current amplitude information, it is possible to judge whether or not the positional relationship between the appliances 1 and 2 is proper.

Specifically, for example, in the second notifying process, the controller 28 can notify whether or not the positional relationship between the appliances 1 and 2 is proper. The controller 28 can compare the current amplitude $I_{AMP}$ in the transmission-side coil $T_L$ as conveyed by the current amplitude information with a predetermined amplitude; the controller 28 can then, if the current amplitude $I_{AMP}$ in the transmission-side coil $T_L$ is equal to or smaller than a predetermined amplitude, judge that the positional relationship between the appliances 1 and 2 is proper and display a predetermined propriety image to that effect on the display screen 26 and/or output predetermined propriety sound to that effect from the speaker unit 27, or, if the current amplitude $I_{AMP}$ in the transmission-side coil $T_L$ is larger than a predetermined amplitude, judge that the positional relationship between the appliances 1 and 2 is improper and display a predetermined impropriety image to that effect on the display screen 26 and/or output predetermined impropriety sound to that effect from the speaker unit 27.

After the verification signal 550 is received in the NFC communication circuit 220 until the positional relationship between the appliances 1 and 2 is judged to be proper based on the current amplitude information, the controller 28 can restrict (inhibit) the transmission of the response signal 560 by the NFC communication circuit 220. Then, power transfer 570 is performed only after the positional relationship between the appliances 1 and 2 is judged to be proper based on the current amplitude information, and thus power transfer 570 in a proper state is ensured. However, it is also possible to transmit the response signal 560 to the power feeding appliance 1 promptly once the verification signal 550 is received in the NFC communication circuit 220 without depending on the result of the judgment of whether or not the positional relationship between the appliances 1 and 2 is proper. After the transmission of the response signal 560, the controller 28 can end the second notifying process.

Instead, for example, in the second notifying process, the controller 28 can classify and notify the propriety level of the positional relationship between the appliances 1 and 2 in three or more grades. A description will now be given of a case where the propriety level of the positional relationship between the appliances 1 and 2 is classified and notified in three or more grades. The display screen 26 is configured to be capable of displaying selectively one of bar images with mutually different first, second, and third lengths respectively. Of the first to third lengths, the first length is the smallest, and the third length is the largest. The display of the bar images with the first, second, and third lengths indicates that the propriety level of the positional relationship between the appliances 1 and 2 is at the first, second, and third levels respectively. With respect to the propriety level, of the first to third levels, the first level is the lowest, and the third level is the highest.

The controller 28 compares the current amplitude $I_{AMP}$ in the transmission-side coil $T_L$ as conveyed by the current amplitude information with each of predetermined first and second reference amplitudes REF1 and REF2 (0<REF1≤REF2). When "$I_{AMP}$≤REF1" holds, the controller 28 judges that the propriety level of the positional relationship between the appliances 1 and 2 is at the third level, and has the bar image with the third length displayed on the display screen 26; when "REF1<$I_{AMP}$≤REF2" holds, the controller 28 judges that the propriety level of the positional relationship between the appliances 1 and 2 is at the second level, and has the bar image with the second length displayed on the display screen 26; when "REF2<$I_{AMP}$" holds, the controller 28 judges that the propriety level of the positional relationship between the appliances 1 and 2 is at the first level, and has the bar image with the first length displayed on the display screen 26.

After the verification signal 550 is received in the NFC communication circuit 220 until the propriety level of the positional relationship between the appliances 1 and 2 is judged to be at the predetermined or higher level based on the current amplitude information, the controller 28 may restrict (inhibit) the transmission of the response signal 560 by the NFC communication circuit 220. The predetermined level is the second or third level, and does not include the first level. Thus, only after the positional relationship between the appliances 1 and 2 is judged to be at the second or third level based on the current amplitude information, power transfer 570 is performed; thus, power transfer 570 with comparatively good transfer efficiency is ensured. However, when the verification signal 550 is received in the communication circuit 220, then promptly, without depending on the judgment result of the propriety level of the positional relationship between the appliances 1 and 2, the response signal 560 may be transmitted to the power feeding appliance 1. After the transmission of the response signal 560, the controller 28 may end the second notifying process.

The second notifying process by the controller 28 may be performed in a power feeding-side controller provided in the power feeding appliance 1. Taken as the power feeding-side controller here may be the control circuit 160 (see FIG. 27), or any controller other than the control circuit 160. In a case where the second notifying process is performed in the power feeding-side controller, a display screen and a speaker unit similar to the display screen 26 and the speaker unit 27 can be provided in the power feeding appliance 1 so that the power feeding-side controller can give various notifications in the second notifying process based on the current amplitude information by using, instead of the display screen 26 and the speaker unit 27, the display screen and the speaker unit in the power feeding appliance 1.

For example, in the second notifying process, the power feeding-side controller can notify whether or not the positional relationship between the appliances 1 and 2 is proper, and how to judge whether or not the positional relationship between the appliances 1 and 2 is proper and what to notify based on the judgment result are as described above. In that case, until the positional relationship between the appliances 1 and 2 is judged to be proper based on the current amplitude information, the power feeding-side controller can restrict (inhibit) the start of power transfer 570. Thus, power transfer 570 in a proper state is ensured. Instead, power transfer 570 may be started promptly when the response signal 560 is received in the NFC communication circuit 120 without depending on the judgement result of whether or not the positional relationship between the appliances 1 and 2 is proper. The power feeding-side controller may end the second notifying process after the reception of the response signal 560 before the start of power transfer 570.

Instead, for example, in the second notifying process, the power feeding-side controller can classify and notify the propriety level of the positional relationship between the appliances 1 and 2 in three or more grades. How to judge the propriety level of the positional relationship between the appliances 1 and 2 and what to notify based on the judgement result are as described above. In that case, until the propriety level of the positional relationship between the appliances 1 and 2 is judged to be at the predetermined or higher level based on the current amplitude information, the power feeding-side controller may restrict (inhibit) the start of power transfer 570. The predetermined level is the second or third level, and does not include the first level; thus, power transfer 570 with comparatively good transfer efficiency is ensured. It is also possible to start power transfer 570 promptly when the response signal 560 is received in the NFC communication circuit 120 without depending on the judgement result of the propriety level of the positional relationship between the appliances 1 and 2. The power feeding-side controller may end the second notifying process after the reception of the response signal 560 before the start of power transfer 570.

The power feeding appliance 1 may be a kind of electronic appliance that can carry out a function similar to the function of the functional circuit 22 in the electronic appliance 2. Specifically, for example, the power feeding appliance 1 and the electronic appliance 2 may each be a mobile telephone (including one classified as a smartphone), and in that case, power transfer by NFC is performed between two mobile telephones.

The current amplitude sensing circuit 140A shown in FIG. 46 may be the load sensing circuit 140 in FIG. 7 described in connection with the first embodiment.

<<Studies on the Present Invention, Part 2>>

To follow are studies on the present invention as embodied as the embodiments described above.

A non-contact power feeding system $W_2$ according to one aspect of the present invention is a non-contact power feeding system that comprises a power transmission device including a transmission-side resonance circuit (TT) having a transmission-side coil ($T_L$) for transmitting electric power and a power reception device including a reception-side resonance circuit (RR) having a reception-side coil ($R_L$) for receiving the electric power and that allows transmission and reception of electric power between them by magnetic field resonance, and is configured as follows. The power transmission device includes a placement surface (12a) on which the power reception device is placed during transmission and reception of the electric power, and a predetermined mark (MK) is indicated at a predetermined position on the placement surface based on the arrangement position of the transmission-side coil. The power reception device includes: a camera unit (25) which shoots an image; and a controller (28) which detects the mark on a shot image obtained by shooting the mark before the power reception device is placed on the placement surface and which gives a particular notification based on the result of detection of the mark.

Indicating a mark at a predetermined position on the placement surface based on the arrangement position of the transmission-side coil and letting the power reception device detect the mark on a shot image obtained by shooting the mark makes it possible, based on the result of the detection, to grasp the positional relationship between the camera unit and the transmission-side coil, and hence to grasp the positional relationship between the reception-side coil, which as a matter of course is in a predetermined positional relationship with the camera unit within the power reception device, and the transmission-side coil. It is then possible, in a particular notification based on the result of detection of the mark, to give a notification that aids in making the positional relationship between the power transmission device and the power reception device one suitable for transmission and reception of electric power, and thus aids in carrying out satisfactory electric power transmission and reception (aids in properizing the placement position of the power reception device).

Specifically, for example, with respect to the non-contact power feeding system $W_2$, based on the result of detection of the mark on the shot image, the controller can give, in the particular notification, a notification as to adjustment of the positional relationship between the power transmission device and the power reception device on a plane parallel to the placement surface.

More specifically, for example, with respect to the non-contact power feeding system $W_2$, the notification as to adjustment of the positional relationship can include a notification of the necessary movement direction of the power reception device relative to the power transmission device on the plane parallel to the placement surface to perform transmission and reception of the electric power.

This makes it possible to make the user recognize the necessity for adjustment of the positional relationship between the power transmission device and the power reception device on a plane parallel to the placement surface, and aids in making the positional relationship one suitable for transmission and reception of electric power.

More specifically, for example, with respect to the non-contact power feeding system $W_2$, transmission and reception of the electric power can be made possible when the power reception device is placed on the placement surface such that the projected position (640) of the center of the reception-side coil on the placement surface lies within a predetermined region (631) on the placement surface based on the arrangement position of the transmission-side coil, and the notification as to adjustment of the positional relationship can include a notification of the necessary movement direction to bring the projected position within the predetermined region.

Then, for example, with respect to the non-contact power feeding system $W_2$, the controller can judge whether or not the projected position lies within the predetermined region based on the result of detection of the mark on the shot image, and, if the projected position does not lie within the predetermined region, notify the necessary movement direction or, if the projected position lies within the predetermined region, give a predetermined notification different from the notification of the necessary movement direction.

In this way, for example, when the projected position does not lie within the predetermined region, it is possible to notify the necessary movement direction to make the user recognize the necessity for adjustment of the positional relationship between the power transmission device and the power reception device on a plane parallel to the placement surface and to aid in making the positional relationship one suitable for transmission and reception of electric power. When the projected position lies within the predetermined region, it is possible to make a predetermined notification to make the user recognize that the positional relationship is one suitable for transmission and reception of electric power.

For another example, with respect to the non-contact power feeding system $W_2$, in the power transmission device, before the end of the predetermined process (guiding process) for giving the particular notification by the controller, execution of the power transmission can be restricted.

Specifically, for example, with respect to the non-contact power feeding system $W_2$, the result of detection of the mark on the shot image can include the result of detection of the position of the mark on the shot image.

Specifically, for another example, with respect to the non-contact power feeding system $W_2$, the power reception device can include a display screen (25), and the particular notification can include display on the display screen.

Specifically, for another example, with respect to the non-contact power feeding system $W_2$, the housing of the power reception device can have a first face and a second face opposite the first face, the display screen can be provided on the first face, and the camera unit can have a shooting region (SR) widening, starting on the second face, in the direction pointing from the first face to the second face.

For another example, with respect to the non-contact power feeding system $W_2$, the power transmission device can acquire current amplitude information as to the transmission-side coil as obtained when a predetermined magnetic field is being generated in the transmission-side coil as a result of an alternating-current voltage being fed to the transmission-side resonance circuit, and the controller can give a second particular notification according to the current amplitude information received from the power transmission device by communication.

The degree of magnetic coupling between the transmission-side coil and the reception-side coil can be estimated based on the current amplitude information. Thus, by allowing a second particular notification to be given according to the current amplitude information, it is possible to let the user know whether or not the positional relationship between the power transmission device and the power reception device is proper, and to prompt, as necessary, the user to adjust the positional relationship.

In that case, for example, with respect to the non-contact power feeding system $W_2$, in the second particular notification, the controller can notify whether or not the positional relationship between the power transmission device and the power reception device is proper, or classify and notify the propriety level of the positional relationship between the power transmission device and the power reception device in three or more grades.

Instead, for example, with respect to the non-contact power feeding system $W_2$, the power transmission device can acquire current amplitude information as to the transmission-side coil as obtained when a predetermined magnetic field is being generated in the transmission-side coil as a result of an alternating-current voltage being fed to the transmission-side resonance circuit, and give a second particular notification according to the current amplitude information.

The degree of magnetic coupling between the transmission-side coil and the reception-side coil can be estimated based on the current amplitude information. Thus, by allowing a second particular notification to be given according to the current amplitude information, it is possible to let the user know whether or not the positional relationship between the power transmission device and the power reception device is proper, and to prompt, as necessary, the user to adjust the positional relationship.

In that case, for example, with respect to the non-contact power feeding system $W_2$, in the second particular notification, the power transmission device can notify whether or not the positional relationship between the power transmission device and the power reception device is proper, or classify and notify the propriety level of the positional relationship between the power transmission device and the power reception device in three or more grades.

The power feeding appliance 1 itself in the embodiments described above may function as a power transmission device according to the present invention, or a part of the power feeding appliance 1 in the embodiments described above may function as a power transmission device according to the present invention. Likewise, the electronic appliance 2 itself in the embodiments described above may function as a power reception device according to the present invention, or a part of the electronic appliance 2 in the embodiments described above may function as a power reception device according to the present invention.

<<Variations and Modifications>>

Embodiments of the present invention allow for many variations and modifications within the spirit and scope of the technical concepts recited in the appended claims. The embodiments described above merely present examples of how the present invention can be implemented, and the senses of the terms used to describe the present invention and its features are not limited to those in which the terms are used in the description of the embodiments. Any specific values mentioned in the above description are merely examples, and, needless to say, can be changed to many different values. As notes applicable to the embodiments described above, notes 1 to 3 are given below. Unless inconsistent, any of the notes below can be combined with any other.

[Note 1]

In the embodiments described above, the frequencies of different signals and the resonance frequencies are set at 13.56 MHz, that is, at the reference frequency. The frequency 13.56 MHz, however, is simply a target value for such settings, and in actual devices, those frequencies contain errors.

[Note 2]

In the embodiments, the present invention is implemented in conformity with the NFC standard, and this necessitates that the reference frequency be 13.56 MHz. The reference frequency, however, may instead be any frequency other than 13.56 MHz. In this connection, the communication and power transfer conducted between a power feeding appliance and an electronic appliance according to the present invention may be communication and power transfer conforming to any standard other than NFC.

Also in a case where the reference frequency of a non-contact power feeding system according to the present invention is set at a frequency (for example, 6.78 MHz) other than 13.56 MHz and in addition the resonance frequency of the resonance circuit JJ in a foreign object 3 configured as a non-contact IC card is 13.56 MHz, when the foreign object 3 is placed on the power feeding stage 12, a certain degree of variation is observed in the voltage value $V_D$ in the pFOD process or in the mFOD process. Thus, also in such cases, a foreign object 3 can be detected by the method described above.

[Note 3]

A target device, that is, a power reception device or a power transmission device, according to the present invention can be built as hardware, such as an integrated circuit, or as a combination of hardware and software. Any particular functions, which are all or part of the functions performable by the target device, may be written in a program, and this program may be stored in a flash memory that can be mounted on the target device so that, when the program is run on a program execution device (for example, a microcomputer that can be mounted on the target device), those particular functions will be performed. The program can be stored in or fixed to any recording medium. The recording medium in or to which the program is stored or fixed may be mounted on or connected to a device (such as a server device) separate from the target device.

LIST OF REFERENCE SIGNS

1 power feeding appliance
2 electronic appliance
12 power feeding stage
12a placement surface
25 camera unit
26 display screen
27 speaker unit
28 controller
130 NFC power transmission circuit
140 load sensing circuit
160 control circuit
240 resonance state changing circuit (resonance frequency changing/coil short-circuiting circuit)
250 control circuit
TT transmission-side resonance circuit
$T_L$ transmission-side coil
$T_C$ transmission-side capacitor
RR reception-side resonance circuit
$R_L$ reception-side coil
$R_C$ reception-side capacitor

The invention claimed is:

1. A non-contact power feeding system comprising a power transmission device and a power reception device, transmission and reception of electric power being possible therebetween by magnetic field resonance, wherein the power transmission device includes:
 a transmission-side resonance circuit including a transmission-side coil for transmitting the electric power;
 a power transmission circuit which feeds an alternating-current voltage to the transmission-side resonance circuit to generate a magnetic field in the transmission-side coil;
 a sensing circuit which senses an amplitude of a current passing in the transmission-side coil; and
 a transmission-side control circuit which operates in, as an operation mode thereof, one of a plurality of modes including a first mode and a second mode;

the power reception device includes:
 a reception-side resonance circuit including a reception-side coil for receiving the electric power;
 a changing/short-circuiting circuit which can
  change a resonance frequency of the reception-side resonance circuit from a resonance frequency during the power reception or
  short-circuit the reception-side coil; and
 a reception-side control circuit which operates in, as an operation mode thereof, one of a plurality of modes including the first mode and the second mode, wherein in the first mode,
the reception-side control circuit, according to a signal from the power transmission device by communication and by using the changing/short-circuiting circuit, changes the resonance frequency of the reception-side resonance circuit, or short-circuits the reception-side coil, for a predetermined time, and then cancels the change or the short-circuiting, and
the transmission-side control circuit, during a period in which the resonance frequency of the reception-side resonance circuit is changed or the reception-side coil is short-circuited and prior to the power transmission, controls the power transmission circuit such that a predetermined test magnetic field is generated in the transmission-side coil, then, based on first evaluation data representing a sensed amplitude value obtained from the sensing circuit while the test magnetic field is being generated in the first mode, judges whether or not execution of the power transmission is permissible, and, after judging that execution of the power transmission is permissible, controls the power transmission circuit such that a power transmission magnetic field stronger than the test magnetic field is generated in the transmission-side coil to carry out the power transmission, and in the second mode, the reception-side control circuit, by using the changing/short-circuiting circuit, maintains the change of the resonance frequency of the reception-side resonance circuit or the short-circuiting of the reception-side coil, and the transmission-side control circuit controls the power transmission circuit such that the test magnetic field is generated continuously in the transmission-side coil, and acquires second evaluation data representing a sensed amplitude value obtained from the sensing circuit while the test magnetic field is being generated in the second mode.

2. The non-contact power feeding system according to claim 1, wherein in the first mode, the transmission-side control circuit, based on the first evaluation data, judges presence or absence of a foreign object which differs from the power reception device and in which a current based on a magnetic field generated in the transmission-side coil can be generated, and, based on a result of the judgement, controls whether or not execution of the power transmission is permissible.

3. The non-contact power feeding system according to claim 2, wherein in the first mode, the transmission-side control circuit, on judging that no foreign object is present, permits execution of the power transmission and, on judging that the foreign object is present, inhibits execution of the power transmission.

4. The non-contact power feeding system according to claim 2, wherein in the first mode, the transmission-side control circuit judges presence or absence of the foreign object by judging whether or not the sensed amplitude value represented by the first evaluation data falls outside a predetermined range.

5. The non-contact power feeding system according to claim 1, further comprising:

a processing unit which performs a predetermined process based on the second evaluation data, wherein the processing unit is provided in the transmission-side control circuit or in an external device different from either of the power transmission device and the power reception device.

6. The non-contact power feeding system according to claim 5, wherein the predetermined process includes a process of displaying the second evaluation data on a display device provided in, or connected to, the power transmission device.

7. The non-contact power feeding system according to claim 5, wherein the predetermined process includes a process of recording the second evaluation data to a storage device provided in, or connected to, the power transmission device.

8. The non-contact power feeding system according to claim 4, further comprising:

a processing unit which performs a predetermined process based on the second evaluation data, wherein the processing unit is provided in the transmission-side control circuit or in an external device different from either of the power transmission device and the power reception device, and the predetermined process includes a process of judging whether or not a sensed amplitude value represented by the second evaluation data falls outside a predetermined range.

9. The non-contact power feeding system according to claim 1, wherein the transmission-side control circuit and the reception-side control circuit each set the operation mode thereof to the second mode on receiving input of a particular instruction, and otherwise set the operation mode thereof to the first mode.

10. The non-contact power feeding system according to claim 9, wherein the power transmission device and the power reception device each include an input accepter for receiving input of the particular instruction.

11. The non-contact power feeding system according to claim 1, wherein the plurality of modes in the transmission-side control circuit further include a mode in which the power transmission magnetic field is generated continuously in the transmission-side coil, and the plurality of modes in the reception-side control circuit further include a mode in which the change of the resonance frequency of the reception-side resonance circuit or the short-circuiting of the reception-side coil is kept unperformed continuously.

* * * * *